April 11, 1939.  F. B. ROMBERG ET AL  2,154,412
METHOD AND MACHINE FOR SHELLING NUTS
Filed Jan. 18, 1936  19 Sheets-Sheet 1

Witness
Woodrow E. Blomdahl

Inventors
F. B. Romberg,
Louis D. Romberg

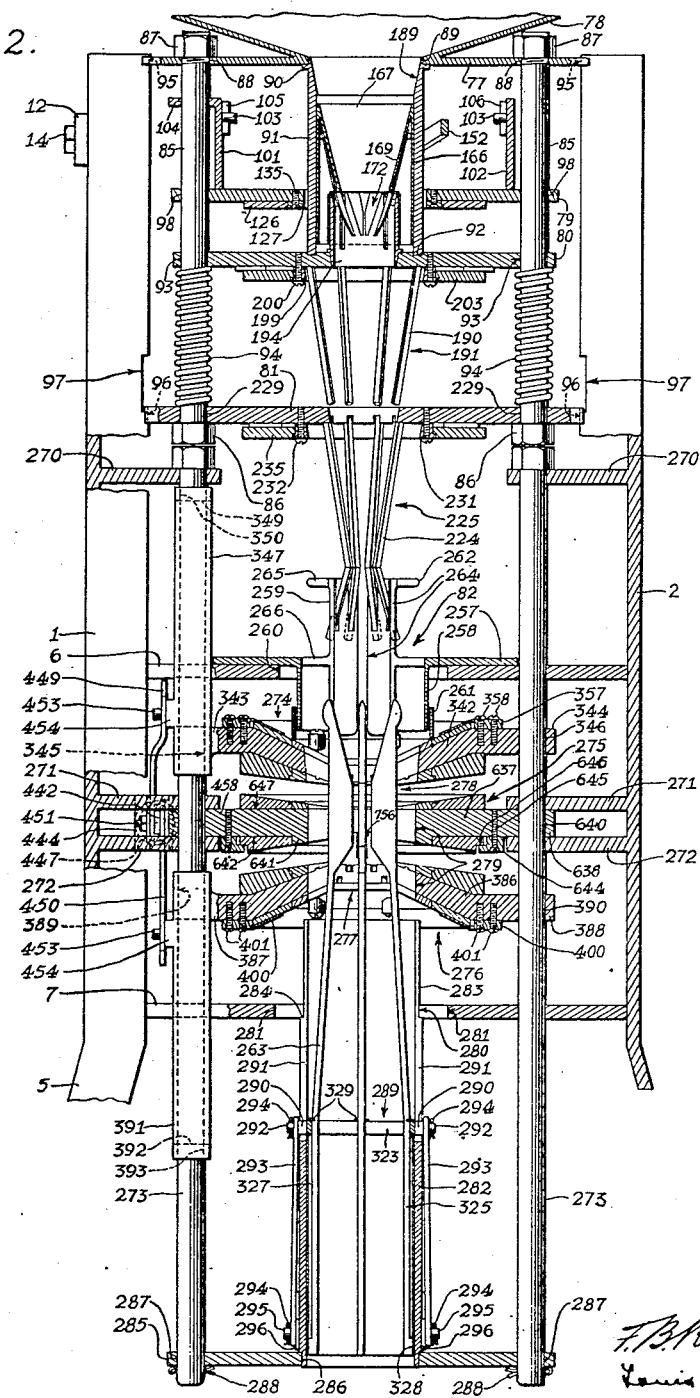

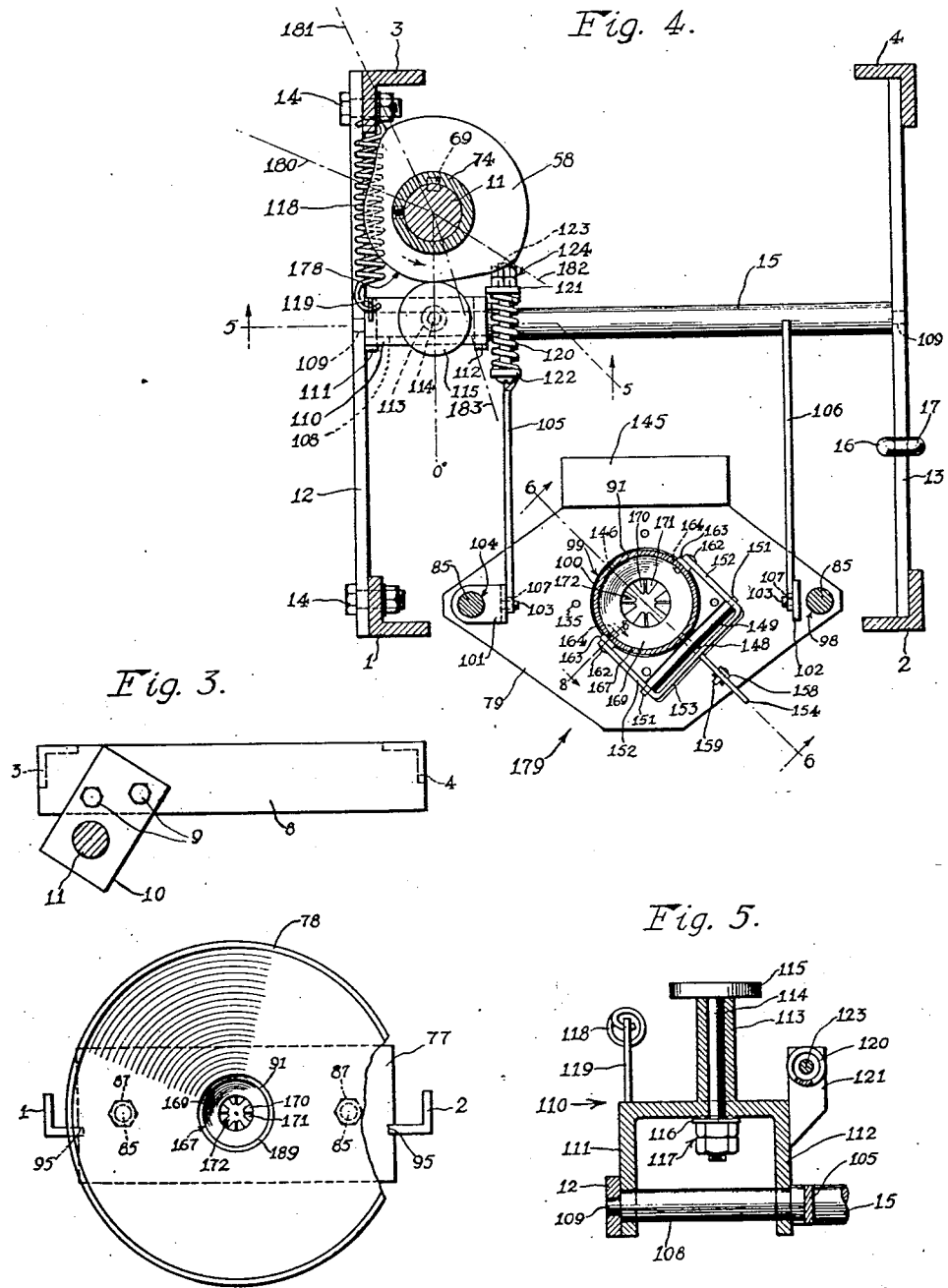

April 11, 1939.  F. B. ROMBERG ET AL  2,154,412
METHOD AND MACHINE FOR SHELLING NUTS
Filed Jan. 18, 1936   19 Sheets-Sheet 5
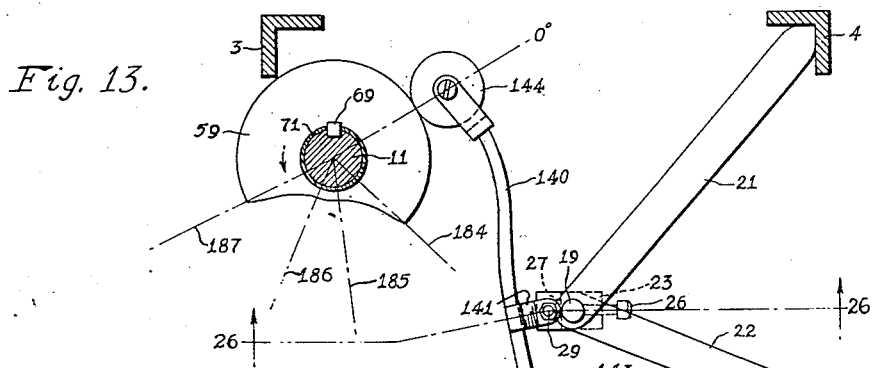
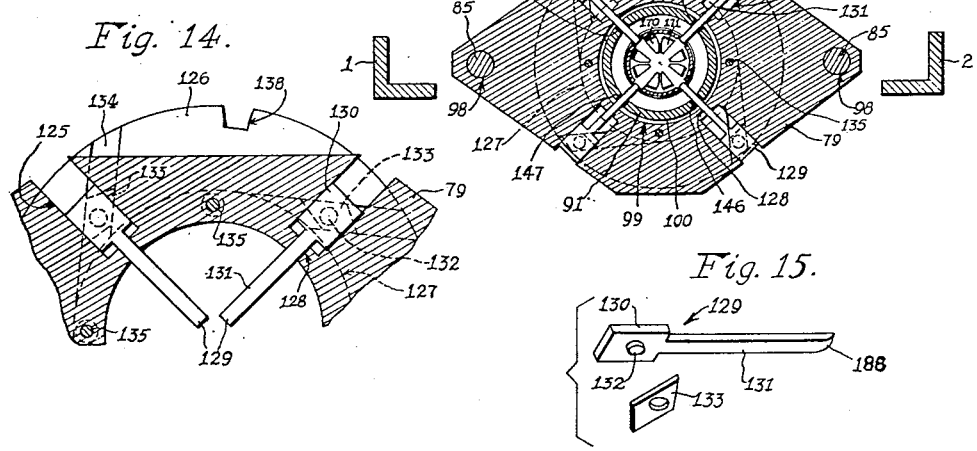
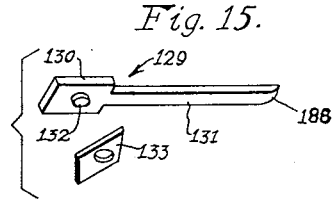
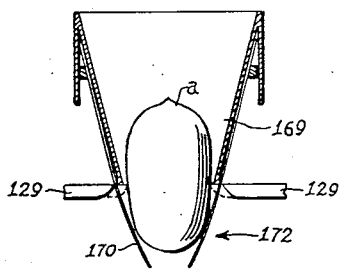
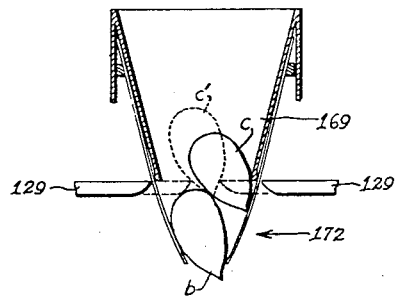
WITNESS
Woodrow E. Blomdahl
INVENTORS
F. B. Romberg
Louis D. Romberg April 11, 1939.   F. B. ROMBERG ET AL   2,154,412
METHOD AND MACHINE FOR SHELLING NUTS
Filed Jan. 18, 1936   19 Sheets-Sheet 6

Inventors
F. B. Romberg
Louis D. Romberg

Witness
Woodrow E. Blomdahl

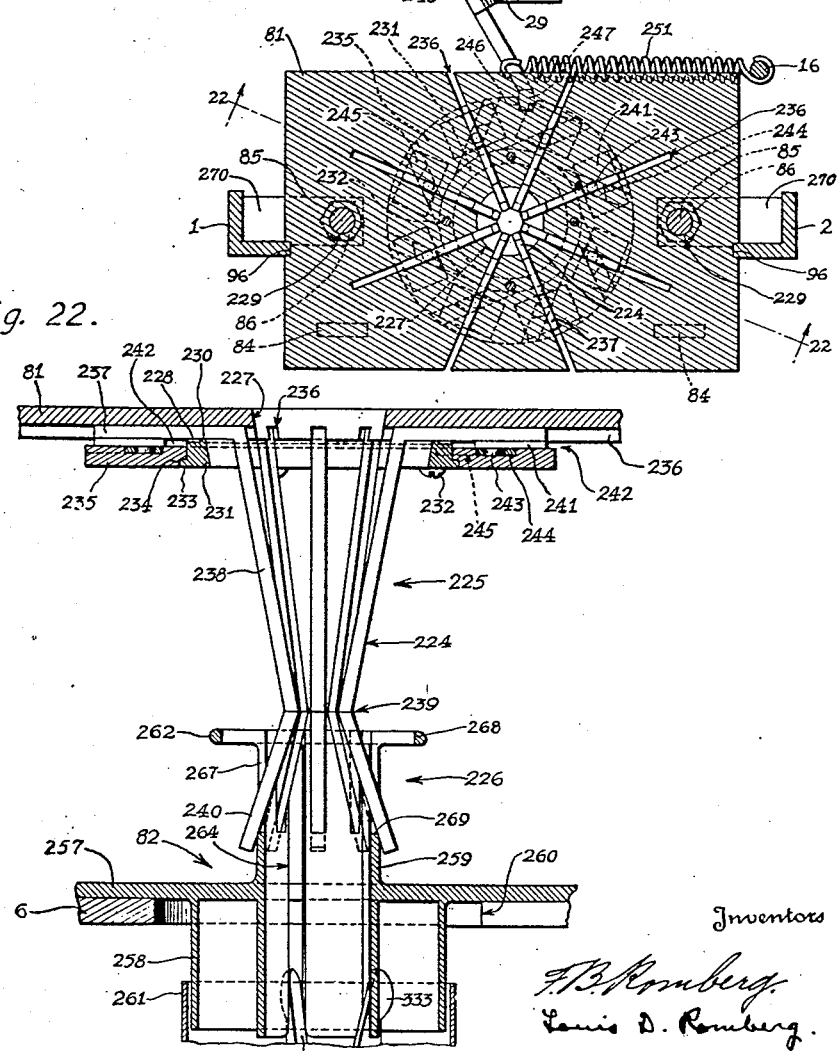

April 11, 1939.  F. B. ROMBERG ET AL  2,154,412
METHOD AND MACHINE FOR SHELLING NUTS
Filed Jan. 18, 1936  19 Sheets-Sheet 8

Inventors
F. B. Romberg
Louis D. Romberg

Witness
Woodrow E. Blomdahl

April 11, 1939.  F. B. ROMBERG ET AL  2,154,412
METHOD AND MACHINE FOR SHELLING NUTS
Filed Jan. 18, 1936   19 Sheets-Sheet 9
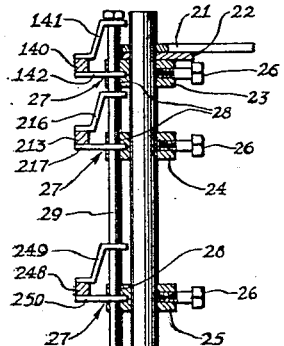
Fig. 25.
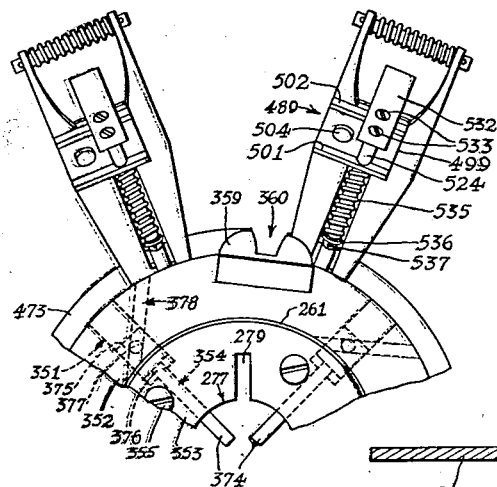
Fig. 26.
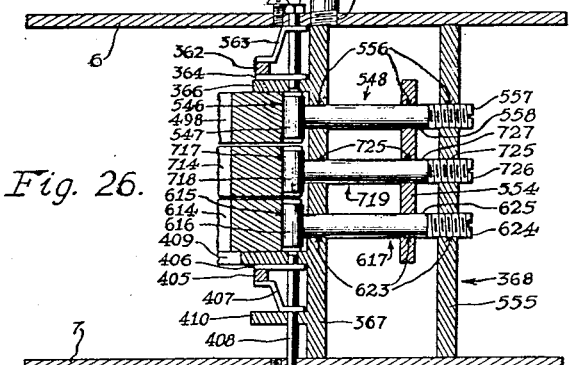
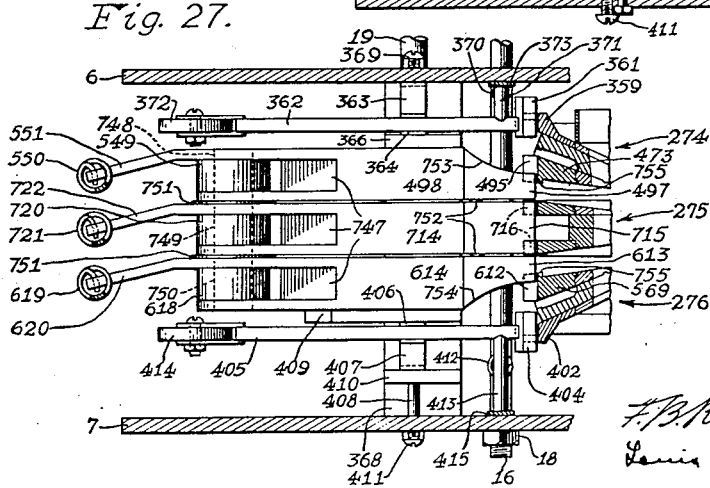
Fig. 27.
Inventors
F. B. Romberg
Louis D. Romberg
Witness
Woodrow E. Blomdahl April 11, 1939.  F. B. ROMBERG ET AL  2,154,412
METHOD AND MACHINE FOR SHELLING NUTS
Filed Jan. 18, 1936  19 Sheets-Sheet 10

Inventors
F. B. Romberg
Louis D. Romberg

Witness
Woodrow E. Blomdahl

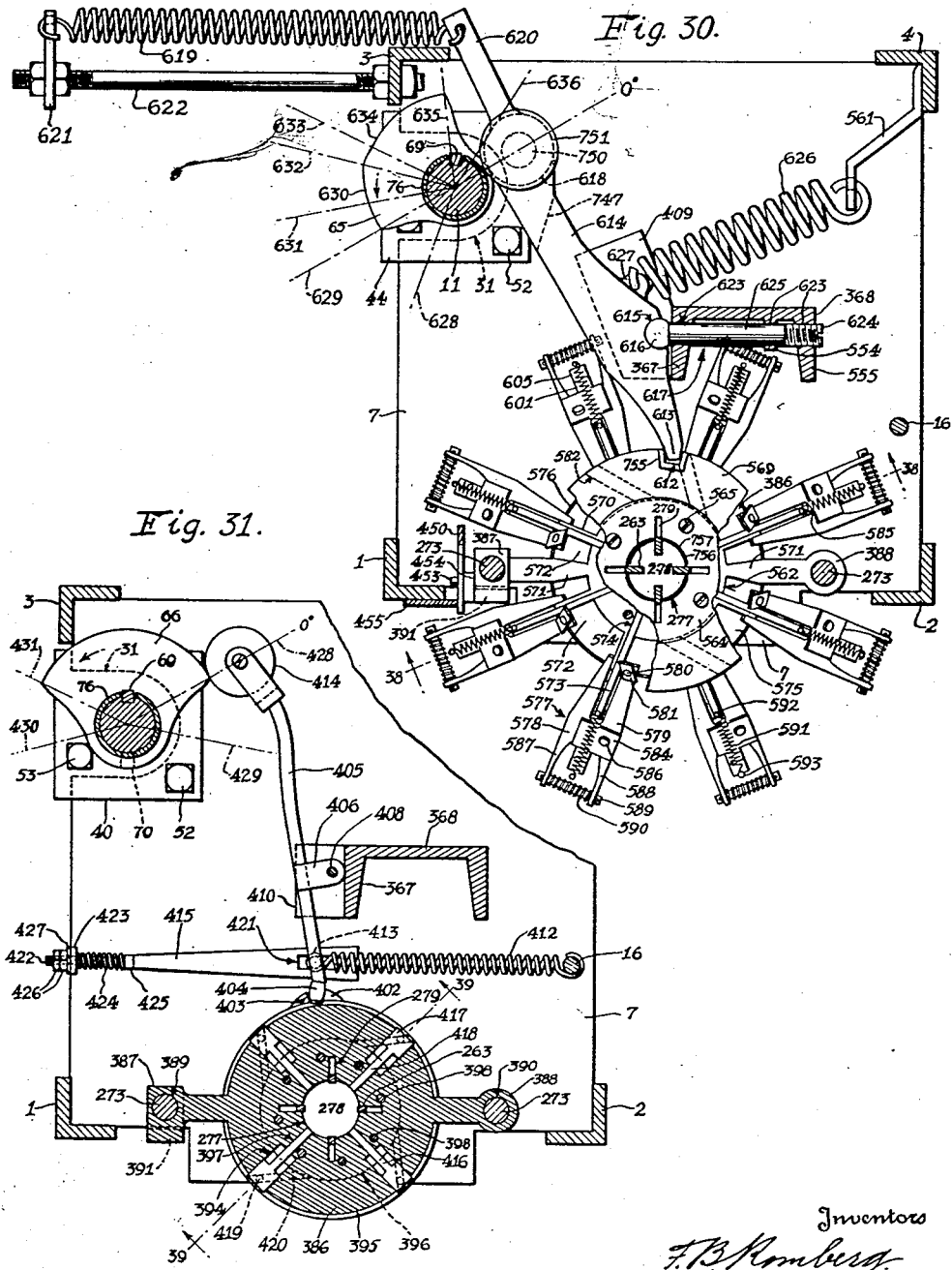

April 11, 1939.  F. B. ROMBERG ET AL  2,154,412
METHOD AND MACHINE FOR SHELLING NUTS
Filed Jan. 18, 1936  19 Sheets-Sheet 12
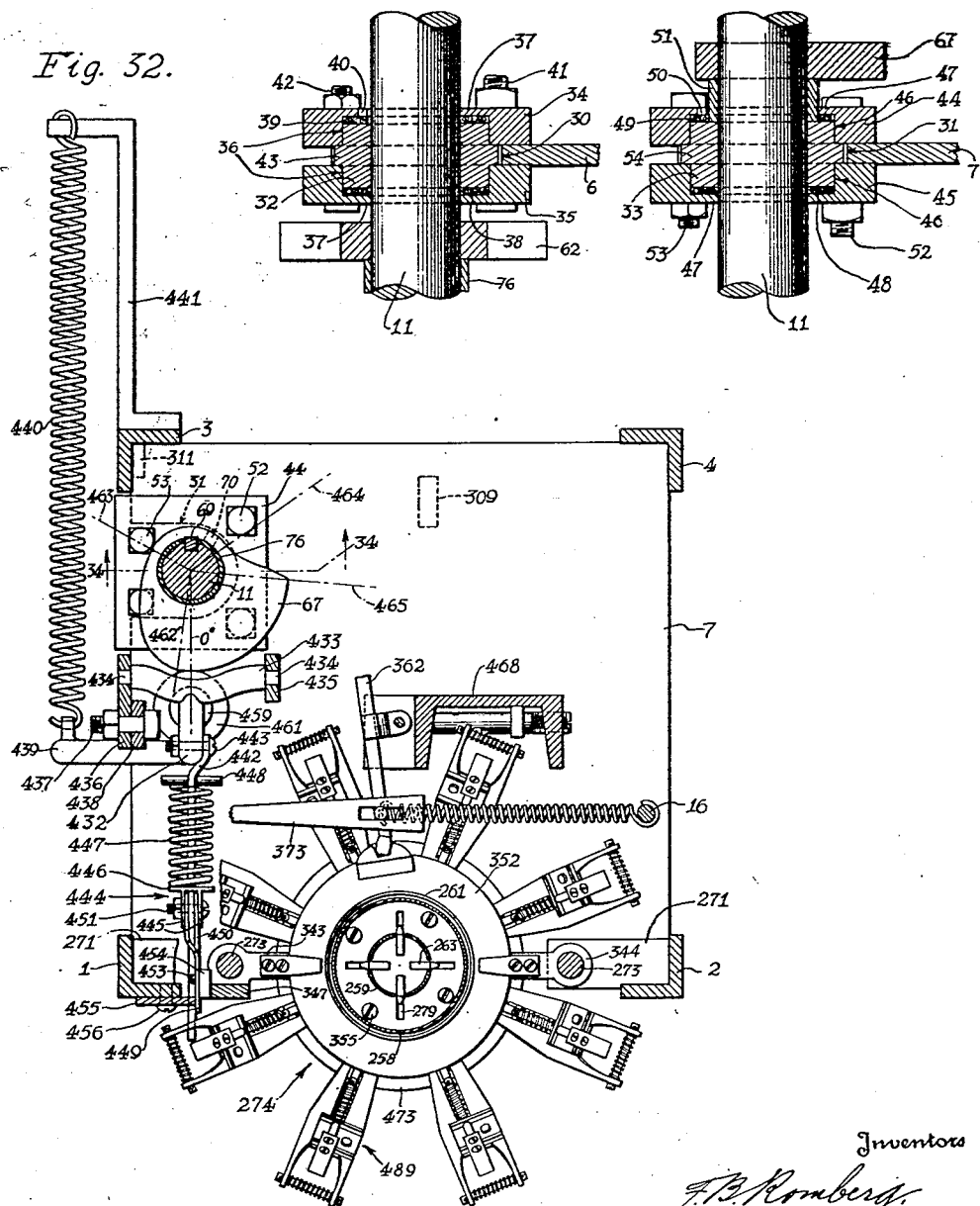

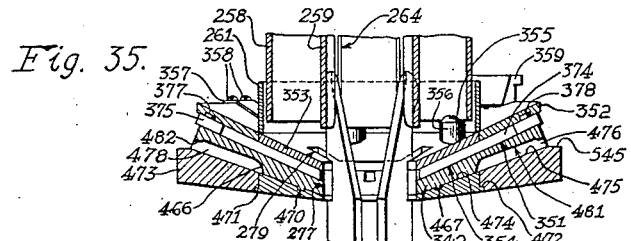

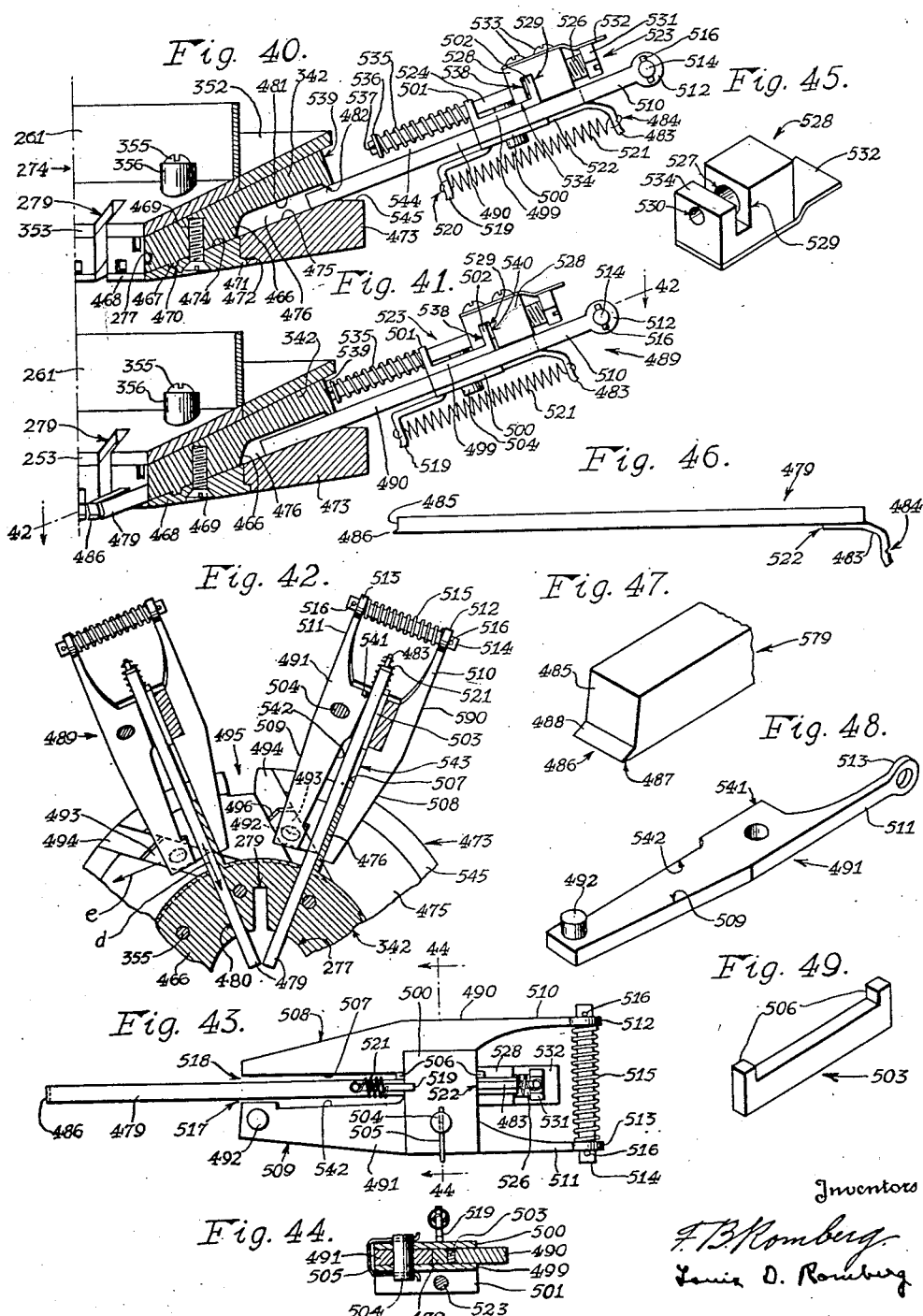

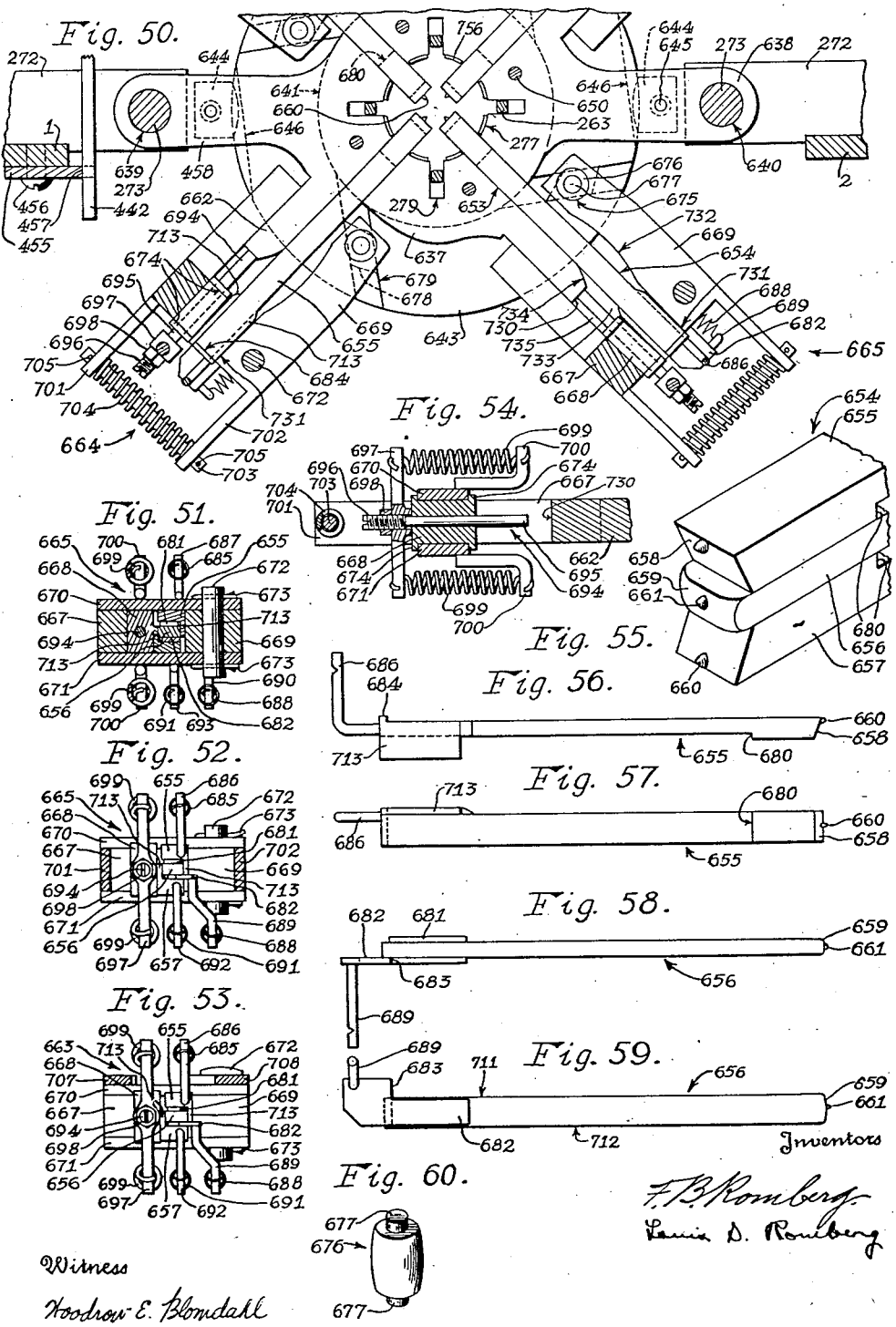

April 11, 1939. F. B. ROMBERG ET AL 2,154,412
METHOD AND MACHINE FOR SHELLING NUTS
Filed Jan. 18, 1936 19 Sheets-Sheet 16
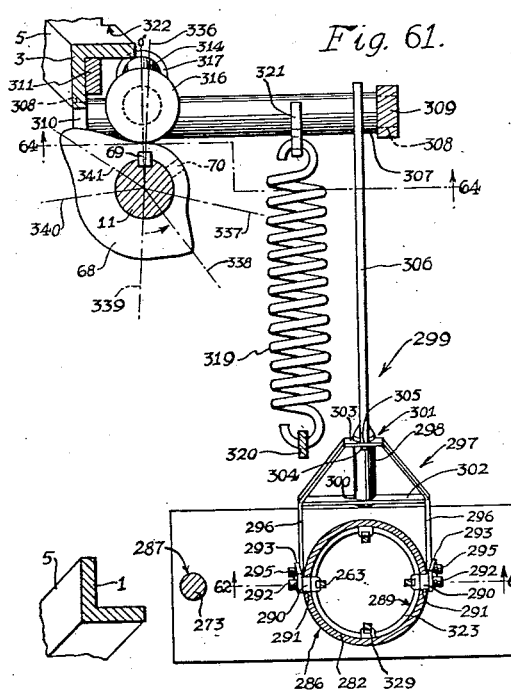
Fig. 61.
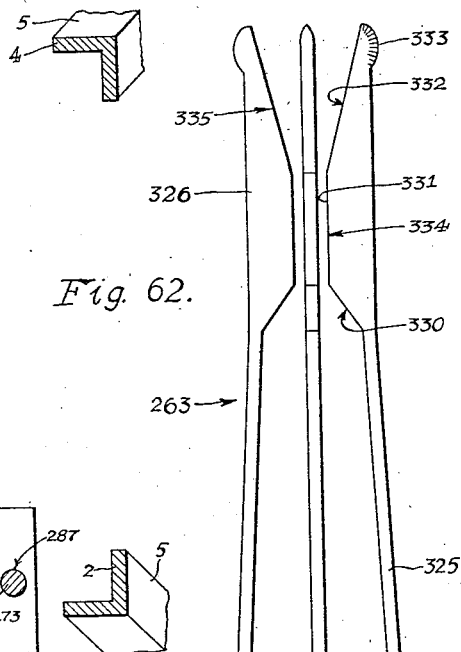
Fig. 62.
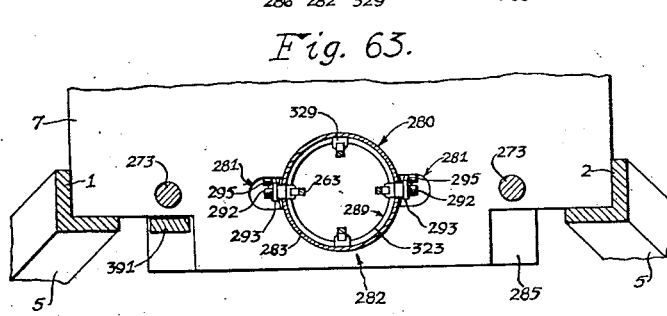
Fig. 63.
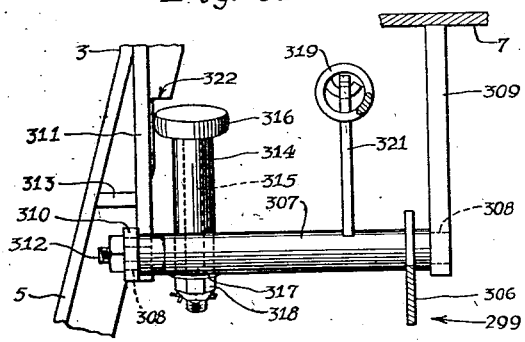
Fig. 64.
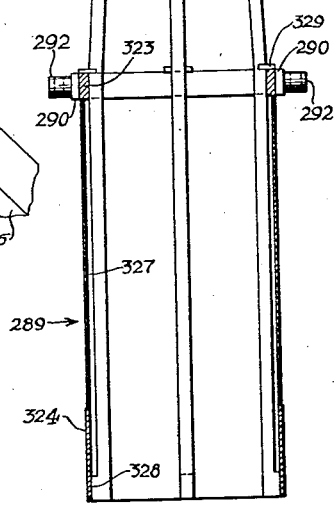
Inventors
F. B. Romberg.
Louis D. Romberg.
Witness
Woodrow E. Blomdahl April 11, 1939.  F. B. ROMBERG ET AL  2,154,412
METHOD AND MACHINE FOR SHELLING NUTS
Filed Jan. 18, 1936  19 Sheets-Sheet 17
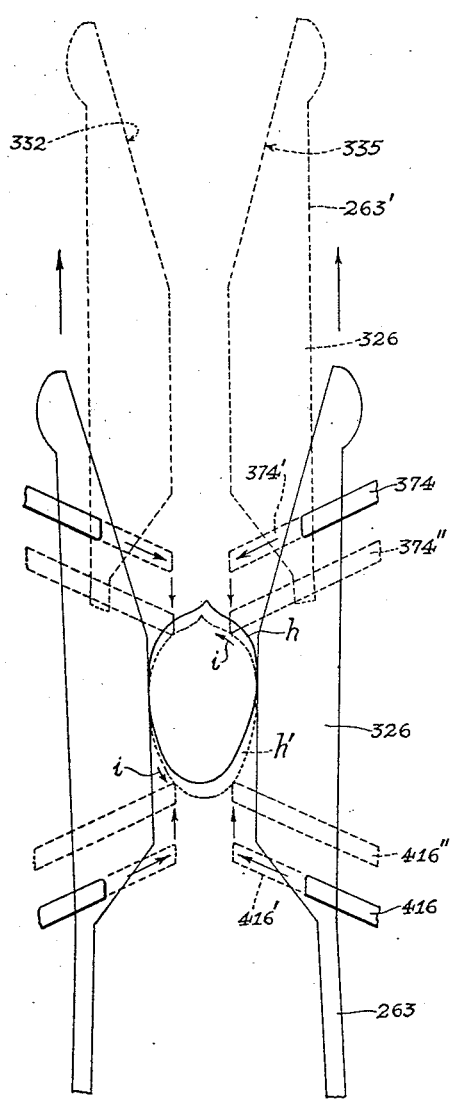
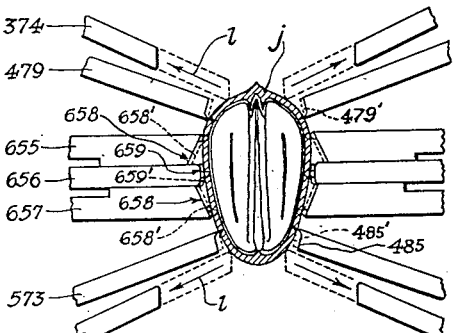
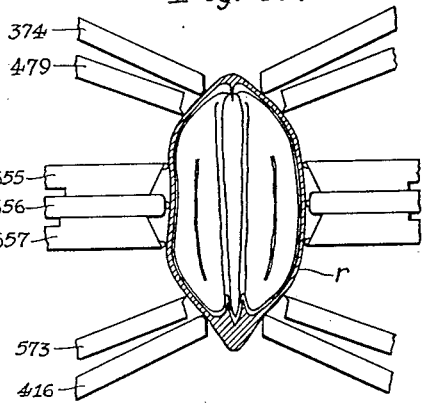
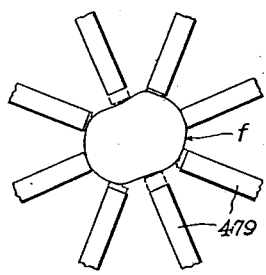

April 11, 1939.   F. B. ROMBERG ET AL   2,154,412
METHOD AND MACHINE FOR SHELLING NUTS
Filed Jan. 18, 1936    19 Sheets-Sheet 18
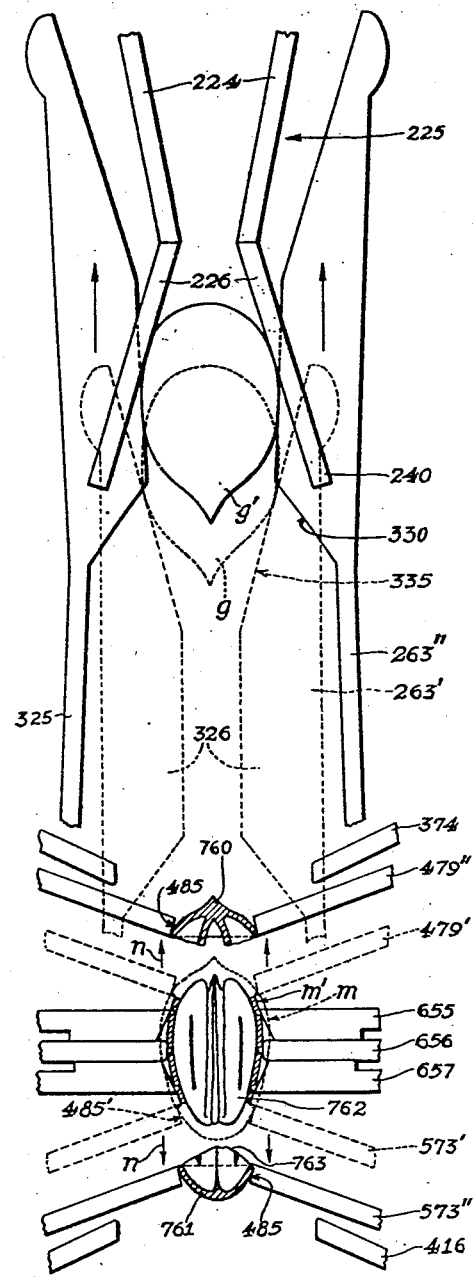
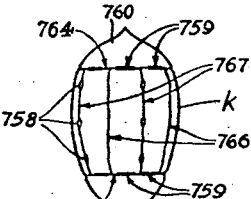
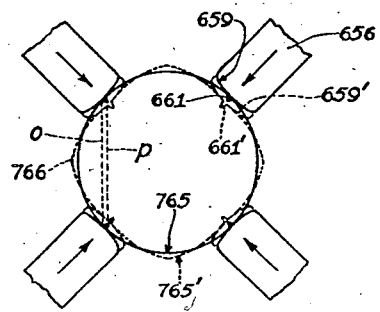
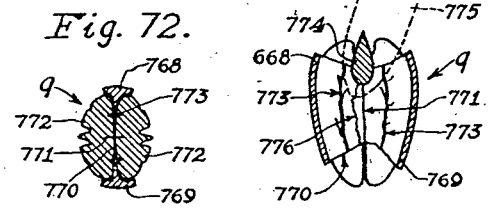
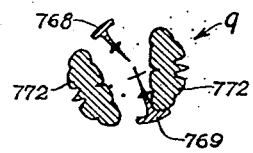

April 11, 1939.    F. B. ROMBERG ET AL    2,154,412
METHOD AND MACHINE FOR SHELLING NUTS
Filed Jan. 18, 1936    19 Sheets-Sheet 19

Patented Apr. 11, 1939

2,154,412

UNITED STATES PATENT OFFICE 2,154,412

METHOD AND MACHINE FOR SHELLING NUTS

Felix B. Romberg and Louis D. Romberg, Austin, Tex.

Application January 18, 1936, Serial No. 59,766

72 Claims. (Cl. 146—8)

This invention relates to a method and machine for shelling nuts, and especially pecan nuts.

A general object of our invention is to provide a method and mechanism whereby nuts varying within a commercial class can in rapid succession be shelled (or cracked) so that kernels are recoverable with little labor, mutilation or loss.

A more specific object is to divide the shell of a nut along a definite line or plurality of lines by making small penetrations which are preferably limited to the shell itself.

Another object is to penetrate the shell of a nut to grip a specific shell portion, or specific shell portions, and to press against said shell portion, or each shell portion, to remove or disrupt it.

A further object is to sever and preferably remove cup-like ends of the shell and to push in the intermediate portion of the shell at circumferentially spaced locations defining arcuate shell sections to crack it inwardly at these locations and force it to bulge and crack outwardly between these locations, and preferably to penetrate the shell where it is pushed in, thereby to confine each arcuate shell section and crack it independently.

Other objects are: to provide new and useful means for segregating nuts; to provide novel means for giving elongated nuts a straight upended position; to provide novel means for carrying nuts between shelling members; to provide novel means for holding nuts for shelling members; to provide novel shelling means; and, to provide novel driving means for shell forcing means.

Additional objects of our invention will appear in the following detailed description of an embodiment thereof preferred for pecan nuts, reference being had to the accompanying drawings in which—

Figure 2 is a vertical section along the nut track of the machine, taken substantially on the line 2—2 of Figure 1.

Figure 3 is a partly sectional and partly plan view taken on the line 3—3 of Figure 1, with a portion of the hopper cut away.

Figure 4 is a horizontal section taken on the line 4—4 of Figure 1.

Figure 5 is a vertical section of the rocker mechanism taken on the line 5—5 of Figure 4.

Figure 13 is a horizontal section taken on line 13—13 of Figure 1, showing the extracting pins in their open position and the mechanism for operating them.

Figure 14 is a fractional view of the structure of Figure 13, showing the extracting pins in the closed position.

Figure 15 is a perspective view of one of the extracting pins and the shoe it carries.

Figure 16 is a diagram showing how the extracting pins grasp a large nut.

Figure 17 is a diagram showing how the extracting pins close behind a small nut and exclude a second small nut.

Figure 21 is a horizontal section taken on line 21—21 of Figure 1, showing the second cage and the mechanism for operating it.

Figure 22 is a vertical section of the second cage and the guard plate, taken on line 22—22 of Figure 21.

Figure 25 is a fractional view of the structure of Figure 24, showing the top clamping pins in the closed position.

Figure 26 is a vertical section taken on line 26—26 of Figure 13, particularly showing the bearing members of the rockers.

Figure 27 is a vertical section taken substantially along line 27—27 of Figure 24, particularly showing the rockers of the shelling mechanism.

Figure 30 is a horizontal section taken substantially on the line 30—30 of Figure 1, showing the bottom girdling pins and the mechanism for operating them.

Figure 31 is a horizontal section, with portions cut away, taken substantially on the line 31—31 of Figure 1, showing the bottom clamping pins and the mechanism for operating them.

Figure 32 is a horizontal section taken on line 32—32 of Figure 1, particularly showing the mechanism for moving the upper and lower shelling assemblages toward and away from the middle shelling asemblage.

Figure 33 is a vertical section of the middle cam shaft bearing taken on the line 33—33 of Figure 23.

Figure 34 is a vertical section of the lower cam shaft bearing, taken on the line 34—34 of Figure 32.

Figure 35 is a cross section taken on line 35—35 of Figure 24, particularly showing the top clamping pins.

Figure 36 is a cross section taken on line 36—36 of Figure 28, particularly showing the top girdling pins.

Figure 37 is a cross section of the middle shelling assemblage, taken on line 37—37 of Figure 29.

Figure 38 is a cross section taken on line 38—38 of Figure 30, particularly showing the bottom girdling pins.

Figure 39 is a cross section taken on line 39—39 of Figure 31, particularly showing the bottom clamping pins.

Figure 40 is a sectional view taken on line 40—40 of Figure 28, showing a gripper in its outermost position.

Figure 41 is a view similar to Figure 40 but with the gripper in its innermost position.

Figure 42 is a fractional sectional view of the upper shelling assemblage, taken on line 42—42 of Figure 41.

Figure 43 is a bottom plan view of one of the top girdling pin grippers with the assembled girdling pin.

Figure 44 is a cross section taken on line 44—44 of Figure 43.

Figure 45 is a perspective view of one of the slotted blocks of the girdling pin grippers.

Figure 46 is a side elevation of one of the girdling pins.

Figure 47 is an enlarged perspective view of the nut engaging end of one of the girdling pins.

Figure 48 is a perspective view of the under side of the locking lever of one of the top girdling pin grippers.

Figure 49 is an enlarged perspective view of the spacer block of one of the girdling pin grippers.

Figure 50 is a fractional section taken on line 50—50 of Figure 37, but showing the cracking pins in the closed position and showing the guard 756.

Figure 51 is a cross section taken on line 51—51 of Figure 29.

Figure 52 is a cross section taken on line 52—52 of Figure 29.

Figure 53 is a cross section taken on line 53—53 of Figure 29.

Figure 54 is a sectional view taken on line 54—54 of Figure 29.

Figure 55 is an enlarged perspective view of the nut engaging end of a cracking pin set.

Figures 56 and 57 are, respectively, a detail side elevation and a detail bottom plan view of one of the uppermost cracking pins.

Figures 58 and 59 are, respectively, a detail side elevation and a detail bottom plan view of one of the middle cracking pins.

Figure 60 is a perspective view of the equalizing cross pin of a cracking pin gripper.

Figure 61 is a horizontal section taken on a line 61—61 of Figure 1.

Figure 62 is a detail vertical section of the feeding fingers and the tubular carriage to which they are secured, taken on the line 62—62 of Figure 61.

Figure 63 is a horizontal section taken on the line 63—63 of Figure 1.

Figure 64 is a sectional view taken substantially on line 64—64 of Figure 61.

Figure 65 is a diagram showing the positions and movements of the clamping pins and feeding fingers and of a small nut in the shelling chamber, during the first 140 degrees of the shelling cycle.

Figure 66 is a diagram showing the steps taken by the clamping, girdling and cracking pins, between 140 degrees and 235 degrees of the shelling cycle, when a small nut is acted upon.

Figure 67 is a diagram showing the positions taken on a large nut by the clamping, girdling and cracking pins.

Figure 68 is a diagram showing how the girdling pins fit the form of a nut.

Figure 69 is a diagram showing the operations of the girdling and cracking pins between 235 degrees and 293 degrees, and of the feeding fingers between 235 degrees and 303 degrees of the shelling cycle.

Figure 70 shows where the pin penetrations come on a small pecan nut, and the various lines along which the shell of the nut is most likely to be ruptured.

Figure 71 is a diagram showing the principle of the cracking operation performed by the cracking pins.

Figure 72 is a cross section of a pecan nut coming from our machine with shell fragments attached to opposite sides of the partition.

Figure 73 is a diagram showing how the union of the nut is severed.

Figure 74 is a diagram showing the kernel halves and shell portions of the nut falling apart after the union has been severed.

Figure 75:
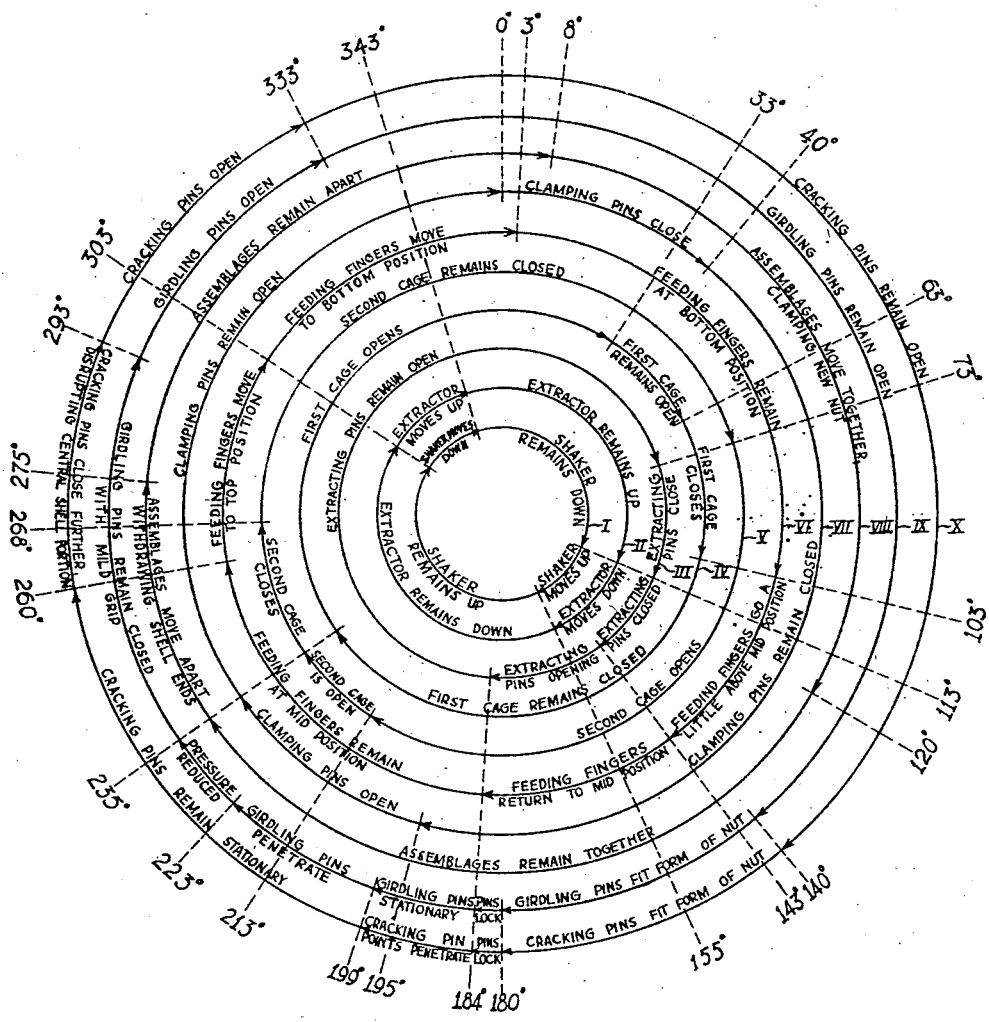

Figure 75 is a diagram showing the timing of the principal operations of the machine in degrees of cam shaft rotation from the beginning of the shelling cycle.

In carrying out our invention in the preferred manner, a shaker and extracting pins are used to segregate nuts. Cages are used to properly forward each segregated nut to reciprocating feeding fingers. The feeding fingers place the nut between top and bottom clamping pins which position the nut and hold it while it is being engaged by cracking pins and top and bottom girdling pins. The girdling pins remove the shell ends axially from the kernel and the cracking pins reduce the remaining shell body to longitudinal strips by distorting it. The kernels and shell fragments are discharged together.

With this introduction, reference will now be had to the details of our preferred machine in which four corner uprights 1, 2, 3 and 4 (Figures 1 and 23) are bent outwardly along their lower extremities to form legs 5 and are rigidly connected by the horizontally disposed upper plate 6 and lower plate 7 to form most of the framework of the machine (Figs. 1, 2, 23, 32 and 63). The legs may simply stand on the floor or may be secured in any suitable manner.

Figure 1:
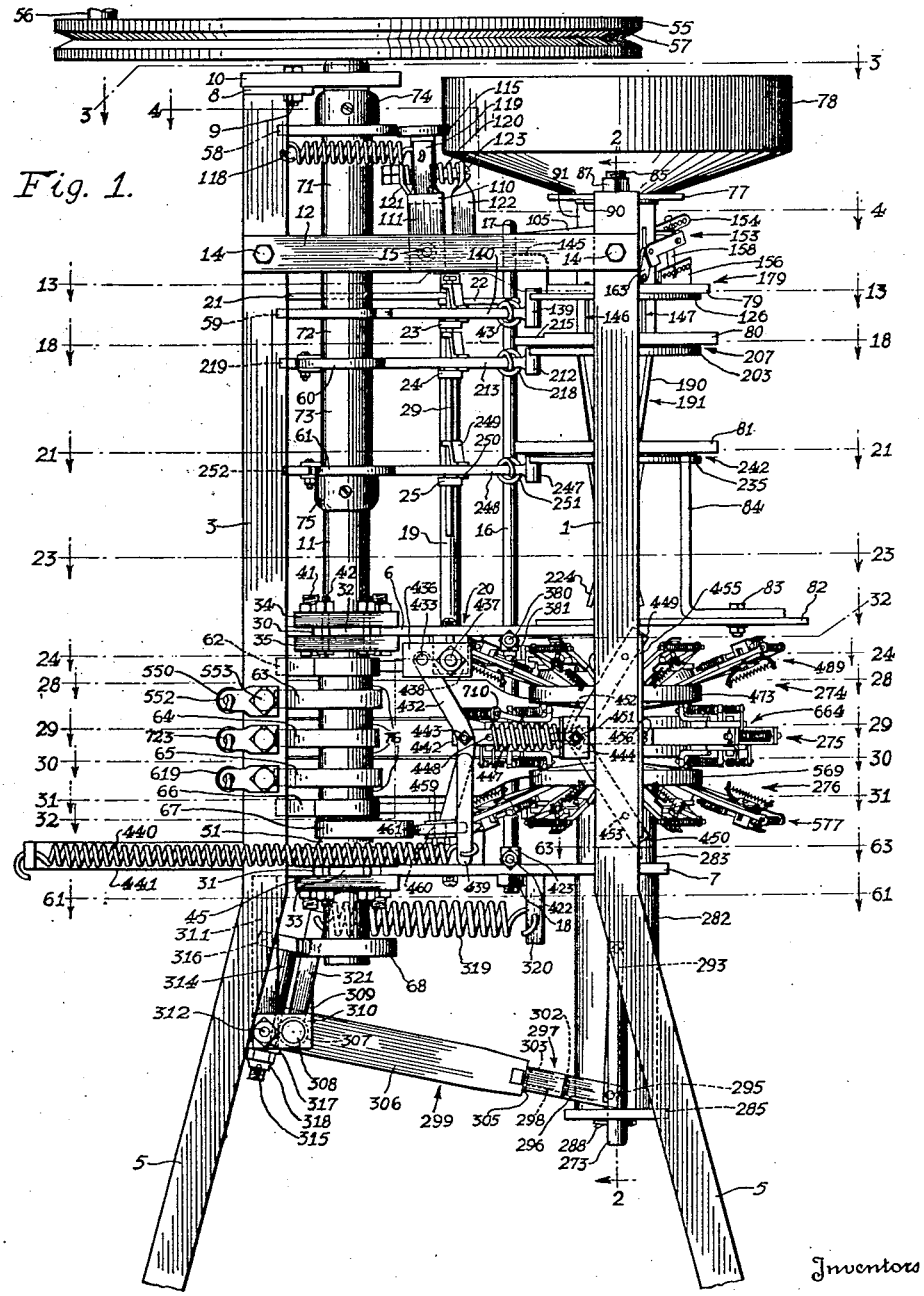
Figure 1 is a side elevation of our nut shelling machine at the beginning of its shelling cycle.

Uprights 3 and 4 are considered to be at the rear of the machine. Their upper extremities are connected by a cross bar 8 (Figs. 1 and 3) to which is bolted at 9 the top bearing 10 of the cam shaft 11. The front uprights 1 and 2 are shorter than the uprights at the rear. Near their top they are connected with uprights 3 and 4, respectively, by means of the parallel cross bars 12 and 13 (Figs. 1 and 4). Cross bar 12 is secured by bolts 14, 14 and is removed when the cam shaft 11 or the rocker shaft 15 is to be taken out of the machine. A spring anchor rod 16 is hooked over the cross bar 13 at 17 (Fig. 4) and extends down through suitable perforations in plates 6 and 7 (Figs. 1, 27 and 31). This rod is threaded at its lower end and drawn tight by a nut 18 under the lower plate 7.

A post 19 (Figs. 1, 13 and 26) is screwed into the upper plate 6 at 20 and extends perpendicularly upward therefrom. This post is braced near the top by links 21 and 22. Link 21 is suitably perforated to receive the post and extends to the upright 4. Link 22 connects the post and the spring anchor rod 16 and is suitably perforated to receive the two. These links 21 and 22 are removable from the post by sliding them upward.

The post 19 carries the bearing clips 23, 24 and 25 each of which is perforated to receive the post and has a set screw 26 by means of which it is adjustably fixed. Each bearing clip is horizontally slotted at 27 and is vertically perforated at 28 to receive the pivot rod 29 which can be removed simply by pulling it upwards.

Figure 23:
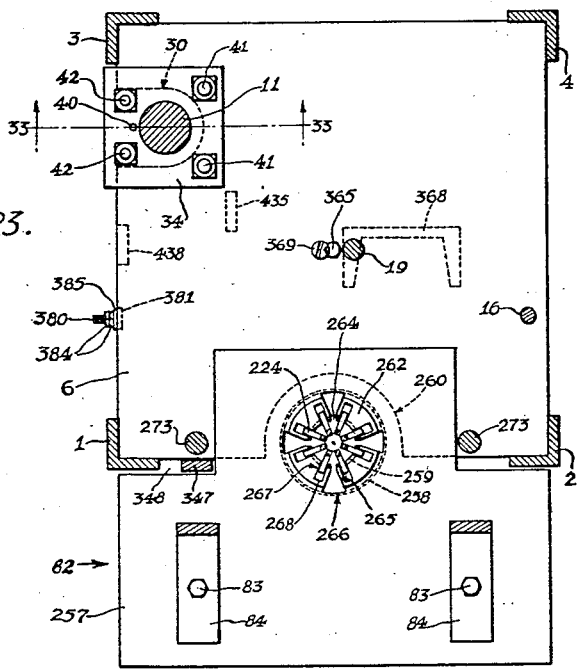
Figure 23 is a horizontal section taken on line 23—23 of Figure 1.

The upper plate 6 and lower plate 7 have the registering cut-outs 30 and 31, respectively, to receive the middle bearing 32 and lower bearing 33 of the cam shaft (Figs. 1, 23 and 32).

The middle bearing 32 is carried between confronting blocks 34 and 35 (Figs. 1, 23 and 33), which are recessed at 36 to receive the ends of the bearing 32 and to leave thin walls 37 remote from each other. Between each thin wall and the bearing there is an annular space. The annular space below the bearing is occupied by a felt washer 38 which constitutes an oil seal. The annular space above the bearing constitutes an oil reservoir 39 which is supplied with oil through a hole 40 in the upper confronting block. The confronting blocks are secured to the plate 6 by a pair of bolts 41, 41 and are also connected by a pair of bolts 42, 42 passing through the cut-out 30. When thus mounted the confronting blocks are drawn against the annular band 43 of the bearing.

The lower bearing 33 of the cam shaft (Figs. 1, 32 and 34) is carried by the confronting blocks 44 and 45 which are recessed at 46 to receive the bearing and to leave thin walls 47 defining annular spaces for the felt washer 48 and the oil reservoir 49. The thin wall of the upper confronting block has an oil hole 50 and an annular opening admitting the thrust collar 51 which communicates the vertical thrust of the cam shaft. The confronting blocks are secured to the lower plate 7 by the pair of bolts 52, 52 and are also connected by the pair of bolts 53, 53. When thus mounted these confronting blocks are drawn against the annular band 54 of the bearing.

The cam shaft 11 is surmounted by a flywheel 55 (Fig. 1) with a grip 56 for manual turning and a belt groove 57 for power operation.

Figure 24:
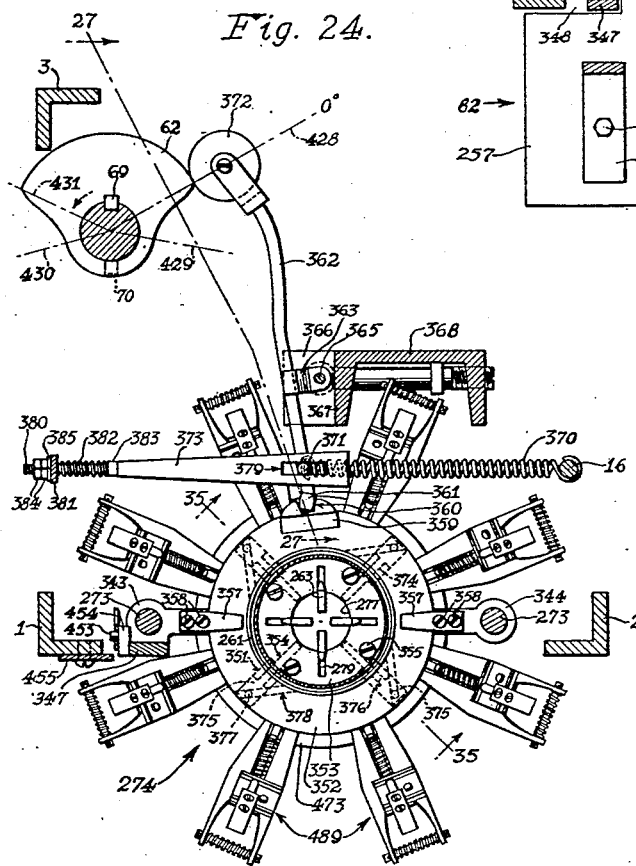
Figure 24 is a horizontal section (with one corner upright omitted) taken substantially on line 24—24 of Figure 1, showing the top clamping pins in the open position and the mechanism for operating them.

The cam shaft has eleven cams affixed thereto. These reading from top to bottom, are numbered 58, 59, 60, 61, 62, 63, 64, 65, 66, 67 and 68. Each cam is held in fixed angular position by a key denoted 69 in each instance (Fig. 4 for example). Cams 62, 66, 67 and 68 are held against vertical displacement by sunk set screws denoted 70 in each instance (Fig. 24, for example). The cams 58, 59, 60 and 61 which are above the middle bearing have spacers 71, 72 and 73 between them and are topped and bottomed by screw fastened collars 74 and 75 to form a stable column. The spacers are cut to proper lengths from a piece of tubing of appropriate diameter and the resulting tube sections are cut out where the keys 69 are located (Fig. 13, for example). Cams 62, 63, 64, 65, 66 and 67 are situated between the middle and lower bearings. These cams are held against vertical displacement by spacers commonly designated 76 and by the set screws 70 in cams 62, 66 and 67. The thrust collar 51 occupies the space between cam 67 and the lower bearing 33.

All the keys 69 are in a line. The machine is considered to be at the beginning of its shelling cycle and the cam shaft is considered to be in its initial or starting position when these keys stand directly to the rear of the machine. The starting line of each cam is considered to be that line which passes from the center of the cam shaft through the center of the follower roller of that particular cam when the cam shaft is in its starting position. This line is marked 0° (zero degrees) in the drawings and rotates with the cam. The cam shaft rotates counter-clockwise. The angular position of all points in each cam are measured in degrees clockwise from the starting or zero degree line of that cam, to represent the angular distance the cam shaft is rotated before these respective points are coincident with the center of the follower roller.

The supply unit

Above the upper plate 6 of the framework and between the corner uprights 1 and 2 there are five horizontal plates which with connected parts are joined into a unit that is bodily removable from the remainder of the machine. This unit is called the supply unit. It supplies nuts to the feeding fingers and has other functions. The horizontal plates in it, from top to bottom, are the hopper base 77 (Figs. 1, 2, etc.) to which the hopper 78 is secured, the extractor plate 79, the first cage plate 80, the second cage plate 81 and the guard plate 82.

The guard plate rests at its rear end upon the upper plate 6 of the framework (Figs. 1, 2 and 23). It is bolted at 83, 83 to straps 84, 84 (Figs. 1, 21 and 23) which are rigidly secured to the bottom of the second cage plate 81. The parallel bolts 85, 85 (Figs. 2, 3, etc.) are rigidly and perpendicularly secured to the second cage plate 81. Their heads 86, 86 are underneath this plate and their bodies extend upwards to the nuts 87, 87 above the hopper base 77.

The hopper base 77 (Figs. 1, 2 and 3) has the holes 88, 88 whereby it is assembled on the parallel bolts 85, 85. Midway between these holes it has an annular opening 89. The border about this opening is seated on the annular flange 90 which is near the top of a vertical guide tube 91 the upper end of which occupies the opening. The lower end of this tube is seated in the annular recess 92 which is in the first cage plate 80, midway between the holes 93, 93 whereby the first cage plate is assembled on the parallel bolts 85, 85.

The compressed springs 94, 94 on the bolts 85, 85, between the first and second cage plates, keep the first cage plate 80 pressing resiliently against the guide tube 91, the guide tube pressing resiliently against the hopper base 77 and the hopper base pressing resiliently against the nuts 87, 87. The turning of nuts 87, 87 consequently effects vertical adjustment of the hopper base, the guide tube and the first cage plate, as a unit. When these nuts are turned care is used to keep the hopper base seated squarely against the annular flange 90 of the guide tube.

The plate-like hopper base 77 and the second cage plate 81 are notched at 95, 95 and 96, 96, respectively, to interlock with the inner flanges of uprights 1 and 2 (Figs. 2, 3 and 21). The extractor plate 79 and first cage plate 80 do not extend to these uprights. There are cut-outs 97, 97 in the inner flanges of the uprights, immediately above the normal position of the second cage plate (Fig. 2). When it is desired to remove the supply unit, the hopper base 77 is lifted to clear the uprights at the top, the second cage plate 81 being simultaneously drawn up into the space of the cut-outs 97, 97 so that the supply unit can be drawn forward out of the machine.

The segregating mechanism

The purpose of the segregating mechanism is to separate out one nut at a time from bulk. It is particularly desired, also, to up-end nuts as they are being segregated and to deliver them up-ended to the first cage at regular intervals. Furthermore, it is desired to segregate both large and small nuts with a minimum percentage of failures to deliver a nut and without delivering two nuts at a time.

The segregating mechanism includes the extractor plate 79 which has the holes 98, 98 (Figs. 2 and 4) by means of which it is assembled on the parallel bolts 85, 85 with a working fit. Midway between these holes the plate has an annular opening 99 which is large enough to receive the guide tube 91 and leave a clearance space 100 about the tube. Between and adjacent the holes 98, 98 lugs 101 and 102 rise from the top of the plate and have bosses 103, 103 secured to them at the same height above the plate and extending toward each other. At its upper end the vertical lug 101 extends horizontally outward across the adjacent bolt 85 and is provided with a hole 104 which receives the bolt with a working fit. This lug 101 guided by the bolt, prevents the plate 79 from tipping forward or rearward.

The substantially horizontal parallel arms 105 and 106 of the rocker shaft 15 are provided at their free ends with slots 107, 107 which receive the bosses 103, 103. The rocker shaft 15 has a section 108 (Figs. 4 and 5) of reduced diameter between the cross bar 12 and the parallel arm 105, and at its ends it has sections 109, 109 of still smaller diameter which are journaled in the parallel cross bars 12 and 13. An upstanding rocker 110 (Figs. 1, 4 and 5) comprises spaced arms 111 and 112 which are journaled at opposite ends of section 108 of the rocker shaft, and an upright tubular arm 113 in which is journaled the shaft 114 carrying a cam follower roller 115 affixed to its upper end. The roller is held against the upper end of the tubular arm by the washer 116 and nuts 117 which are mounted on the shaft 114 at the lower end of the tubular arm.

A spring 118 is stretched between the corner upright 3 and a lug 119 of the upright rocker 110. Another spring 120 is compressed between the flat faces of lugs 121 and 122 which are held together by the bolt 123 which goes through holes in these lugs and through the coils of the spring. The lug 121 is secured to the upright rocker 110. Lug 122 is secured at its lower end to arm 105 of the rocker shaft 15. It has an elongated cross section which is in line with the arm 105 except that the lug is twisted a quarter turn at its upper end to provide a flat face for the spring 120 there. The tension spring 118 normally keeps the roller 115 following the contour of cam 58. The compression spring 120 and bolt 123 normally keep the horizontal rocker shaft 15 moving with the vertical rocker 110. Thus, in operation, the extractor plate 79 is moved up and down along the bolts 85, 85, except when it encounters abnormal resistance as might result from clogging. Then its motion is stopped by virtue of either or both the springs 118 and 120 and damage to the machine is averted. The nuts 124 on bolt 123 can be manipulated to adjust the spaced relation between lugs 121 and 122 and thereby the height of the extractor plate 79.

Wide radial channels 125 located at quadrants on the nether side of the extractor plate 79 (Figs. 6, 13 and 14) are bottomed partly by the turnable actuating ring 126 and partly by the stationary holding ring 127. The channels are reduced in width at 128 and extend inward to the opening 99 which occurs in the holding ring as well as in the extractor plate.

The extracting pins 129 (see also Fig. 15) ride in the channels 125 which are lubricated, the wide heads 130 of these pins having a working fit in the wide portion of the channels and keeping the stems 131 from turning and binding in the narrow portions of the channels. On the nether side of the heads are bosses 132 which carry shoes 133 (or rollers) which ride in lubricated cam grooves 134 in the upper surface of the actuating ring 126. The shoes 133 are situated where the cam grooves pass under the radial channels 125. When the actuating ring 126 is turned the point of juxtaposition changes and the shoes are moved accordingly, carrying the extracting pins 129 inward or outward with them.

In Figure 13 the actuating ring is in the extreme counter-clockwise position of its movement. When it stands in this position the outer ends of the cam grooves are in juxtaposition with the outer portions of the channels and the shoes 133 riding in the cam grooves hold the extracting pins in the outermost position. Figure 14 shows the actuating ring in the extreme clockwise position of its movement. When it stands in that position the inner portion of the cam grooves are in juxtaposition with the inner portions of the wide radial channels and the shoes hold the pins in the innermost position. When the extracting pins are in this position the opening between them is smaller than the smallest nut to be shelled.

The holding ring 127 is held to the plate 79 by screws 135 (Fig. 13). It has a flange 136 (Fig. 6) which underlaps the flange 137 of the actuating ring, thereby holding it against the plate 79. The flange of each ring has a working fit in the other ring, thus producing a bearing for the turning of the actuating ring.

The actuating ring has a tooth space 138 (Fig. 13) into which is fitted the tooth 139 of the rocker 140 which is pivoted on the pivot rod 29 by means of spaced bearing members 141 and 142 (Figs. 13 and 26). The lowermost bearing member 142 occupies the slot 27 in the clip 23 and so sustains the rocker at the proper altitude. A spring 143 is stretched between the toothed end of the rocker and the anchor rod 16. This spring keeps the follower roller 144 which is at the other end of the rocker, against the cam 59, except in so far as the closing movement of the extracting pins is limited by nuts between them.

Figure 7:
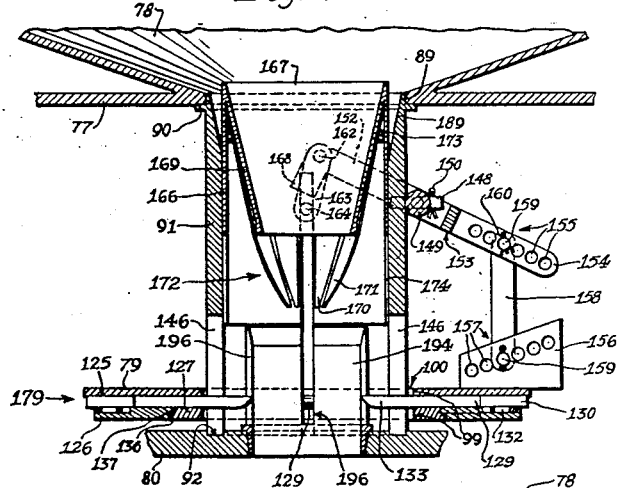
Figure 7 is a view similar to Figure 6, but with the extractor in its lowest position and the shaker in its highest position.

The rocker 140 has a horizontal back-and-forth motion which operates the actuating ring 126 and thereby moves the extracting pins 129 inward and outward. The parallel arms 105 and 106 of rocker shaft 15 have an up and down motion and move the plate 79 and its connected parts, including the extracting pins, up and down. During the up and down motion the actuating ring 126 remains in mesh with the tooth 139 owing to the width of that tooth (see Fig. 1). This tooth and the adjacent portion of the actuating ring are covered by a dirt shield 145 (Figs. 1 and 4) affixed to the top of plate 79 from which it rises to a height sufficient to clear the tooth and then extends out over the tooth to cover it. The shield 145 and plate 79 protect the working parts beneath them from dirt which escapes through slots 146, 146 and 147, 147 in the guide tube 91 (Figs. 7 and 13).

The extracting pins 129 pass through the slots 146, 146 and 147, 147 which are at the same quadrants as the pins and of sufficient width for free motion of the pins therethrough. All four slots extend from the bottom of the tube but the two slots 146, 146 which are opposite each other in the tube are shorter than the other pair of opposite slots 147, 147. Above one slot 146 a pin 148 (Figs. 4 and 6) is secured to the guide tube, for instance by driving it into a hole in the tube. On this pin an equalizing bar 149 is held in place by any suitable key 150. The ends 151, 151 of the equalizing bar are of reduced diameter to form bearing members, and pivotally carry spaced dual arms 152, 152 of a rocker 153 which has a single arm 154 counterpoised to and in the same plane as arms 152, 152. The arm 154 has a series of holes 155. A bracket 156 secured to the top of plate 79 has a similar series of holes 157 below the series 155. A link 158 has bosses 159, 159 near its opposite ends, which bosses are put through vertically coincident holes in the arm 154 and the bracket 156 and secured by cotter pins 160 and 161. When the plate 79 is in its uppermost position the two series of holes 155 and 157 are parallel.

In the free inner ends of the dual arms 152, 152 are journaled the bosses 162, 162 which are at the upper ends of links 163, 163 (Figs. 1, 4, 6, 7, and 8). The lower ends of links 163, 163 have long bosses 164, 164 which pass through the slots 147, 147 and through holes 165, 165 in the side wall 166 of the shaker 167.

When the parallel arms 105 and 106 move the plate 79 up and down, motion is transmitted by link 158 to the single arm 154 of the rocker 153. This moves the dual arms 152, 152 oppositely and they transmit their motion through the links 163, 163 to the shaker 167. The shaker therefore moves in a direction opposite to that of plate 79.

The links 163, 163 are partly overlapped on the outside by wings 168, 168 on the parallel arms 152, 152, to hold them adjacent to the guide tube.

Figure 9:
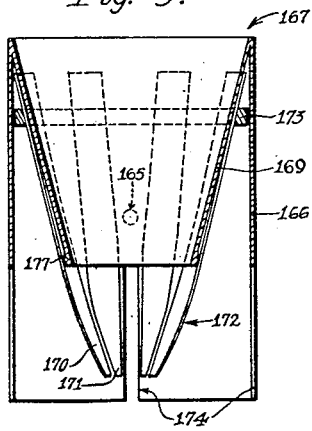
Figure 9 is a detail vertical section of the shaker.
Figure 10:
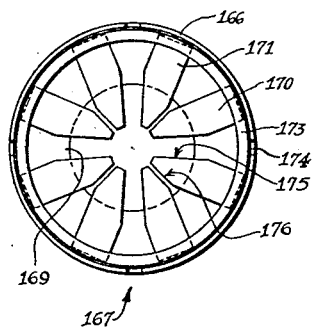
Figure 10 is a bottom plan view of the shaker.
Figure 8:
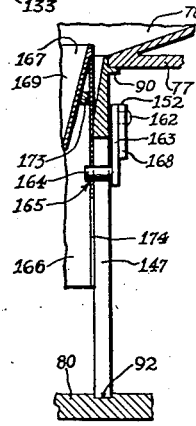
Figure 8 is a fragmentary vertical section taken on line 8—8 of Figure 4.

The shaker is comprised of the tubular side wall 166 (Figs. 9 and 10) a funnel portion 169, four pairs of curved spring leaves 170 and 171 forming a nut receiving spring pocket 172 below the funnel, and a spring holding ring 173. The side wall 166 of the shaker is preferably of different metal than the guide tube 91 to reduce wear. These surfaces are not lubricated. The shaker as well as the segregating plate and its connected parts are preferably of light construction to facilitate rapid reciprocation.

The inlet opening at the upper end of funnel 169 has a diameter approximately equivalent to the length of the longest nut to be shelled. The outlet opening at the lower end of the funnel has a diameter a little larger than the maximum nut diameter to be received. The slope of the funnel is moderate enough to prevent nuts from wedging tight in the funnel during its reciprocation. There is a central opening smaller than the diameter of the smallest nut to be shelled, between the spring leaves at the bottom of the spring pocket. The side wall 166 has slots 174 at quadrants corresponding in width and angular position to the slots of the guide tube. These slots begin at the bottom of the side wall and extend to a height corresponding to the bottom of the funnel. They admit the extracting pins and are wide enough to provide ample clearance therefor. The holes 165, 165 are in a line with an opposed pair of these slots and are approximately midway of the length of the shaker.

Figure 11:
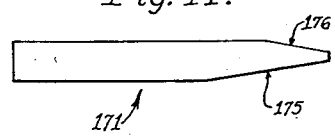
Figure 11 is a plan view of one of the spring leaves of the shaker.
Figure 12:
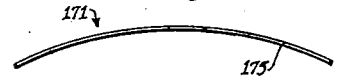
Figure 12 is a side view of the spring leaf of Figure 11.

The shaker is readily manufactured by making the funnel and side wall as separate parts and uniting them after the spring leaves have been properly mounted on the funnel member. The four pairs of spring leaves 170 and 171 are preferably (as in the present instance) cut from a clock spring of proper width and thickness and of finished heat treatment. They are cut in right hand and left hand fashion to a pattern shown in Figure 11 and are given a natural curvature as indicated in Figure 12.

These spring leaves are assembled on the outside of the funnel so that right and left hand spring leaves are adjacent and so that their natural curvature is directed inward. They are assembled so their transverse centers are equidistant from each other and so that the four wide spaces formed between the pairs of spring leaves by the diagonals 175 (Fig. 11) will be aligned with the slots 174 in the side wall of the shaker. These spaces are sufficiently wide to admit the extracting pins without conflict with the spring leaves. The diagonals 176 (Fig. 11) prevent conflict between the lower portions of adjacent spring leaves.

The ring 173 is drawn tightly over the spring leaves, clamping them against the funnel wall so tightly that only that part of each spring leaf which projects below the ring is flexed when nuts are extracted from the spring pocket. The ring is secured in position by soldering it to the funnel, in the spaces between spring leaves. The ends of the spring leaves which project above the ring 173 are soldered to the funnel. The soldering is done in these regions without impairing the flexing quality of the spring leaves and cannot be broken loose by the flexing of the spring leaves.

When the ring 173 is drawn over the spring leaves they are pressed against the lower end of the funnel with a strong initial pressure due to their natural curvature. The presence of this initial pressure means that there is less variation in the "pull" required to extract nuts of different diameters and that more flexible spring leaves can be used. The spring leaves used in the present instance are sufficiently flexible to withstand the repeated bending strains imposed by the extracting operation and yet stiff enough (owing to the initial pressure) to prevent any nut from passing through the spring pocket except when extracted by the extracting pins.

Below the funnel the spring leaves retain their natural curvature inward in forming the nut pocket. The funnel is thickened at the outlet opening in the form of an annular ring 177 which makes the adjacent diameter of the pocket appreciably greater than that of the outlet opening of the funnel. This greater diameter and the length of the spring pocket permit all nuts which can pass through the outlet of the funnel, to drop far enough into the spring pocket to be extracted by the extracting pins (Fig. 16). But the spring pocket is not large enough to contain more than one nut and the tapered or rounded end of a second nut. Any nuts too large to pass-through the outlet of the funnel are removed previous to shelling by passing the nuts through a sieve having round holes of slightly smaller diameter than the outlet opening of the funnel.

Figure 6:
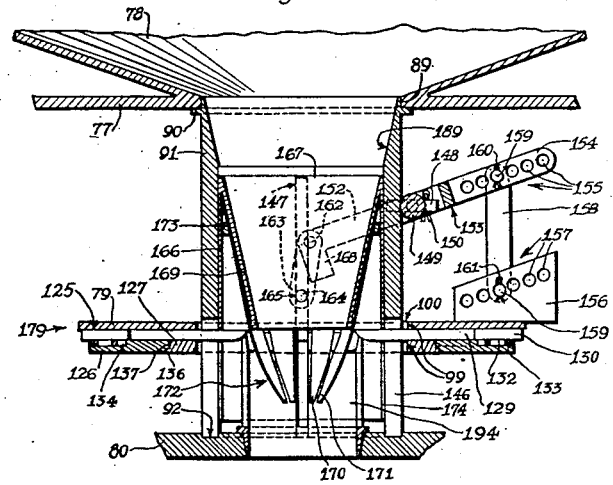
Figure 6 is a vertical section of the segregating mechanism, taken on line 6—6 of Figure 4.

When the machine is in its starting position the follower roller 115 rests upon the heel 178 of cam 58. This means that the extractor 179 comprising the plate 79 and the parts carried by the same is at rest in its uppermost position, as shown in Figure 6. The extractor and shaker remain at these respective positions while the heel traverses the roller to the 113° line 180 where the rise begins. Then the extractor moves down and the shaker moves up while the rise traverses the roller 115 to the 155° line 181 where the crest begins. Then the extractor remains down and the shaker remains up while the crest traverses the roller to the 303° line 182 where the fall begins. Then the extractor moves up and the shaker moves down while the fall traverses the roller to the 343° line 183 where the heel begins. These positions and movements of the shaker and extractor are indicated in circles I and II, respectively, in Figure 75.

When the machine is in its starting position the follower roller 144 is on the crest of cam 59 (Fig. 13) and the actuating ring 126 is in the extreme counter-clockwise position of its movement and is holding the extracting pins 129 in their outermost position. The crest extends clockwise to the 73° line 184 where the fall begins. The actuating ring 126 is turned clockwise and the extracting pins move inward when the fall of the cam traverses the roller. If the mid-section of a large nut is in the path of the extracting pins (Fig. 16) the closing movement of these pins will be arrested before the actuating ring 126 has turned to the extreme clockwise position of its movement and the spring 143 will not move the roller 144 down to the heel of the cam. If a small nut is in the bottom of the spring pocket the extracting pins may be permitted to close all the way (Fig. 17) and the spring 143 will move the roller 144 all the way down the fall which ends on the 113° line 185 where the heel of the cam begins.

If the extracting pins have been completely closed they will remain closed while the heel traverses the roller to the 143° line 186 where the rise begins, and will begin opening when the rise begins to traverse the roller. If the closing movement of the extracting pins has been arrested by a nut $a$ as shown in Figure 16, and the roller has accordingly followed only the first part of the fall of the cam, the roller will again follow only the last part of the rise which extends to the 184° line 187 where the crest begins. The earlier the closing movement of the extracting pins is arrested by a nut in their path, the later the nut will be released by the opening of the pins, provided, of course, that the grip of the pins on the nut has not slipped.

The opening and closing movements and the open and closed positions of the extracting pins are indicated in circle III of Figure 75, as they occur when no nut arrests the closing movement of the extracting pins. When the closing movement is arrested by a nut the opening and closing periods are shorter than indicated in circle III and the gripping period between them is lengthened accordingly.

Each time the shaker and extractor have moved closest together the extracting pins come in to close above or against the sides of the nut (if any) in the spring pocket of the shaker, whereupon the shaker and extractor move relatively away from each other forcing this nut through the elastic terminal opening between the spring leaves.

The spring leaves will ride relatively over this nut with pressure against the sides of the nut and will "flip" the nut downward as soon as this pressure is against the tapered or rounded upper end of the nut, provided the nut is not held fast by the extracting pins. If the nut is held fast by the extracting pins until it is completely withdrawn from the spring pocket it will simply drop when the extracting pins open. If the tapered upper end of the nut is still between the ends of the spring leaves when the extracting pins open, the nut will "flip" out of the pressing spring leaves to complete the extraction.

The present segregating mechanism is adapted to large and small nuts. When a large nut $a$ (Fig. 16) is in the spring pocket the extracting pins obtain an adequate grip along the sides of the nut. In this instance the extracting pins close only partly and therefore do not begin opening at the 143° line indicated in circle III of Figure 75, but open after the shaker and extractor have moved fully apart which occurs at the 155° line (circles I and II, Fig. 75).

The possibility of two nuts coming through the spring pocket in a single extracting cycle is remote. When a small nut $b$ is in the bottom of the spring pocket (Fig. 17), and a second small nut $c$ gets a tapered end below the level of the extracting pins, the extracting pins in closing will ordinarily push the second nut upward as, for instance, to the dotted position $c'$. If the second nut is initially carried downward in the grip of the extracting pins along with the first nut, it will be stopped when it encounters the spring leaves forming the spring pocket. The relative strength of the spring leaves and of the spring 143 from which the extracting pins get their grip is such that no nut is held securely enough to be forced through the spring pocket unless the extracting pins have either closed behind it as in the case of nut $b$ in Figure 17 or have grasped it above its tapered or rounded lower end as in the case of nut $a$ in Figure 16.

When a nut is extracted the spring leaves will return to normal immediately behind the nut as it leaves the spring pocket, reestablishing the nut receiving pocket to contain the next nut in the normal way. If the next nut is "stuck" in the funnel and unable to move into the spring pocket when the lowest nut is extracted, it will be tossed up by the ensuing upward movement of the shaker. This upward movement of the shaker is divisible into a period of acceleration and a period of deceleration. When the shaker is moving at the proper speed it decelerates faster during the latter part of its upward stroke than the nuts in the funnel are decelerated by gravity. Hence these nuts travel upward farther than the shaker. This tossing up of the nuts by the shaker thoroughly loosens and agitates them. During the ensuing rest period of the shaker the nuts have time to drop back to the funnel bed and the lowermost nut has time to descend into the spring pocket.

The funnel then moves from its upper to its lower position more rapidly than the nuts can follow by gravity. In other words, the funnel as it descends jerks itself loose from the nuts it contains. This action gives the nuts further opportunity to rearrange themselves in the funnel and if no nut has previously entered the spring pocket, there is now another chance for this to occur. The funnel rests in its lowermost position for sufficient time to permit the lowermost nut to drop to the bottom of the spring pocket and thereafter to permit the extracting pins to move through the spaces between the spring leaves and grasp this nut. The extracting pins close immediately below the outlet opening of the funnel. The inner ends 188 (Fig. 15) of the extracting pins are tapered to be longest at the top and moderately pointed.

The shaker is virtually non-cloggable because any nut which lodges temporarily above the outlet opening of the funnel will be tossed up and upended by the reciprocation of the funnel, and any nut which is as much as one half below the outlet of the funnel will be extracted by the extracting pins. During its reciprocation the upper end of the shaker travels slightly above the entrance of the guide tube 91 and thereby prevents nuts from clogging this entrance. A tapered side 189 at the upper end of the guide tube 91 prevents nuts from becoming packed in the tube during the upward movement of the shaker and thereby clogging the tube.

As previously stated, the hopper 78 is secured to the base 77. The floor of the hopper has a sufficient slope toward the entrance opening of the guide tube so that nuts will move to the opening by gravity, aided by the vibration of the machine. A shallow layer of nuts is maintained in the hopper to facilitate the proper functioning of the shaker. The supply of nuts may be replenished manually or by any suitable mechanical means.

The proper agitating action of the shaker depends on the shaker having the proper velocity in its upward and downward movements. This velocity can be varied by changing the rotating speed of the cam shaft. Conversely, a proper agitating action can be had at a selected cam shaft speed, by properly designing the length of the "stroke" of the shaker and the angular distance of the cam segments which produce the upward and downward movements.

In the instant machine, means is provided for adjusting the stroke of the shaker to a range of cam shaft speeds. This consists of the series of holes 155 and 157 and the link 158 which may be shifted along opposite pairs of holes in these series to increase or decrease the stroke of the shaker. Since the two series of holes are parallel when the shaker is in its lowermost position (Fig. 6), the change in throw is accomplished without changing the relationship between the height of the shaker and the extracting pins at the time when the extracting pins close to grasp a nut. The change in the stroke of the shaker occurs, instead, at the upper end of the shaker's movement.

The relative movement between the shaker and extractor is equivalent to the sum of the movements of the two. In the present instance it is longer than ordinary long nuts, but shorter than extremely long nuts. The relative movement may be accomplished by moving the shaker alone and leaving the extractor stationary, but in the instant machine the relative movement is accomplished by almost equal movement of the two so as to avoid such a long shaker stroke.

*The first cage*

The first cage plate 80, with attached parts, carries the cage bars 190 which form the first nut cage 191 (Figs. 2, 18, 19 and 20). This nut cage receives the nuts from the segregating mechanism, mostly in an upended condition, upends and straightens them further and drops them into the second cage at the proper time.

The first cage plate 80 contains the annular recess 92 on its upper surface, the annular opening 192 and a slotted annular rib 193 on its lower surface. The centers of these three annular formations are midway between the holes 93, 93 by means of which the plate is assembled on the parallel bolts 85, 85.

The annular recess 92 contains the guide tube 91 already fully described. The annular opening 192 contains an upright tubular nut guide 194 the principal purpose of which is to guide extracted nuts through the opening and to provide a guard for the extracting pins 129. The nut guide has an annular flange 195 resting upon the top of the plate 80 and is vertically slotted above this flange to receive the extracting pins. These slots 196 are at quadrants corresponding to the slots in the guide tube 91 (Fig. 13) and the slots 174 in the side wall of the shaker (Fig. 6). The extracting pins 129 work through all three sets of slots. The upper inner portion of the nut guide has a bevel 197 (Fig. 19) which provides additional room for the spring pocket 172 of the shaker as may be seen in Figure 6.

The slotted annular rib 193 meshes with the annular tongue 198 of the holding ring 199 and thereby gives a true concentric position to the holding ring which is secured to the plate 80 by means of screws 200.

The holding ring has an annular flange 201 which matches with an annular recess 202 in the actuating ring 203 which is supported by this flange and is turnable on the holding ring.

The first cage plate is radially slotted on its nether side to form the channels 204 in which the horizontal portions 205 of the cage bars ride. The remaining part of the cage bars is bent sharply downwardly to form the funnel-like nut cage 191. The cage bars are preferably of square cross section. The nut engaging surfaces of the cage bars are perfectly smooth to facilitate sliding.

To the nether side of the horizontal portions 205 of the cage bars stabilizing plates 206 are rigidly secured. These plates ride in a suitable annular space 207 between the plate 80 and the actuating ring 203 and are projected partly beyond that space when the cage 191 is open.

Bosses 208 on the nether side of plates 206 carry shoes 209 which are similar to the shoes 133 of the extracting pins (Fig. 15), and which ride in cam grooves 210 on the upper side of the actuating ring.

When the actuating ring is turned clockwise and counter-clockwise the points where the cam grooves pass under the radial channels are moved inward and outward, respectively. The shoes are located at these points and are therefore moved inward and outward carrying with them the stabilizing plates and cage bars. There is simultaneousness and uniformity in the motion of the several cage bars. The stabilizing plates 206 keep the cage bars from wobbling. The nut cage remains substantially symmetrical during its closing and opening.

Figure 18:
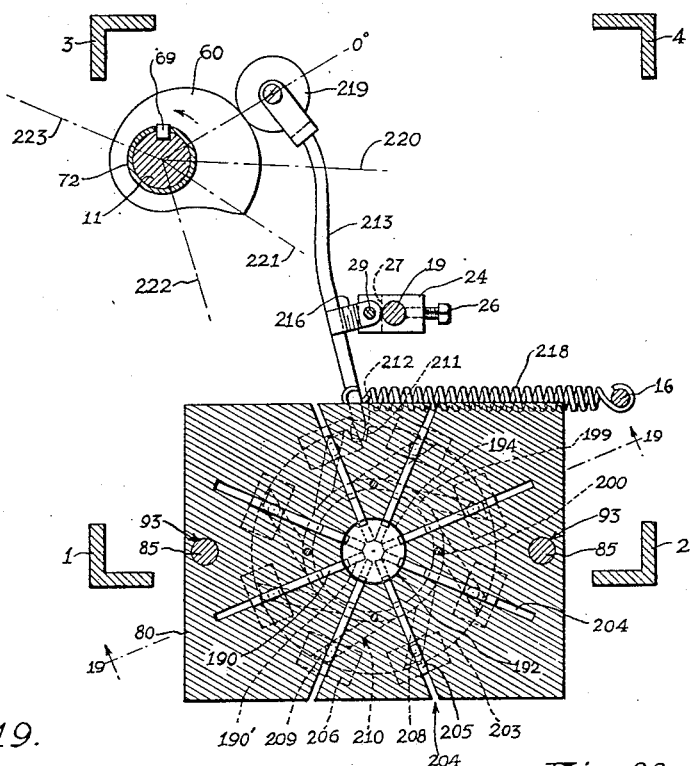
Figure 18 is a horizontal section taken on line 18—18 of Figure 1, showing the first cage and the mechanism for operating it.
Figure 19:
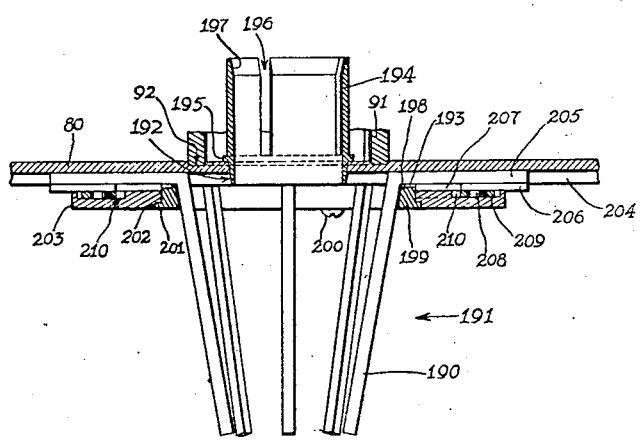
Figure 19 is a vertical section of the first cage, taken on line 19—19 of Figure 18.
Figure 20:
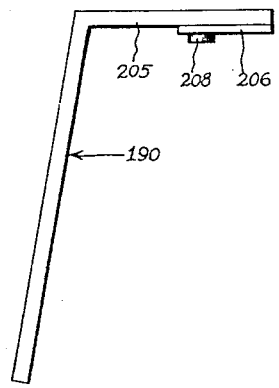
Figure 20 is a side elevation of one of the bar units of the first cage.

When the actuating ring is in the extreme counter-clockwise position of its movement the cage bars are in the open position which is virtually the same as the position shown in Figures 18 and 19. When the actuating ring is in the extreme clockwise position of its movement the cage bars are held in the inward position 190' shown dotted in Figure 18 and the cage is said to be closed. When the cage is open the terminal opening at the bottom is sufficiently large to permit any nut which is to be shelled, to drop out. When the cage is closed, the opening at the top is large enough for any nut to drop into the cage but the bottom opening is too small for the nut to pass through.

The actuating ring 203 has a tooth space 211 along its outer edge, which contains the tooth 212 of the rocker 213 with a working fit. The plate 80 completely covers the tooth as well as all lubricated portions of the cage mechanism thereby providing protection from the dirt which "sifts" down from the segregating mechanism above. The radial channels are protected from dirt at their inner ends by the nut guide 194 which is tapered below the flange 195 to give the cage bars maximum room for operation. The plate 80 is partially cut away at 215 along the rear at the top (Fig. 1), to provide a clearance space under the wide tooth 139 so that this plate can be raised when the supply unit (which includes this plate) is to be raised and removed from the machine as previously described.

The rocker 213 is pivotally connected to the pivot rod 29 by means of spaced bearing members 216 and 217 of which member 217 (Fig. 26) is carried in the horizontal slot 27 of the bearing clip 24 to hold the rocker at the proper altitude.

A spring 218, stretched between the anchor rod 16 and the toothed end of the rocker with appropriate tension, keeps the roller 219, at the other end of the rocker, against the cam 60 except when the first cage may be prevented from closing, due to accidental clogging. In such an instance the tension of the spring 218 is insufficient to damage the cage.

When the machine is in its starting position the follower roller 219 is on the rise of cam 60, which continues to the 33° line 220 where the crest begins. When the rise is traversing the roller the actuating ring 203 is being turned counter-clockwise and the cage 191 opens. The cage remains open while the crest traverses the roller to the 63° line 221 where the fall begins. The actuating ring 203 is turned clockwise and the cage is closed while the fall traverses the roller to the 103° line 222 where the heel begins. The cage remains closed while the heel traverses the roller to the 235° line 223 where the rise begins. These operations of the first cage are indicated in circle IV of Figure 75.

The time when a nut drops into the first cage varies considerably according to whether it "flips" out of the spring pocket as the extractor begins to move down or whether it drops by gravity after the extractor has reached its lowermost position. When the machine is running rapidly the cam 60 will rotate a considerable angular distance before a nut dropping by force of gravity alone will move from a position between the extracting pins to a landing position in the first cage. A comparison of circles II and IV of Figure 75 shows that the first cage is already closed and ready to receive the nut when the extractor begins to move down, and a comparison of circles III and IV shows that it remains fully closed for 51 degrees after the extracting pins have completely opened. This means that the first cage is closed during the entire period during which a nut may drop into it.

The cage bars form a steep funnel-like nut pocket which has not only the tendency to give nuts a straight upend attitude as they drop into it but which has an even greater tendency to give nuts a straight upend attitude as they slide down during the gradual opening of the cage which occurs over a period of 158°. While the cage bars are stationary the tendency of a nut to lower its center of gravity by assuming a straight upend attitude is limited by the friction between the nut and the bars. When the bars open gradually and the nut slides down between them the friction on one side of the nut has a tendency to roll the nut, which tendency is substantially offset by the tendency of friction on the opposite side. With the coefficient of sliding friction independent of velocity the nut is free to slide more rapidly on one side than on the other and thus turn to the straight upend position.

The tapered nut cage is a nut straightening device which is suited to both high and low speed operation. It is opened at a gradually increasing rate while the nut slides down the cage bars. This means that the nut has attained some velocity by the time it passes through the outlet opening of the cage. This velocity is called the outlet velocity. The outlet velocity of a particular nut is proportional to the rotating speed of the cam shaft. Hence the time the nut requires to drop from the first cage to its landing position in the second cage is constant in terms of angular distance of cam shaft rotation, except as affected in the interim by acceleration due to gravity. This means that the second cage will receive the nut at the proper time, in terms of cam shaft rotation, at all reasonable operating speeds.

*The second cage*

The second cage plate 81, with attached parts, carries the cage bars 224 which form the second nut cage 225 and the concave loading anvil 226 (Figs. 2, 21 and 22). The second cage receives each nut dropped by the first cage, straightens it further, drops it upended into the feeding finger pocket at the proper time and then closes, whereupon the feeding fingers engulf the nut with the aid of the concave loading anvil.

The second cage plate has the annular opening 227 and the slotted annular rib 228, both on centers midway between holes 229, 229 which receive the bolts 85, 85. The annular rib 228 meshes with the annular tongue 230 of the holding ring 231 and thereby gives a true concentric position to the holding ring which is secured to the plate 81 by means of screws 232. The holding ring has an annular flange 233 which matches the annular recess 234 in the actuating ring 235 which is supported by this flange and is turnable on the holding ring.

The second cage plate 81 is radially slotted on its nether side to produce channels 236 in which the horizontal portions 237 of the cage bars 224 ride. Inward of the horizontal portions the cage bars are bent sharply downward at 238 to the neck 239 to form the nut cage 225, and then outward at 240 to form the concave loading anvil 226. To the nether side of the horizontal portions 237 of the cage bars stabilizing plates 241 are rigidly secured. These plates ride in a suitable annular space 242 between the actuating ring 235 and the plate 81, and also project partly beyond the actuating ring when they are in their outermost position. Bosses 243 on the nether side of the stabilizing plates 241 carry shoes 244 which are similar to the shoes 133 of the extracting pins and which ride in cam grooves 245 on the upper side of the actuating ring.

When the actuating ring is turned counter-clockwise and clockwise the points where the cam grooves pass under the radial channels is moved outward and inward, respectively. The shoes are located at these points and are therefore moved outward and inward carrying with them the stabilizing plates and cage bars. There is simultaneousness and uniformity in the motion of the cage bars. The nut cage remains substantially symmetrical during its opening and closing.

The actuating ring 235 has a tooth space 246 along its outer edge, which contains the tooth 247 with a working fit. The plate 81 covers the tooth as well as all lubricated portions of the cage mechanism, thereby providing protection from dirt.

The rocker 248 is pivotally connected to the pivot rod 29 by means of spaced bearing members 249 and 250 of which member 250 (Fig. 26) is carried in the horizontal slot 27 of the bearing clip 25 to hold the rocker at the proper altitude. A spring 251 is stretched between the anchor rod 16 and the toothed end of the rocker with appropriate tension to keep the roller 252 at the other end of the rocker against the cam 61 except when the second cage may be prevented from closing, by accidental clogging. In such an instance the tension of the spring 251 is insufficient to damage the cage.

When the machine is in its starting position the roller 252 is on the heel of cam 61. The heel continues to the 73° line 253 where the rise begins. When the heel is traversing the roller the actuating ring is in the extreme clockwise position of its movement and the second cage is closed so no nut can drop through the neck 239 from above and no nut can be pushed through the neck from below. The actuating ring 235 turns counter-clockwise and the cage opens as the rise traverses the roller to the 213° line 254 where the crest begins. The cage remains open while the crest traverses the roller to the 235° line 255 where the fall begins. The actuating ring 235 moves clockwise and the cage closes while the fall traverses the roller to the 268° line 256 where the heel begins. These operations are indicated in circle V of Figure 75.

The guard plate

The purpose of the guard plate 82 (Figs. 1, 2, 22 and 23) previously referred to is to provide an enclosed nut path, to guide the feeding fingers and the lower ends of the second cage bars, and to externally protect the shelling mechanism beneath it against dirt and miscellaneous objects. To this end the guard plate is comprised of a horizontal sheet 257, a pendent tubular shield 258 and a vertical inner tubular portion 259.

The tubular shield 258 has a dust tight connection with the sheet 257. It passes below the upper plate 6 of the framework through the cut-out 260 and terminates in a telescoping fashion within the annular dirt collecting shield 261 which will be further described presently.

The inner tubular portion 259 extends both above and below the sheet 257. Its bore is a little larger than the diameter of the largest nut to be shelled. At its upper end is a slotted flange 262 which is situated a little below the neck 239 of the cage bars.

In the instant machine there are eight equally spaced cage bars 224 in the second cage and four feeding fingers 263 at quadrants midway between cage bars. The tubular member 259 is slotted from top to bottom at the quadrants where the feeding fingers are, and extends down far enough so these slots 264 will safely contain the feeding fingers when they are in their lowermost position. At the lower end the slots 264 are widened by rounding off corners. The flange 262 is cut away at an outward opening angle from these slots to provide an outwardly enlarging clearance 265 for each feeding finger. The sheet 257 is likewise slotted at an outwardly enlarging angle from the slots 264 to the inner diameter of the pendent tubular shield 258 to form an outwardly enlarging clearance 266 for each feeding finger.

The lower ends of the cage bars 224 are carried in and radially spaced by slots 267 which begin at 268 near the outer edge of the flange 262 and end in the tube at a uniform level 269 a short distance above the lower ends of these cage bars. The cage bars can take their outermost positions freely but when they are closed they engage the tubular member 259 at the lower ends of slots 267 with a pressure slightly greater than the pressure with which nuts are pressed against the bottom of the loading anvil 226 by the feeding fingers. This engagement at the uniform level 269 makes the loading anvil symmetrical when closed and keeps it from yielding when nuts are pressed against it from below by the operation of the feeding fingers.

The nut track

Figure 28:
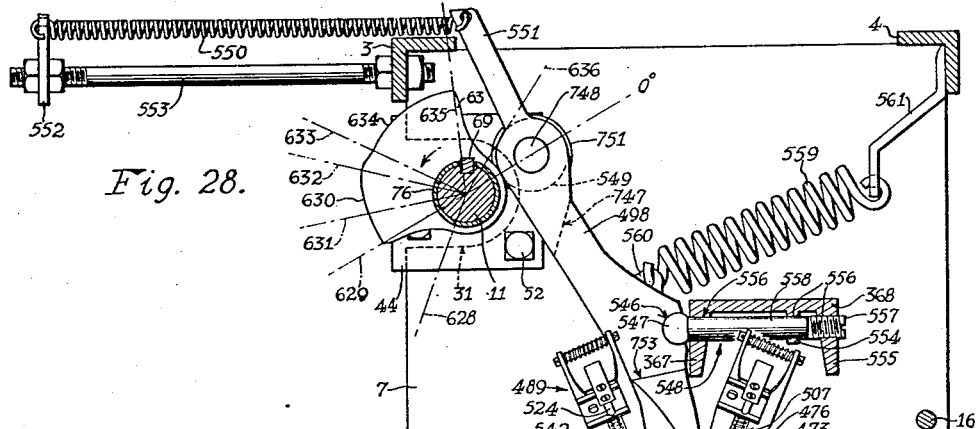
Figure 28 is a horizontal section taken substantially on the line 28—28 of Figure 1, showing the top girdling pins in the open position and the mechanism for operating them.
Figure 29:
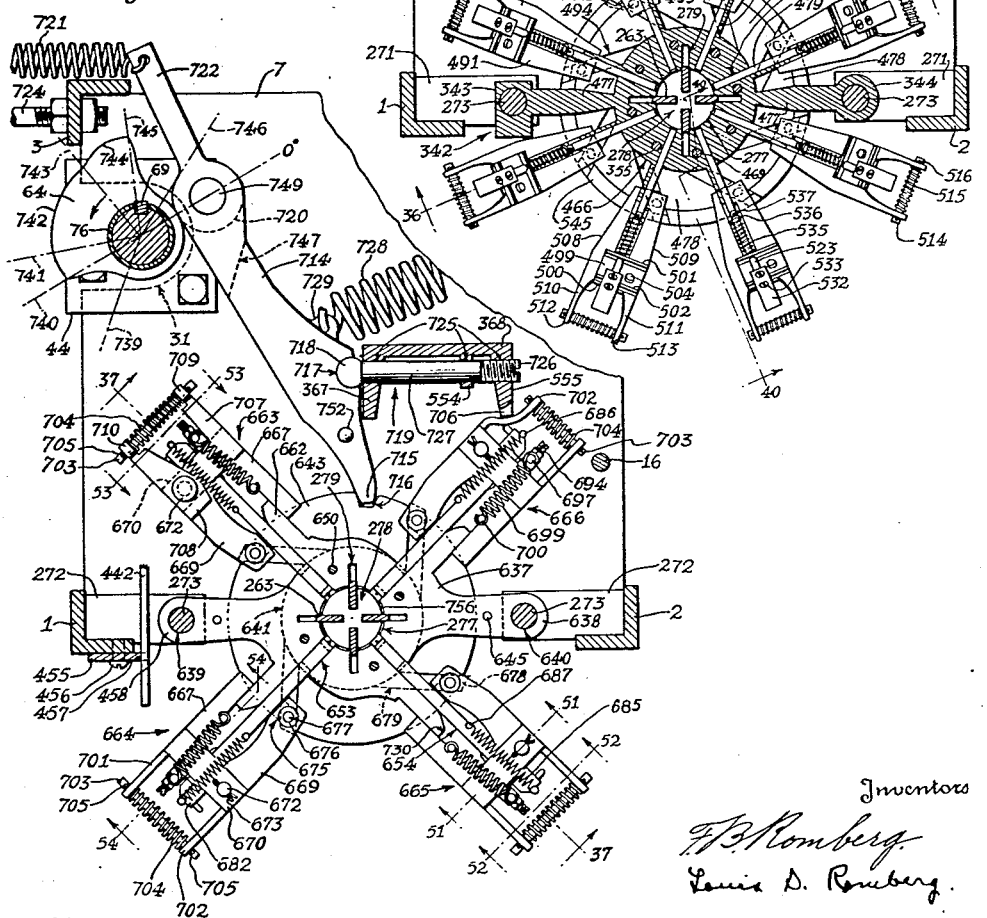
Figure 29 is a horizontal section taken substantially on the line 29—29 of Figure 1, showing the cracking pins in the open position and the mechanism for operating them.

There are three horizontal pairs of parallel lugs extending toward each other on uprights 1 and 2. The first of these pairs 270, 270 is above the upper plate 6 of the framework (Figs. 2 and 21). The other two pairs 271, 271 and 272, 272 are nearly midway between the upper plate 6 and lower plate 7 and are close together (Figs. 2, 28 and 29). These three pairs of lugs and the upper and lower plates are perforated to receive the lower parallel bolts 273, 273 which are aligned with the upper parallel bolts 85, 85 and which have their heads resting upon the lugs 270, 270. The supply unit including the upper bolts 85, 85 is removed from the machine when the lower parallel bolts are to be withdrawn.

The course which nuts regularly pursue through the machine is referred to as the "nut track" of the machine. It is considered to be as large as the openings and other spaces which nuts pass through or occupy during their regular course through the machine. In the instant machine the nut track is straight and vertical, and affords a line of vision (when not occupied by nuts) for inspecting the interior of the machine. The upper parallel bolts 85, 85 are the principal members on which the mechanisms operative along the upper part of the nut track are assembled and the lower parallel bolts 273, 273 are the principal member on which the mechanisms operating along the lower part of the nut track are assembled.

One or more shelling assemblages are employed in our machine. In the present instance, three assemblages are employed. These are the upper shelling assemblage 274, the middle shelling assemblage 275 and the lower shelling assemblage 276. Each of these assemblages has a central opening designated 277 in each instance and which is midway between the parallel bolts 273, 273 and large enough to freely receive the largest nut to be shelled, in the upended position. These openings 277 define that part of the nut track which is called the shelling chamber 278.

There are slots 279 on the same quadrants as slots 264, in each of the three shelling assemblages, to provide working spaces for the feeding fingers. These slots extend radially from the shelling chamber.

The feeding fingers

There is a cut-out in the lower plate 7, comprising a circular opening 280 (Figs. 2 and 63) midway between the bolts 273, 273, and a pair of clearance pockets 281, 281 extending therefrom on the sides nearest the parallel bolts. The vertical guide tube 282 (Figs. 1, 2, 61 and 63) has a section 283 of reduced external diameter at its upper end which is assembled in the opening 280 so that the shoulder 284 immediately below this section is seated against the bottom of the plate 7. The lower end of the tube 282 is rigidly secured to a horizontal base 285 which has an opening 286 to receive it, midway between the pair of holes 287, 287 by means of which the base is assembled on the parallel bolts 273, 273. When thus assembled the base is held against downward displacement by split pins 288, 288 in the parallel bolts.

The tube 282 has a smooth, straight bore which contains the tubular feeding finger base or carriage 289 with a working fit (Figs. 2, 61, 62 and 63). The tube is preferably of a softer metal than the carriage, to reduce wear. The carriage is operated without lubricating the tube and is therefore driven by an arrangement which eliminates pressure between the carriage and the tube.

Lugs 290, 290 on opposite sides of the upper end of the carriage 289 ride in vertical slots 291, 291 of the tube 282, which are on a common center line with the clearance pockets 281, 281 and the bolts 273, 273. The lugs 290, 290 have bosses 292, 292 on which the suitably perforated upper ends of the pair of substantially vertical links 293, 293 are mounted. Split pins 294 hold these links to these bosses and to the bosses 295 on which the suitably perforated lower ends of these links are assembled.

The bosses 295, 295 are secured to a pair of substantially horizontal arms 296, 296 of an equalizing fork 297 which is pivotally mounted on the cylindrical section 298 of the rocker arm 299, by means of suitable holes 300, 301 in the transverse portions 302 and 303 of the fork, and secured against endwise displacement by the split pin 304 and by the shoulder 305 created by the end of the rectangular section 306 of the rocker arm.

The rocker arm 299 is secured to the rocker shaft 307 (Figs. 1, 61 and 64) which has end sections 308 of reduced diameter which are journaled in the strap 309 and in a link 310 bolted to a strap 311 at 312. The strap 311 is rigidly secured to the bottom of the lower plate 7 adjacent to the upright 3. It is thinner and narrower than the strap 309, to avoid conflict, and is braced near the bottom by a link 313 which is rigidly secured to the strap and to the adjacent leg 5 in a spanning position.

The rocker shaft 307 has an upright tubular arm 314 in which is journaled the shaft 315 carrying the roller 316 affixed to its upper end. The roller is held against the upper end of the tubular arm by the washer 317 and nut 318 which are mounted on the shaft 315 at the lower end of the tubular arm. A spring 319 is stretched between a strap 320 pendent from the bottom plate 7 and an upstanding arm 321 of the rocker shaft. This spring holds the roller 316 against the cam 68. There is a cut-out 322 in the adjacent leg 5 to avoid conflict with the roller 316.

The tubular feeding finger carriage 289 (Fig. 62) has a thickened annular band 323 where the lugs 290, 290 are secured, which stiffens the upper end of the carriage. There is another thickened annular band 324 at the lower end of the carriage, which is wider but not as thick as the upper band. The outer diameter of the bands 323 and 324 is the same while the outer diameter between these bands is preferably a little smaller. The inner wall of the tubular carriage 289 is straight from the upper band 323 downward, to facilitate the passage of shelled nuts therethrough.

The feeding fingers 263 are each comprised of a stem 325 and a wide inwardly offset throat and pocket forming head 326. The stems are preferably made of steel bars of a uniform square cross section and given a suitable finished heat treatment. They are secured at their lower extremities to the lower end of the tubular carriage 289 in the interior thereof, being secured so as to have a light initial pressure outward against the upper annular band 323. Furthermore, they are so secured to the carriage as to be spaced away from the carriage wall at 327 above the place of attachment 328 and to be parallel inside the tubular carriage. They are spaced at the same quadrants as the slots 264 and 279 and are supported at their sides by guide brackets 329 which are secured to the top of the tubular carriage 289 but not to the stems 325. These guide brackets are made from strips of metal of appropriate width and thickness and cut out where the stems 325 are located.

Above the tubular carriage 289 the stem of each feeding finger is bent inwardly to the head 326 which is of the same thickness in the transverse direction as the stem but of greater width in the radial direction. On the inner side each head has an upward inwardly beveled heel 330, a normally vertical throat forming edge 331 and an upward outwardly beveled pocket forming edge 332. The outer edge of the head 326 is parallel to the throat forming edge 331, except that there is an outward protruding lobe 333 at the upper end, which lobe is tapered in section along its outer and upper edges.

The normal distance between the parallel outer edges of the heads 326 of opposite feeding fingers is greater than the diameter of the shelling chamber 278 and the internal diameter of the slotted tube 259. Hence the outer parts of the heads normally ride in the slots 279 and 264. The protruding lobes 333 are an additional safeguard for holding the feeding fingers in mesh with slots 264. The purpose of the tapered outer and upper edges of the lobes is to provide for a quick return of any feeding finger which may accidentally jump out of mesh and to provide smooth sliding at the sides and ends of the feeding fingers.

The four feeding fingers are exactly alike and are equidistant from the vertical center line of the nut track. The space between throat forming edges 331 is called the throat of the feeding fingers and is designated 334. This throat is normally smaller than the diameter of the smallest nut to be shelled. Hence when a nut is inserted into the throat it is gripped by the feeding fingers.

A nut in the feeding finger throat is centered substantially equally along the center line of the nut track, the opposed feeding fingers springing out substantially equally from their normal position. The feeding fingers are adapted to spring outward over the largest nut to be shelled, and the slots 279 are radially deep enough to permit the feeding fingers to be sprung outward this amount. When thus sprung the greatest strain in the feeding fingers is in the region of the brackets 329 while there is relatively little strain along the lower ends where the feeding fingers are secured to the annular band 324. This means that the lower ends of the stems can be welded to that band without jeopardizing the springing qualities of the feeding fingers.

The pocket 335 of the feeding fingers is the funnellike opening between the tapered edges 332. It is large enough to receive the largest nut to be shelled, in the upended attitude, and steep enough to generally maintain nuts in this attitude.

When the machine is in its starting position, the last part of the principal fall of the cam 68 is engaging the roller 316. This fall continues to the 3° line 336 where the heel of the cam begins. When the principal fall traverses the roller, the feeding fingers move downward. The feeding fingers remain at the bottom position while the heel traverses the roller to the 103° line 337 where the first rise begins. The feeding fingers move to a little above mid position while the first rise traverse the roller to the 143° line 338 where a mild fall begins. The feeding fingers move to their mid-position while the mild fall traverses the roller to the 184° line 339 where the upper concentric sector begins. The feeding fingers remain at their middle position while the upper concentric sector traverses the roller to the 260° line 340 where the second rise begins. The feeding fingers move to their uppermost position while the second rise traverses the roller to the 303° line 431 where the principal fall begins. These movements and positions of the feeding fingers are indicated in circle VI of Figure 75. Inasmuch as the feeding fingers travel downward with a substantially harmonic motion they are already virtually at their lowermost position at the 0° line, or starting line, which means that the position of the feeding fingers shown in Figures 1 and 2 is virtually the lowermost position of these feeding fingers.

The feeding fingers receive nuts dropped singly by the second cage 225, the nuts dropping into the pocket 335. The nuts are dripped from the second cage during the opening period of that cage, which is between 73° and 213° past starting position. There is an interval between the moment when the maximum diameter of a nut passes the constricted opening of the second cage and the moment when the same nut lands in the feeding finger pocket. However, since nuts are in motion sliding down the second cage, at the time their maximum diameter reaches the constricted opening and since the velocity of this motion varies with the operating speed of the machine, the interval required for the dropping of a nut is reasonable in terms of the number of degrees of cam shaft rotation which occur during the interval.

The feeding fingers are at or near their mid position when the nut lands in their pocket. After the second cage has closed, the upper end of the nut engages the anvil 226 as the feeding fingers are moving to their uppermost position. This causes the upper end of the nut to slip into the center of the concave anvil and the lower end of the nut to slip into the center of the feeding finger pocket, thereby straightening the nut, and as the feeding fingers continue to rise they ride over the nut which is stopped by the anvil. The top of the throat 334 of the feeding fingers comes almost to the neck 239 of the second cage bars when the feeding fingers are in the uppermost position (Fig. 69), at which time the nut is securely gripped in the throat of the feeding fingers. The feeding fingers carry this nut down into the shelling chamber with them as they move downward.

The clamping pins

The upper shelling assemblage 274 (Figs. 1, 2, 24, 28, 35, 36 and 40) contains a center piece 342 which on opposite sides has lugs 343 and 344 with holes 345 and 346, respectively, which receive the bolts 273, 273, with a working fit. The lug 343 has an arm 347 rigidly secured thereto at the front side thereof and extending upward thereof through a clearance space 348 (Fig. 23) between the guard plate 82 and upper plate 6. The upper end of this arm is bent at 349 (Fig. 2) in the direction of the adjacent bolt 273 which goes through a hole 350 in the bent end. The center piece is slidable up and down on the bolts 273, 273 by virtue of the three holes which give it a three point mounting.

The upper side of the center piece 342 is concave and the lower side is convex. Wide radial channels 351 (Figs. 24, 25, and 35) on the concave side of the center piece are topped partly by turnable actuating ring 352 and partly by a stationary hub ring 353. The channels are reduced in width at 354 and extend inward to the central opening 277. These channels 351 are at quadrants midway between the radial slots 279 in which the feeding fingers work.

The hub ring 353 is held in a central position by screws 355, which are driven into the center piece, and is held down resiliently by long stiff rubber washers 356 between the screws heads and the top surface of the ring. The outer diameter of the hub ring is equal to or slightly greater than the outer diameter of the dirt collecting shield 261 which is concentrically secured to the top of the hub ring with a dust tight joint.

The actuating ring 353 is radially outward of the hub ring which forms a bearing for its turning. It is held against the center piece by a pair of clips 357, 357 (Figs. 2 and 24) secured to the top side of lugs 343 and 344 by means of the pairs of screws 358, 358. Near its outer periphery, along the rear, it has an upstanding lug 359 (Figs. 24, 27 and 35) with a tooth space 360 receiving the tooth 361 of the rocker 362 with a working fit. This rocker has spaced bearing members 363 and 364 (Figs. 24 and 26) secured thereto by means of which it is pivotally mounted on the pivot rod 365 which is aligned with the pivot rod 29 and is held in suitable perforations in the plate 6 and lug 366.

The lug 366 is rigidly secured to the inner flange 367 of a channel iron 368 which is secured at its ends to the upper plate 6 and lower plate 7 in a vertical position between the two. The spaced bearing members 363 and 364 are adjacent the lug 366 and the plate 6, respectively, and thereby hold the rocker at the proper altitude. The pivot rod 365 is removable by removing the overlapping screw 369 and pulling it upward, there being sufficient space under the pivot rod 29 for this.

A spring 370 (Figs. 24 and 27) is stretched between the anchor rod 16 and an upstanding stud 371 on the toothed end of rocker 362, with appropriate tension to keep the roller 372 which is at the opposite end of the rocker, against the cam 62, except as the movement of the rocker may be cut short by the check strap 373 or by a nut improperly occurring between the top clamping pins when they close.

The top clamping pins 374 (Figs. 24 and 35) ride in the radial channels 351 which are lubricated, the wide heads 375 of these pins having a working fit in the wide portions of these channels and keeping the shanks 376 from turning and binding in the narrow portions 354 which they occupy. On the upper sides of the heads 375 are bosses 377 which ride in lubricated cam grooves 378 in the nether side of the actuating ring 352. When the actuating ring is turned clockwise and counter-clockwise the point of juxtaposition between the cam grooves and wide radial slots is moved radially inward and outward and the clamping pins are thereby moved radially inward and outward. When the actuating ring is in the extreme counter-clockwise position of its movement the clamping pins are in their outermost position, withdrawn from the shelling chamber (Fig. 24). When the actuating ring is in the extreme clockwise position of its movement the clamping pins are in their innermost position, their inner ends projecting into the shelling chamber (Fig. 25).

The stud 371 extends substantially to the upper plate 6 as shown in Figure 27. The inner part of the check strap 373 rests on coils of the spring 370 (Fig. 24) and receives this stud in a slot 379 which is long enough to permit the stud to work back-and-forth unrestricted.

The outer end of the check strap terminates with a screw rod 380 which passes through a suitable hole in a lug 381 secured to the bottom of the upper plate 6, (Figs. 1, 23, and 24). There is a compressed spring 382 between the lug 381 and a shoulder 383 of the check strap, through the coils of which the screw rod 380 goes. This spring applies an inward pressure to the check strap, which pressure is resisted by nuts 384 on the screw rod, on the opposite side of the lug. These nuts are initially so placed that the stud 371 will just strike the check strap at the end of the slot 379 when the roller 372 is on the heel of cam 62.

A split rubber washer 385 of any desired thickness, or a plurality of such washers, is then placed between the nuts 384 and the lug 381 when it is desired to limit the closing movement of the clamping pins.

The lower shelling assemblage 276 (Figs. 1, 2, 30, 31, 38 and 39) is similar to the top shelling assemblage. It contains a center piece 386 which on opposite sides has lugs 387 and 388 with holes 389 and 390, respectively, which receive the bolts 273, 273 with a working fit. The lug 387 has an arm 391 rigidly secured to the front side thereof and extending downward in front of the lower plate 7. The lower end of this arm is bent at 392 in the direction of the adjacent bolt 273 which goes through a hole 393 in the bent end.

The lower side of the center piece 386 is concave and the upper side is convex. Wide radial channels 394 (Figs. 31 and 39) on the concave side of the center piece are bottomed partly by the turnable actuating ring 395 and partly by the stationary hub ring 396. The channels are reduced in width at 397 and extend inward to the central opening 277. These channels are at quadrants midway between the radial slots 279 in which the feeding fingers work.

The hub ring 396 is held in a central position by screws 398 which are driven into the center piece, and is held resiliently against the center piece by rubber washers 399 between the screw heads and the ring.

The actuating ring 395 is held against the center piece by a pair of clips 400, 400 (Fig. 2) secured to the bottom side of lugs 387 and 388 by means of the pairs of screws 401, 401. It has a pendent lug 402 (Figs. 27, 31 and 39) with a tooth space 403 receiving the tooth 404 of the rocker 405 with a working fit.

The rocker 405 has spaced bearing members 406 and 407 (Fig. 26) by means of which it is pivotally mounted on the pivot rod 408 which is aligned with the pivot rods 365 and 29 and is held in suitable perforations in the plate 7 and the lugs 409 and 410 which are secured to the inner flange 367 of the channel iron and which hold the rocker at the proper altitude. The pivot rod 408 is removable downwards and is held against downward displacement by the screw 411.

A spring 412 (Figs. 27 and 31) is stretched between the anchor rod 16 and pendent stud 413 on the toothed end of rocker 405 with appropriate tension to keep the roller 414 which is at the opposite end of the rocker, against the cam 66 except as the movement of the rocker may be cut short by the check strap 415 or by a nut improperly occurring between the bottom clamping pins when they close.

The bottom clamping pins 416 (Figs. 31 and 39) ride in the radial channels 394, the wide heads 417 of these pins keeping the shanks 418 from turning in the narrow portions of the channels which they occupy. On the lower side of heads 417 are bosses 419 which ride in cam grooves 420 in the upper surface of the actuating ring 395.

The stud 413 extends substantially to the lower plate 7 as shown in Fig. 27. The inner part of the check strap 415 rests on the lower plate 7 and receives this stud in a slot 421 (Fig. 31) which is long enough to permit the stud to work back-and-forth unrestricted.

The outer end of the check strap terminates with a screw rod 422 which passes through a hole in a lug 423 secured to the lower plate 7 (Figs. 1 and 31). A spring 424 is compressed between the lug 423 and a shoulder 425 of the check strap, and receives the screw rod 422 which has the nuts 426 on the opposite side of the lug to resist the pressure of the spring. A split rubber washer 427, or a plurality of such washers, is placed between the nuts 426 and the lug 423 when it is desired to limit the closing movements of the clamping pins.

Cams 62 and 66 are identical in contour and in their angular position on the cam shaft, and the top and bottom clamping pins are moved similarly and in unison.

In these two cams the zero degree line comes where the crest ends and the fall begins, and is denoted 428. The actuating rings 352 and 395 are in the extreme counter-clockwise position of their movement and the top and bottom clamping pins are in their open or outermost position when the respective rollers 372 and 414 are on the crest of the respective cams.

The actuating rings 352 and 395 turn clockwise and the top and bottom clamping pins move radially inward into the shelling chamber while the fall of cams 62 and 66 traverses the respective rollers to the 40° line 429 where the heel of these cams begins. The top and bottom clamping pins remain in their closed position while the heel of cams 62 and 66 traverses the respective rollers to the 195° line 430 where the rise of these cams begins. The actuating rings 352 and 395 are turned to the extreme counter-clockwise position of their movement and the top and bottom clamping pins open (withdraw from the shelling chamber) while the rise of cams 62 and 66 traverses the respective rollers 372 and 414 to the 235° line 431 where the crest begins.

These movements and positions of the clamping pins are indicated in circle VII of Figure 75.

*The assemblage shifting mechanism*

The upper shelling assemblage 274 and lower shelling assemblage 276 are shifted simultaneously in opposite directions toward and away from the stationary middle assemblage 275 by sliding movements on the parallel bolts 273, 273. The mechanism by which this is accomplished includes the pendent rocker arm 432 (Figs. 1 and 32) which is rigidly secured to a shaft 433 having ends 434, 434 of reduced diameter journaled, respectively, in a lug 435 pendent from the upper plate 6, and in a link 436 secured by means of a bolt 437, to a lug 438 pendent from the upper plate 6. The rocker shaft 433 and its arm 432 are each bent to avoid conflict with cams. The rocker arm 432 has an outward projecting branch 439 from which a spring 440 is stretched rearward to a bracket 441 which is secured to the upright 3 of the framework.

A bar 442 extends forward from the rocker arm 432 through the space between the lugs 271 and 272 (Fig. 2) which are secured to the upright 1. This bar is pivotally secured to the rocker arm 432 with a bolt 443 at an elevation making the bar substantially horizontal. This bar carries a crosshead 444 comprising two parallel side plates 445 and a cross-plate 446 connecting the two and providing a suitable face for a spring 447 which is compressed between this cross plate and a cross pin 448 going through the horizontal bar 442 near the rocker arm 432. The horizontal bar goes through the coils of the spring and through a suitable opening in the cross plate 446 and goes midway between the side plates 445 of the crosshead.

There is just sufficient space between the horizontal bar 442 and the side plates 445 to receive obliquely mounted links 449 and 450 with a working fit. There is a transverse pin 451 which goes through smooth holes in the side plates 445 and in the enclosed ends of the oblique links 449 and 450, and through a horizontal slot 452 in the horizontal bar 442. The other ends of the oblique links have smooth holes which receive bosses 453, 453 extending from lugs 454, 454 which are secured to arms 347 and 391 of the upper and lower assemblages, respectively.

In the present instance the oblique link 449 being carried in the crosshead on the opposite side of the bar from link 450, is bent along the middle of its length to make its upper portion come directly above the lower link 450, as shown in Figure 22.

The oblique links are held in position on the bosses and the horizontal bar is held in proper position, by means of a plate 455 which is secured to the upright 1 by means of a centrally positioned screw 456.

The compressed spring 447 holds the transverse pin 451 normally forward in the slot 452, the only occasion for its yielding being when the upper or lower shelling assemblage (or both) fails to respond to reasonable pressure, in which instance damage to the machine is averted due to the resilience of the spring, the slot 452 being long enough so the bar 442 can move forward its full stroke while the crosshead remains stationary.

In the present instance the bar 442 for most of its length extends directly away from the rocker arm 432 and is offset between the cross pin 448 and the rocker arm, for attachment at one side of the arm, as shown in Fig. 32. The forward portion of the bar rides on the lug 272 of the framework, between a suitable cut-out 457 (Fig. 29) in the plate 455 and the adjacent lug 458 of the center piece of the middle shelling assemblage. The weight of the upper and lower shelling assemblages is transmitted to the bar by the links 449 and 450, hence that part of the bar which rides on the lug 272 is preferably lined with bronze and supplied with suitable lubricant, to prevent abrasion.

The lower end of the rocker arm 432 is sharply offset to form a broad shoulder 459 which will avoid conflict, and a bearing member 460 projecting perpendicularly downward from the broad shoulder and carrying the follower roller 461.

When the cam shaft is turned the contour of cam 67 and the tension of spring 440 cause the rocker arm 432 to swing rearward and forward and move the horizontal bar 442 and crosshead 444 backward and forward. The links 449 and 450 connect the crosshead with the upper and lower shelling assemblages and change the horizontal motions of the crosshead to vertical motions of these shelling assemblages, along the bolts 273, 273. The upper and lower shelling assemblages 274 and 276 are thereby moved simultaneously and equally toward and away from the middle shelling assemblage 275 which remains stationary midway between the two.

When the cam shaft is in its starting position the roller 461 is on the crest of cam 67, which extends to the 8° line 462 where the fall begins. While the crest of the cam traverses the roller the horizontal bar 442 is held in the forward position and the upper and lower shelling assemblages are held the maximum distance away from the middle shelling assemblage, that is to say, the shelling assemblages are spaced apart.

The upper and lower shelling assemblages move toward the middle shelling assemblage while the fall of the cam traverses the roller to the 120° line 463 where the heel begins. This moving together of the shelling assemblages is ordinarily checked by a nut held by the feeding fingers 263 between the top clamping pins 374 of the upper shelling assemblage and the bottom clamping pins 416 of the lower shelling assemblage, as shown in Figure 65.

The shelling assemblages remain together, or as near together as the nut in the shelling chamber permits, while the heel of the cam traverses the roller to the 235° line 464 where the rise begins. The upper and lower shelling assemblages move apart, or away from the middle shelling assemblages, and return to their original spaced positions while the rise of the cam traverses the roller to the 275° line 465 where the crest begins. These movements and positions of shelling assemblages are indicated in circle VIII of Figure 75.

The girdling pins

The convex side of the center piece 342 (Figs. 2, 28, 35, 36, 40, 41, and 42) of the upper shelling assemblage contains a central annular hub portion 466 the face of which is a convex cone, except that there is a concentric annular rib 467. This hub portion is covered by a holding ring 468 which is secured to the center piece by screws 469 and which has an annular recess 470 which matches the annular rib of the hub, thereby giving the holding ring a true concentric position.

The holding ring has a flange 471 on its lower outer edge, which matches the annular recess 472 of the actuating ring 473 which is supported by and turnable on the holding ring. The lower faces of the holding ring and actuating ring make a continuous convex face, and the upper surface 474 of the holding ring is aligned with the concave upper surface 475 of the actuating ring. The concave surface of the actuating ring rests against ribs 476 on the center piece 342 (Figs. 28, 35, and 42) and also against reinforcements 477, 477 which reinforce the center piece where the lugs 343 and 344 come.

The ribs and reinforcements define spaces commonly designated 478 which lie radially outward of the hub 466. The spaces adjacent the reinforcements 477, 477 are smaller than the remainder. All of these spaces are open at the radially outer edge of the center piece, except as occupied by working parts which function as jaws to grip the shell.

In the present instance there are eight top girdling pins 479. These ride in radial channels 480 which are in the nether side of the hub 466 and are bottomed by the holding ring 468. The radial channels are spaced at intervals of forty-five degrees and are located so that the radial slots 279 and the radial reinforcements 477, 477 will come midway between the girdling pins. The ribs 476 are situated on the clockwise side of the girdling pins, as seen in Figure 28, one face of each rib being a continuation of one side of the respective channel 480 and the other face being parallel thereto.

In the present instance the center piece is a machined casting in which the ribs are cast oversize and subsequently cut to proper width with a milling cutter. This milling cutter slots the hub where the channels 480 come. It also slots the hub for a short distance on the other side of each rib in cutting the finished surface on that side of the rib. The last named slots have no function in the completed machine and are not shown in the drawings.

The unfinished surface 481 along the top of each space 478 is cast sufficiently sunk to clear working parts (Figs. 28 and 40) which ride on the finished surface 482 of a raised border.

Each top girdling pin 479 (Figs. 28, 36, 41, 42, 43, 44, 46 and 47) is preferably made of a straight bar of tool steel having a uniform square cross section, and has on the lower side of its radially outer portion a bracket 483 with a notch 484 therein (Figs. 36 and 46). Most of the inner end of the pin is blunt at 485. The remainder constitutes a short piercing and penetrating point 486 which extends across the lowermost part of the pin (Fig. 47). This point is beveled on both sides, but the bevel 487 along the bottom is shorter than the point and more nearly parallel to the shaft of the pin than the bevel 488 on the top side of the point.

Each of the top girdling pins is carried by a gripper 489 (Figs. 1, 28, 36, 40, 41, 42, 43 and 44). Each gripper 489 comprises an abutment member 490 and a locking lever 491, the radially inner portions of which work in adjacent spaces 478. The abutment is adjacent the rib and the locking lever adjacent the girdling pin, with the respective rib 476 and girdling pin 479 coming between the abutment and locking lever. On the lower side of the radially inner portion of each locking lever is a boss 492 (Fig. 48) which carries a shoe 493 (or roller) which rides in a cam groove 494 in the upper side of the actuating ring. The shoes 493 are similar to the shoes 133 (Fig. 15) except that they are preferably thicker because they are subjected to greater pressure.

There is a tooth space 495 in the rear part of the actuating ring. The center of oscillation of this tooth space is approximately midway between adjacent grippers. This tooth space comes at the outer corner of one of the cam grooves and the shoe riding in this cam groove is cut away at 496 (Fig. 42) to avoid conflict with the tooth 497 of a rocker 498, which occupies this tooth space.

There is a pair of parallel arms 499 and 500 integral with or secured to opposite sides of each abutment 490 and extending counter-clockwise therefrom as seen in Figure 28. The arm 499 is a channel member. It has a radially inward flange 501 and a radially outward flange 502 projecting perpendicularly therefrom. The flat side of arm 499 faces the arm 500 which is a flat plate.

In the space between the parallel arms 499 and 500 are assembled the spacer block 503, the girdling pin 479 and the locking lever 491. The girdling pin is normally loose between these parts. The locking lever is pivoted on the pin 504. This pin goes through suitable holes in the locking lever and the parallel arms and is preferably held in place by a single wire 505 which is looped around the nearest side of the gripper and passed through holes in each end of the pin, as shown in Figures 43 and 44.

The spacer block 503 is considered to be a part of the abutment and is included in the broader meaning of the term "abutment". It is held against endwise displacement by hooks 506, 506 at its ends (Fig. 49), which engage opposite sides of the arm 500. The working edge 507 of the abutment is perfectly straight. The spacer block rests against this edge. The spacer block is preferably slightly tapered in thickness, the biting area at the radially outer part of the block being the thickest and being of the same thickness as the respective rib 476.

The abutment and locking lever are in the same plane. The laterally outer edges of the abutment and locking lever are tapered at 508 and 509, respectively, so the radially inner end of the gripper will occupy less space.

Narrow, tapering, laterally outer portions 510 and 511 of the abutment and locking lever, respectively, extend radially outward from the region of the parallel arms 499 and 500 and terminate with confronting, vertically expanded ends 512 and 513, respectively. These ends have registering holes containing the transverse rod 514 which passes through the anti-locking spring 515 which is compressed between the expanded ends. The outer ends of the rod 514 are perforated and provided with pins 516, 516 which preferably limit the laterally outward displacement of the expanded ends 512 and 513 and thereby hold the radially inner ends of the abutment and locking lever separated a distance slightly greater than the thickness of the rib 476 and girdling pin 479. Thus in Figure 43 the space 517 is due to the limit imposed by the pins 516, 516 while the space 518 is that which is normally occupied by a rib 476.

There is a bracket 519 on the arm 500, which has a notch 520 therein. A spring 521 of light tension is stretched between this bracket and the bracket 483 of the girdling pins, being hooked into the respective notches 520, and 484. This spring normally keeps the girdling pin positioned in its radially innermost position with respect to the gripper, by normally keeping the radially inner end 522 of the bracket 483 drawn against the arm 500. This inner end 522 limits the inward position of the girdling pin with respect to the gripper. The brackets 483 and 519 extend in opposite directions from their respective places of attachment, to provide additional longitudinal space for the spring 521 which is in a highly distended condition. Owing to the high distension, the tension of this spring varies but little when there is relative motion between the girdling pin and gripper.

Each gripper 489 has an adjustable rod 523 above the girdling pin 479 and parallel thereto. The radially inward portion 524 of this rod is smooth and of uniform diameter and passes through smooth holes in the flanges 501 and 502. Radially outward of the smooth portion 524 this rod has a larger diameter portion 526 which is screw threaded and is screwed into the tapped hole 527 in a block 528 (Fig. 45) having a slot 529 which receives the radially outward flange 502 of the arm 499 and which separates the tapped hole 527 from the smooth hole 530 through which the smooth portion 424 of the rod extends.

At the radially outermost end of the adjustable rod is an angular head 531 which is slotted to receive a screw driver. A leaf spring 532 is secured to the block 528 in any suitable way, as for instance by screws 533, and has an offset projecting portion which presses resiliently against a flat side of the angular head 531 and thereby prevents the adjusting rod from turning except when manipulated with a screw driver. The block 528 has a face 534 which has a working fit with the arm 499 between the flanges thereof and prevents the block from turning. This face 534 is offset from the normal bottom surface of the block to appropriately fit the arm 499.

The lock-initiating spring 535 is compressed between the radially inward flange 501 and the washer 536 which is held in place on the adjustable rod by a pin or wire 537 going through a hole near the radially inward end of the rod. In the present instance a wire is used. This is bent in opposite circumferential directions (not shown) outside the opposite ends of the hole so as to "hug" the rod and engage neither the actuating ring 352 nor the center piece 342 in operation.

The slot 529 is wider than the flange 502 it receives, so that it remains partly unoccupied. The lock-initiating spring 535 normally keeps the rod 523 and block 528 positioned radially inward so that the slot is unoccupied between the radially inward side of the flange and the surface 538 (Fig. 40). However, when the gripper 489 is in its radially innermost position as shown in Figure 41 the rod 523 is held back by the perpendicular periphery 539 of the center piece and the surface 538 engages the radially inner side of the flange 502, preventing the gripper from being moved radially inward any further. The unoccupied part of the slot now occurs between the surface 540 and the radially outer side of flange 502. This distance represents the movement of the block relative to the flange and is substantially equal to the length of the penetrating point of the girdling pins.

The grippers are moved radially inward and outward by counter-clockwise and clockwise movements of the actuating ring 473. When the actuating ring is in the extreme clockwise position of its movement the grippers are in their radially outermost position (Figs. 28 and 40). When the actuating ring is in the extreme counter-clockwise position of its movement the grippers are in their radially innermost position (Figs. 41 and 42).

It is the movement of the shoes 493 in the cam grooves 494 which moves the grippers radially inward during the counter-clockwise turning of the actuating ring. Each cam groove directs pressure to the respective shoe in a direction which, without friction, would be perpendicular to the line of contact between the shoe and the acting side of the cam groove. This pressure on the shoe may be resolved into two imaginary components: a component parallel to the respective rib 376, indicated by the arrow $d$ of Figure 42, and a component perpendicular to the rib, indicated by the arrow $e$ of Figure 42. The component $d$ tends to move the gripper radially inward; the component $e$ tends to rotate the locking lever on its pivot 504, against the pressure of the anti-locking spring 515. The force of the component $e$ is communicated to the rib 476 by the working edge 507 of the abutment, which is slidable along the rib.

It will be noted that the component $d$ is equal to the gripper's resistance to inward motion. For present purposes the component forces $d$ and $e$ may be considered to be equal. Then, the force $e$ is equal to the gripper's resistance to inward motion. Before the adjustable rod 523 makes contact with the substantially perpendicular periphery 539 of the center piece this resistance is not sufficient for the component $e$ to overcome the pressure of the anti-locking spring 515. After the rod 523 is seated on the periphery of the center piece the resistance of the lock-initiating spring 535 is added to the previous resistance to the gripper's inward motion. This increases the component $e$ similarly and makes it more than sufficient to overcome the resistance of the anti-locking spring 515, so that further counter-clockwise motion of the actuating ring causes the locking lever to move on its pivot until its biting heel 541 has forced the girdling pin 479 tightly against the spacer block of the abutment, before the resistance of the lock-initiating spring 535 is overcome. This locks the girdling pin with the gripper so that any resistance subsequently encountered by the girdling pin is added to the resistance of the gripper and increases the component e similarly. Hence, when the locking has been initiated, the grip upon the girdling pin is generated in proportion to the resistance encountered by the girdling pin.

The mechanical advantage of the biting heel of the locking lever is such that any additional resistance encountered by the locked girdling pin will generate sufficient additional biting pressure to keep the girdling pin rigidly gripped or locked.

It is the static friction between the spacer block 503 and the girdling pin as well as that between the biting heel and the girdling pin which keeps the girdling pin rigidly locked. There is probably complete absence of sliding friction and consequently little opportunity for wear from gripping.

The counter-clockwise movement of the actuating ring first moves the gripper inward until the adjustable rod 523 contacts the center piece. Then the gripper remains stationary while the continued movement of the actuating ring pivots the locking lever to the locking position. After the girdling pin has been rigidly locked the gripper moves forward once more. But owing to the resistance of the lock-initiating spring there is no forward motion of the gripper from the time the adjustable rod has made contact until the time when the gripper has locked the girdling pin.

The inward movement which the gripper makes after the rod 523 has engaged the center piece is called the "locked stroke" of the gripper. This movement is only as long as the unoccupied space of the slot 529, because it is ended when the surface 538 engages the flange 502 as shown in Figure 41.

The radial channels 480, cam grooves 494 and ribs 476 are lubricated while the locking portion of the gripper is operated without lubricant, to effect instantaneous seizing of the gripping surfaces when the locking lever bites. The lubricant film is broken around the girdling pin by air space. The cut-out 542 in the adjacent edge of the locking lever provides an air space for this purpose. Another air space 543 is provided between the spacer block 503 and the respective rib 476. There is likewise an air space 544 between the lock-initiating spring 535 and the girdling pin. The air space beneath the girdling pin is lengthened at one end by the space between the bracket 519 and the girdling pin, and at the other end by the angle between the girdling pin and the surface 545 at the outer top part of the actuating ring 473.

The air spaces surrounding the girdling pin to break the lubricant film are appreciably greater than the greatest relative motion that can occur between the pin and the gripper, the greatest possible relative motion being the distance between the radially outermost end of the girdling pin and the radially inner side of the anti-locking spring 515, the anti-locking spring being directly in the path of the girdling pin and limiting its outward position in the gripper.

The rocker 498 has a cylindrical socket 546 which encircles more than 180 degrees of the head 547 of a rocker seat 548. A follower roller 549 is turnably carried by the rocker and is urged against cam 63 by a spring 550 which is stretched between an extension 551 of the rocker and a link 552 secured to the outer end of a stud bolt 553 which is rigidly attached to the upright 3 of the framework.

There is an extra rib 554 secured to the channel iron 368 between the inner flange 367 and outer flange 555. There are registering holes 556 in the two flanges and extra rib of the channel. The hole in flange 555 is tapped and is occupied by the rocker seat adjusting screw 557. The other two registering holes are occupied by the shaft 558 of the rocker seat. The rocker 498 is held against the rocker seat and the rocker seat is adjustably held against the screw 557, by means of a strong spring 559 stretched between a lug 560 of the rocker and a bracket 561 secured to the upright 4.

Manipulation of the rocker seat adjusting screw 557 changes the starting position of the grippers 489 by changing the pivoting point of the rocker 498. This screw is turned inward when it is desired to move the starting position of the grippers 489 radially inward, and it is turned outward when it is desired to move the starting position of the grippers radially outward. It can be seen from Figure 28 that when this screw 557 is moved inward, the rocker seat, rocker and rocker tooth will all be shifted in that direction, changing both of the extreme limits of the actuating ring's movement in that direction and thereby changing both limits of the gripper's movement radially inward. Similarly, if the rocker seat adjusting screw is moved outward the rocker seat and rocker will follow it outward under the tension of the heavy spring 559. The tooth of the rocker will be shifted in the same direction, giving the actuating ring a new starting position which is clockwise of its previous starting position and giving the grippers a more outward starting position and a more outward movement.

The manipulation of the rocker seat adjusting screw 557 simultaneously adjusts the starting position of all the top girdling pin grippers 489 inward or outward. This starting position should be far enough out so that the girdling pins will be withdrawn from the shelling chamber, but not too far out.

The manipulation of each adjusting rod 523 determines at what radial position of the respective gripper the girdling pin of that gripper will be locked. It is desirable that the locked strokes of all girdling pins be begun simultaneously and at the proper radial position. This adjustment is made by manipulation of the adjusting rods 523 after the starting position of the grippers has been selected by manipulating the rocker seat adjusting screw 557.

The following brief description is given to identify outstanding parts of the bottom girdling pin mechanism which is identical in principle with the top girdling pin mechanism although not truly identical in construction.

The convex side of the center piece 386 (Figs. 2, 30, 38 and 39) of the bottom shelling assemblage contains a central annular hub portion 562 the face of which is a cone except that there is a concentric annular rib 563 upon this face. This hub portion is covered by a holding ring 564 which is secured to the center piece by screws 565 and which has an annular recess 566 which matches the annular rib of the hub.

The holding ring has a flange 567 on its upper outer edge, which matches the annular recess 568 of the actuating ring 569 which is turnable on the holding ring. The lower surface of the actuating ring rests against ribs 570 on the center piece 386 (Figs. 30 and 39) and also against radial reinforcements 571, 571. The ribs and reinforcements define spaces commonly designated 572 which lie radially outward of the hub 562.

In the present instance there are eight bottom girdling pins 573. These ride in radial channels 574. The unfinished surface 575 along the bottom of each space 572 is cast sufficiently sunk to clear working parts which ride on the finished surface 576 of a raised border.

The bottom girdling pins are identical in design to the top girdling pins. Each of the bottom girdling pins is carried by a gripper 577 which comprises an abutment member 578 and a locking lever 579, the radially inner portions of which work in adjacent spaces 572. On the upper side of the radially inner portion of each locking lever is a boss 580 which carries a shoe 581 which rides in a cam groove 582 in the nether side of the actuating ring.

There is a pair of parallel arms 583 and 584 integral with or secured to opposite sides of each abutment 578 and extending counter-clockwise therefrom. In the space between these parallel arms are assembled the spacer block 585, the girdling pin 573 and the locking lever 579 which is pivoted on the pin 586.

Narrow, tapering, laterally outer portions 587 and 588 of the abutment and locking lever, respectively, extend radially outward from the region of the parallel arms 583 and 584 and terminate with confronting vertically expanded ends having registering holes containing the transverse rod 589 which passes through the antilocking spring 590 which is compressed between the expanded ends. A spring 591 of light tension is stretched between a bracket 592 of arm 584, and the bracket 593 of the girdling pins and normally keeps the girdling pin positioned in its radially innermost position with respect to the gripper by normally holding the radially inner end 594 of the bracket 593 against the arm 584.

Each gripper 577 has an adjustable rod 595 below the girdling pin 575 and parallel thereto. The radially inward portion 596 of this rod is smooth and of uniform diameter and passes through smooth holes in the flanges 597 and 598 of the arm 583. Radially outward of the smooth portion 596 this rod has a larger diameter portion 599 which is screw threaded and is screwed into the tapped hole 600 of a block 601 having a slot 602 which receives the radially outward flange 598 of the arm 583 and which separates the tapped hole 600 from the smooth hole 603 through which the smooth portion 596 of the rod extends.

At the radially outermost end of the adjustable rod is an angular head 604 which is slotted to receive a screw driver. A leaf spring 605 is secured to the block 601 in any suitable way, as for instance, by screws 606 and has an offset projecting portion 607 which presses resiliently against a flat side of the angular head 604 and thereby prevents the adjusting rod from turning except when manipulated with a screw driver.

The lock-initiating spring 608 is compressed between the radially inward flange 597 and the washer 609 which is held in place on the adjusting rod by means of a pin or wire 610 going through a hole near the radially inward end of the rod.

The slot 602 is wider than the flange 598 it receives, leaving unoccupied space which is normally adjacent the surface 611 of the block. The width of this space is substantially equal to the length of the penetrating point of the girdling pins.

The locking portion of each bottom girdling pin gripper is protected from lubricant by air spaces corresponding to those of the top girdling pins.

The tooth space 612 in the rear portion of the actuating ring 569 contains the tooth 613 of the rocker 614 which has a cylindrical socket 615 which encircles more than 180 degrees of the head 616 of a rocket seat 617. A follower roller 618 is turnably carried by the rocker and is urged against cam 65 by a spring 619 which is stretched between an extension 620 of the rocker and a clip 621 secured to the outer end of a stud bolt 622 which is rigidly attached to the upright 3 of the framework.

There are registering holes 623 in the two flanges and extra rib of the channel. The hole in flange 555 is tapped and is occupied by the rocker seat adjusting screw 624. The other two registering holes are occupied by the shaft 625 of the rocker seat. The rocker 614 is held against the rocker seat and the rocker seat is adjustably held against the screw 624, by means of a strong spring 626 stretched between a lug 627 of the rocker and the bracket 561 secured to the upright 4.

That part of the description which relates to the operation and manipulation of the parts of the top girdling pin structure also applies to the corresponding parts of the bottom girdling pin structure.

Cams 63 and 65 are identical in contour and in angular position on the cam shaft. When the machine is in its starting position the follower rollers 549 and 618 are on the heel of these respective cams, the rockers 498 and 614 are holding the actuating rings 473 and 569 in the extreme clockwise position of their movement and the grippers 489 and 577 are being held in the outermost position of their movement (Figs. 28 and 30).

The grippers remain in their outermost positions while the heels traverse the rollers to the 140° line 628 where the principal rise begins. The rockers move the actuating rings rapidly counter-clockwise and the grippers move rapidly inward while the principal rise traverses the rollers to the 180° line 629 where the gradual rise 630 begins. The rockers slowly move the actuating rings counter-clockwise and the grippers are locked and strained while the gradual rise traverses the follower rollers to the 199° line 631. The rockers move more rapidly and the grippers move inward to their limit while the rollers are traversed by the remainder of the gradual rise to the 223° line 632 where a short fall begins. The strain on the grippers is largely relaxed but the grippers remain at their innermost position while the short fall traverses the rollers to the 235° line 633 where a concentric segment 634 begins. The grippers remain at the radially innermost position while the concentric segment 634 traverses the rollers to the 293° line 635 where the principal fall begins. The rockers 498 and 614 rapidly move the actuating rings 473 and 569 to the extreme clockwise position and the grippers move to their radially outermost position while the principal fall traverses the rollers 549 and 618 to the 333° line 636 where the heel of cams 63 and 65 begins.

When the top girdling pin grippers 489 and bottom girdling pin grippers 577 are in their outermost positions the top and bottom girdling pins are held open, or withdrawn from the shelling chamber, by the respective arms 500 and 584 which support the inward ends 522 and 594 of the pin brackets 483 and 593.

When the grippers are moved inward by the principal rise of cams 63 and 65 the girdling pins, now loosely held by the grippers, follow the grippers inward under the tension of the light springs 521 and 591 until they are stopped by engaging the shell of a nut in the shelling chamber. Each girdling pin stops and idles when it engages the nut, while all the grippers continue their radially inward motion. If the nut is non-circular or out of center where a girdle of girdling pins comes, the pins of that girdle which engage the nut first are stopped first and remain idle while each of the remaining pins of that girdle continues to move inward until it engages the nut.

In Figure 68 the irregular line f represents the outline of a nut where the top girdling pins come. The position of the eight pins 479 at the time the first of them engages the nut is shown in solid outlines, while dotted outlines indicate the additional distance several of the girdling pins thereafter move forward in fitting the non-concentric outline of the nut.

When the 180° line 629 of cams 63 and 65 is coincident with the follower rollers all of the penetrating points of the girdling pins are in contact with the shell of the nut in the shelling chamber. The adjustable rods 523 and 595 are so adjusted that all of the grippers lock the girdling pins in the next few degrees, as for instance in the interval between 180° and 184° past the zero line of the cams. This interval comes while the gradual rise 630 traverses the follower rollers, which means that the actuating rings are moving relatively slow while locking takes place.

The penetrating points of the girdling pins must ordinarily be forced against the shell of a nut with considerable pressure before the penetrating is completed. It will be understood that there is resilience in the various parts of the machine which are stressed when this pressure is communicated to the penetrating points. In comparison to the depth which the shell is to be penetrated this resilience is quite large. The effect of this resilience is that the locked stroke of the grippers and rigidly locked pins is temporarily resisted by the shell of the nut while stressed parts of the machine undergo strain. The pressure against the nut increases with the strain. When the pressure at a girdling zone becomes greater than the strength of the shell, the shell snaps at that zone. This abruptly breaks down the resistance of the shell at that zone, whereupon the respective grippers and girdling pins are flung inward by the force of the resilient strain until contact of the surfaces 538 and 611 with the respective flanges terminates the locked stroke of the respective grippers and prevents excessive penetration.

Shell penetration by the girdling pins takes place when the follower rollers of the cams are being traversed by the latter part of the gradual rise 630 between the 199° line 631 and the 223° line 632.

The relaxation of the strain on the girdling pin grippers which occurs when the short fall between the 223° line 632 and the 235° line 633 traverses the rollers, does not withdraw the girdling pins. It merely reduces the pressure of the rocker teeth 597 and 613 against the sides of the tooth spaces 495 and 612 and the resulting pressure of the top and bottom shelling assemblages against the parallel bolts 273, 273 before these assemblages are moved in opposite axial directions by the action of cam 67.

The girdling pins remain in their innermost position while the concentric segment 634 traverses the follower rollers of cams 63 and 65. The girdling pins are withdrawn from the shelling chamber when the grippers move radially outward.

Unlocking of the top and bottom girdling pins occurs when the respective rods 523 and 595 are withdrawn from the peripheries of the center pieces 342 and 386, whereupon the unopposed pressure of the anti-locking springs 515 and 590 turn the locking levers on their pivots so as to release the biting heel from gripping the girdling pins.

Opening of the girdling pins, as their withdrawal from the shelling chambers is called, is accomplished when the ends 522 and 594 of the pin brackets 483 and 593 are engaged by the arms 500 and 584 of the outward moving grippers.

The radial movements and positions of the girdling pins are indicated in circle IX of Figure 75.

The top and bottom girdling pins go under the broader designation of shell forcing members. This designation also includes each of the cracking pins to be described presently.

The operation of the girdling pins involves factors which are not ordinarily met with by other types of shell forcing means nor by saw means. The shell of a pecan nut is ordinarily about $\frac{1}{32}$ of an inch in thickness, and the kernel may be almost immediately beneath the shell. The penetrating points of our girdling pins, in the present instance, are about $\frac{5}{6}$ of $\frac{1}{32}$ of one inch in length while the locked stroke of the grippers is about $\frac{1}{32}$ of one inch in length.

The inward action of the girdling pins is divided into two operations: form fitting and shell forcing. In regard to the latter the girdling pins of the instant machine have two functions: to penetrate the shell, and to brace or support the shell against distortion and bodily displacement so the other girdling pins of the same girdle can penetrate the shell.

The tendency of the shell to distort varies according to its stiffness and also according to how far away from the end of the nut the shell is being girdled, and there are other factors which affect distortion. When all the pins of a girdle support the shell wall externally the shell will withstand great radial pressures without distorting, the radial pressures of the pins being largely converted to circumferential pressure in the shell wall which does not shrink appreciably under this pressure because it is made of stone cells.

Before penetration takes place the shell is held against distortion and bodily displacement by the penetrating points themselves. As the point of each girdling pin penetrates the shell the shoulder or blunt end 485 of the pin engages the shell and supports it, taking the place of the penetrating point in bracing the shell, the penetrating point being no longer potent for that purpose when it has split the shell. The shoulder 485 is called a holding point, or a holding means. While in the present instance the holding points are incorporated with the penetrating pins, independent holding means may be provided for this purpose.

The purpose of the holding means is to resist or limit bodily displacement as well as distortion. It will be understood that a nut shell may be penetrated on one side before it is penetrated on the opposite side. When shell severing has progressed this far the penetrated side of the nut offers much less resistance to the penetrating points than the unpenetrated side. This means that there is a tendency for the nut to become pushed bodily from the non-yielding side to the yielding side with the result that excessive penetration may occur on the yielding side and no penetration on the non-yielding side. With the shoulders 585 to support the shell after the points have penetrated this tendency to body displacement is checked.

Another purpose of the shoulders 485 is to hold the shell end after it is severed and while it is being withdrawn from the kernel, this shoulder coming on the outer portion of the shell which is removed (Fig. 69).

Means is provided to keep the upper and lower shelling assemblages from slipping axially in a direction away from a nut when the girdling pins are forced against steeply inclined shell surfaces at the ends of the nut. The tension of spring 440 pulling these assemblages together is one means tending to prevent slippage. The bevel of the penetrating point is designed to claw the shell so as to prevent slippage. Still another factor preventing axial displacement of the upper and lower assemblages is the fact that the pressure of rockers 498 and 614 against the actuating rings 473 and 569, and the corresponding pressures of these assemblages against the bolts 273, 273, strongly binds the end removing assemblages until relaxation of this pressure occurs by virtue of the short fall between the 223° line 632 and the 235° line 633.

The cracking pins

The principal purpose of the middle shelling assemblage 275 (Figs. 1, 2, 29, 37 and 50) is to hold the nut while the shell ends are being removed and to disintegrate the intermediate portion of the nut shell. The middle shelling assemblage has a center piece 637 with arms 458 and 638 which occupy the vertical space between the pairs of lugs 271 and 272 projecting from the corner uprights 1 and 2. These arms have holes 639 and 640, respectively, through which the parallel bolts 273, 273 go.

Along the bottom of the middle shelling assemblage and just outward of the central opening 277 thereof is a concentric collar 641 which is integral with the center piece. The remainder of the bottom of the center piece is a plane surface 642 which is partly covered by the actuating ring 643 which is shouldered squarely against and is turnable on the collar and which is held against the plane surface 642 by the clips 644, 644 (Figs. 2 and 50) which are secured to the arms 458 and 638 by screws 645. The clips are offset to match the grooves 646 of the outer edge of the actuating ring 643. The outer surface of the clip is approximately aligned with the lower face of the actuating ring.

The top of the center piece 637 is a plane surface 647 which is partly covered by the holding ring 648 and the actuating ring 649 which is turnable on the holding ring. The holding ring is opposite the collar 641 and is held against the center piece by screws 650. The actuating ring 649 confronts the actuating ring 643 and has an annular recess 651 which is occupied by the holding ring flange 652 which holds the actuating ring against the center piece 637. The upper surfaces of the holding ring 648 and companion actuating ring 649 form a continuous concave which has the same inclination as the convex lower surface of the upper shelling assemblage 274. (See Fig. 2 for this.) Similarly, the lower surfaces of the collar 641 and the companion actuating ring 643 form a continuous concave which has the same inclination as the convex upper surface of the lower shelling assemblage 276.

The center piece 637 is provided with radial channels 653 which are bottomed by the collar 641 and topped by the holding ring 648. These channels are located at quadrants which are midway between the radial slots 279 in which the feeding fingers 263 work.

Each radial channel 653 contains a cracking pin set 654 which in the present instance comprises three cracking pins designated, from top to bottom: 655, 656 and 657 (Figs. 29, 37, 50, 51, 52, 55, 56, 57, 58 and 59). The outer cracking pins, as the top and bottom cracking pins are called, are identical in design, being merely inverted with respect to each other. The blunt radially inner ends 658 of the outer cracking pins are beveled to be longest on their outer sides and thereby spread the application of cracking pressure by the pin set over the greatest width. The blunt inner end 659 of the middle cracking pin is slightly convex, being longest at its center.

A piercing and penetrating point 660 extends beyond the blunt end of each outer cracking pin, being along the long outer side of these pins. Another piercing and penetrating point 661 extends beyond the blunt end of the middle cracking pin, being centrally located on the blunt end. The three penetrating points are in a straight line along the center of the pin set. The base of each penetrating point is elongated in the direction of this line and each pin is wide in a plane perpendicular to this line. Each point is shaped up from its elongated base so as to provide elongated cross sections from the base to the peak. These elongated cross sections increase the bearing surface on those sides of the point which apply pressure to the edges of arcuate shell portions. The penetrating points are directed in the direction in which the cracking pins travel when they move radially inward, and their length is approximately equal to the thickness of the shell of the nuts to be shelled.

The penetrating points are preferably as narrow and sharp as they can reasonably be made without sacrificing necessary strength and durability. A sharp point will ordinarily make a clean penetration in the shell of a pecan nut whereas a dull point frequently breaks the hard and brittle shell at the sides of the point so that the point does not support or confine the shell for lateral compression. A broad shoulder at each side of the penetrating point improves the cracking result.

The center piece has four ribs 662, one of which is situated on the clockwise side of each pin set 654. One face of each rib is a continuation of one side of the respective radial channel 653, and the opposite face is parallel thereto. The other two faces are included in the lower and upper plane surfaces 642 and 647. The ribs 662 are largely between the confronting actuating rings 643 and 649 but the radially outer ends of the ribs project beyond these rings.

The four cracking pin sets 654 are carried by the four cracking pin grippers 663, 664, 665 and 666, respectively. These grippers are similar to the girdling pin grippers in principle. Each cracking pin gripper is comprised of an abutment member 667, a spacer block 668 and a locking lever 669. A spacer block is considered to be a part of the abutment member and may be made integral therewith. Parallel arms 670 and 671 are secured to or integral with the abutment 667 and have the spacer block, pin set and locking lever assembled between them. The locking lever is pivoted on the pivot pin 672 which goes through smooth holes in the parallel arms and locking lever and is held in position by a split pin 673 at each end. The spacer block is held against endwise displacement by the shoulders 674 which engage each edge of the parallel arms 670 and 671 as shown in Figure 54.

The top and bottom surfaces of the abutments 667 and locking levers 669 are substantially in the same planes as the surfaces 642 and 647. The inner end of each abutment 667 is situated between the confronting actuating rings and is slidable on the clockwise side of the respective rib 662. Each locking lever 669 is on the counter-clockwise side of the respective pin set and its inner end is situated between the confronting actuating rings and has a vertical hole 675 which is occupied by a cross pin 676 (Fig. 60) having trunnion ends 677, 677 which carry duplicate shoes 678, 678 (or rollers) which ride in confronting cam grooves 679, 679 in the actuating rings 643, 649. The cross pin is barrel shaped with its largest diameter at the middle of its length. This permits an automatic rocking adjustment of the cross pin to a condition, for instance, under which the cam grooves are not exactly opposite.

The bodies of the cracking pins are spaced apart for the greater part of their length by shoulders 680 on the inner sides of the radially inner ends of the outer cracking pins 655 and 657, and by a spacer plate 681 and bracket 682 secured to opposite sides of the middle cracking pin 656 at the outer end thereof.

The bracket 682 extends counter-clockwise at 683 to form a shoulder which limits the inward position of the middle cracking pin with respect to the gripper, because it seats against the outer end of the locking lever when the middle cracking pin is in its innermost position with respect to the gripper.

The radially outer end of each of the outer cracking pins has a laterally projecting flange 684 which limits the inward displacement of the pin by seating on the adjacent parallel arm 670 or 671, as shown in Figure 37.

Each cracking pin is urged inward by a light tension spring. Each upper cracking pin is urged inward by a spring 685 which is stretched between the lug 686 of the pin and the lug 687 of the arm 670 (Figs. 29, 37, 51 and 52). Each middle cracking pin is urged inward by a spring 688 which is stretched between a lug 689 of the bracket 682 and a lug 690 of the arm 671. Each lower cracking pin is urged inward by a spring 691 which is stretched between a lug 692 of the pin and a lug 693 of the arm 671. The lugs are suitably notched to keep the springs properly seated. The pair of lugs seating each of these springs extend in opposite directions from their respective places of attachment, so as to provide additional longitudinal space for the spring which is in a highly distended condition.

There is an adjustable rod 694 (see also Figs. 50 and 54) in each cracking pin gripper. This rod is parallel with the cracking pins and has a smooth radially inner portion 695 which slidably occupies a hole centrally located in the spacer block 668. The radially outer portion 696 of this rod is of larger diameter than the inner portion and is screw threaded and carries a double wing nut 697. The outer end of this rod is slotted to receive a screw driver. The rod is normally held against rotation relative to the double wing nut, by any suitable means, for instance by a second nut 698.

Twin lock-initiating springs 699, 699 are stretched from the opposed wings of the wing nut to lugs 700, 700 which are secured to the parallel arms 670 and 671 of the abutment, the wings and lugs being suitably notched to hold the springs properly seated. These springs urge the rod 694 radially inward and normally keep the wing nut well drawn against the spacer block, as shown in Figure 54. The lugs 700, 700 extend radially inward from their places of attachment so as to provide additional longitudinal space for the springs 699, 699.

The grippers 664 and 665 are identical. The abutments and locking levers of each of these grippers have the extensions 701 and 702 (Figs. 50 and 52), respectively, which are perforated at the radially outer end to contain the rod 703 which goes through the coils of the anti-locking spring 704 which is compressed between the extensions. The pins 705, 705 which go through holes in the rod 703 limit the distance which the extensions can be moved apart by the spring 704 and thereby prevent the radially inner ends of the locking lever and abutment from gripping the rib and pin set between them. The anti-locking spring 704 limits the outward displacement of the cracking pins relative to the gripper, being directly outward of the leaves 713 of pins 665 and 667, and of the bracket 682 of the middle cracking pin. The gripper 666 is similar to grippers 664 and 665 except that the extension 702 is bent and the rod 703 and anti-locking spring 704 are shortened, to avoid conflict with the outer flange 555 of the channel iron. There is a cut-out 706 in the flange to increase clearance.

The gripper 663 has extensions 707 and 708 (Figs. 29 and 53) substituted for the conventional extensions 701 and 702. The object of these substitute extensions is to avoid conflict with the spring 447, as shown in Figure 1. The extension 707 is secured to the top of the arm 670 of the abutment, adjacent to the abutment. The extension 708 is secured to the top of the locking lever 669 at a point radially inward of the arm 670 and passes over the arm 670 without being attached thereto or interfering with the normal pivoting of the locking lever. This extension 708 is perforated to receive the pivot pin 672. The radially outer ends of extensions 707 and 708 have vertically expanded ends 709 and 710 which provide seats for the anti-locking spring 704 which is compressed between the two, and are perforated to receive the rod 703 which goes through the coils of the anti-locking spring and which contains the pins 705 to limit the expansion of the anti-locking spring.

Finished faces 711 and 712 of each middle cracking pin 656 are perfectly straight as well as smooth and parallel. Each outer cracking pin has a leaf 713 of uniform thickness secured to it or integral with it at its radially outer end. The inner surface of the leaf is on the same plane as the edge of the pin. When the pins are assembled in the gripper these leaves are oppositely directed and their inner sides face the finished surfaces of the middle cracking pin (Fig. 51, for example) while the outer surfaces face the locking lever and spacer block, respectively.

The confronting actuating rings 643 and 649 are turnable in unison by the action of the rocker 714 (Figs. 26, 27 and 29) which has the wide tooth 715 occupying a tooth space 716 in the periphery of each of the confronting actuating rings. The rocker has a cylindrical socket 717 which encircles more than 180 degrees of the head 718 of a rocker seat 719. A follower roller 720 is turnably carried by the rocker and is urged against the cam 64 by a spring 721 which is stretched between an extension 722 of the rocker and a link 723 secured to the outer end of a stud bolt 724 which is rigidly attached to the upright 3 of the framework.

There are registering holes 725 in the two flanges and extra rib of the channel iron 368. The hole in the flange 555 is tapped and is occupied by the rocker seat adjusting screw 726. The other two registering holes are occupied by the shaft 727 of the rocker seat. The rocker is held against the rocker seat and the rocker seat is adjustably held against the screw 726 by means of a strong spring 728 which is stretched between a lug 729 of the rocker and the bracket 561 secured to the upright 4.

When the cam shaft 11 is rotated the contour of cam 64 causes the rocker 714 to oscillate on the pivot head 718 of the rocker seat, which moves the confronting actuating rings 643 and 649 in unison. Counter-clockwise turning of the actuating rings advances the cam grooves along the duplicate shoes 678 and thereby draws them and the four cracking pin grippers radially inward. Clockwise turning of the actuating rings moves the grippers outward.

During the counter-clockwise turning of the dual actuating rings, the resistance to the inward motion of a cracking pin gripper is not sufficient to overcome the pressure of the anti-locking spring 704 until the radially inner end of the adjustable rod 694 engages the perpendicular plane surface 730 at the end of the respective rib 662. The twin lock-initiating springs 699, 699 resist further inward motion of the gripper until the locking lever has turned on its pivot against the pressure of the anti-locking spring and gripped the cracking pins between the biting heel 731 and spacer block 668. All three cracking pins are gripped simultaneously and equally for it will be seen that the pressure of the biting heel is transmitted against the adjacent leaf 713 of the nearest outer cracking pin, thence to the middle cracking pin, thence to the leaf of the other outer cracking pin and thence to the spacer block of the abutment.

After the cracking pins have been thus gripped, any resistance to inward motion encountered by the cracking pins generates additional grip upon the cracking pin set. The mechanical advantage of the biting heel of the locking lever is such that any resistance encountered by the cracking pins will generate sufficient additional gripping pressure to keep the cracking pins rigidly locked.

The counter-clockwise thrust of the gripper is transmitted against the respective rib 662 by the working face on the adjacent side of the abutment 667. The thickness of the spacer block 668 and adjacent leaf 713 is equal to or slightly greater than the thickness of the rib 662 so that the working face of the abutment and the cracking pins are virtually parallel in operation. The spacer block is preferably slightly tapered toward its radially inner end so that only a small biting area opposite the biting heel 731 will engage the pin set. This makes the gripping jaw more adaptable.

The radially inner portion of the cracking pin grippers and cracking pins is lubricated while the outer portion operates "dry" in order that there may be immediate seizing of the gripped surfaces and immediate locking of the pin set. The dry portion is segregated from the lubricated portion by air space which breaks the lubricant film. An air space is defined for this purpose between the pin set and a hollow 732 in the locking lever. There is an air space 733 between the pin set and the adjustable rod 694, which is lengthened by the diagonal surface 734 of the rib. There is an air space 735 between the adjustable rod and the abutment. There are air spaces 736 (Fig. 37) between the cracking pins, which are sufficiently wide to break the lubricant film. There are air spaces 737 and 738 between the spring anchor lugs and the cracking pin set. These various air spaces are appreciably longer than the relative motion which occurs between the adjacent parts and successfully prevent appropriate lubricant from reaching the gripped surfaces.

When the machine is in its starting position the follower roller 720 is on the heel of cam 64, the rocker 714 is holding the dual actuating rings 643 and 649 in the extreme clockwise position of their movement, and the cracking pin grippers 663, 664, 665 and 666 are being held in the outermost position of their movement (Figs. 29 and 37). These grippers remain in their outermost position while the heel traverses the roller to the 140° line 739 where the principal rise of the cam begins. The dual actuating rings rapidly turn counterclockwise and the cracking pin grippers move rapidly inward while the principal rise traverses the rollers to the 180° line 740 where the first gradual rise begins. The dual actuating rings move a short distance counter-clockwise and the cracking pin grippers move a short distance farther inward while the first gradual rise of the cam traverses the roller to the 199° line 741 where the concentric segment 742 begins. The dual actuating rings and the cracking pin grippers remain stationary while the concentric sector 742 traverses the roller to the 260° line 743 where the sector 744 begins. The sector 744 is a gradual rise except along the end where it is concentric. The actuating rings advance a short distance to the extreme counter-clockwise position of their movement and the cracking pin grippers advance a short additional distance to the innermost position of their movement (Fig. 50) during the interval when the sector 744 traverses the roller to the 293° line 745 where the fall of the cam begins. The actuating rings return to their extreme clockwise position and the cracking pin grippers move rapidly to their outermost position while the fall traverses the roller 720 to the 333° line 746 where the heel of the cam 64 begins.

When the cracking pin grippers are in their outermost position the cracking pins are held "open" or withdrawn from the shelling chamber by the engagement of the shoulders 683 with the locking levers 669 and the engagement of the shoulders 684 with the parallel arms 670 and 671.

When the cracking pin grippers are moved radially inward by the principal rise of cam 64 the cracking pins, which are still loosely fitted between the locking lever and spacer block 668, follow the grippers inward under the light tension of the springs 685, 688 and 691 until they are stopped by engaging the shell of the nut in the shelling chamber. Prior to the locking of the cracking pins each cracking pin stops and idles when it engages the nut, while the grippers continue their radially inward motion. The pin which engages the nut first stops first and each of the other pins continues to move inward until it also engages the nut. This is true with respect to pins in the same pin set as well as with pins in different pin sets, so long as the grippers remain unlocked. This action fits the cracking pins to both the vertical and horizontal contours of the nut. Figures 66 and 67 show cracking pin sets fitted to the vertical contour of nuts. In Figure 66 the middle cracking pins have advanced farther inward than the top cracking pins and the bottom cracking pins have advanced still farther, thus fitting the cracking pins sets to the taper of this nut. In Figure 67 one cracking pin set has fitted a concave surface while the other pin set has fitted a convex surface.

The four cracking pin grippers are adjusted to lock simultaneously and to lock approximately during the first few degrees of cam shaft turning after the 180° line 740 has traversed the center of the cam follower roller. Adjustment of the locking point of the cracking pin grippers is accomplished by manipulating the rocker seat adjusting screw 726 and the adjustable rods 694.

After the cracking pins have been locked they move inward along with the grippers. One forward movement of the locked cracking pins takes place during the interval when the first gradual rise between lines 740 and 741 traverses the roller and a second forward motion of the locked cracking pins occurs when the sector 744 traverses the follower roller, with the cracking pins at a standstill while the concentric sector 742 traverses the follower roller. The first forward motion is sufficient to force the penerating points of the cracking pins into the shell of the nut in the shelling chamber. The second forward motion is sufficient to push the shell inward where the blunt faces 658 and 659 come and thereby rupture the shell body by distorting it.

These movements and positions of the cracking pins are indicated in circle X of Figure 75.

*Miscellaneous*

The rollers 549, 618 and 720 are situated in slots 747 in the rockers 498, 614 and 714, respectively (Figs. 27, 28, etc.), and are mounted upon the respective pins 748, 749 and 750 which go through suitable holes in the respective rollers and rockers. The pins 748 and 750 have flange heads 751 which abut the ends of pin 749. These flange heads serve to hold all three pins in place and also serve as spacers between the respective rockers. These rockers are also spaced apart by knobs 752 on rocker 714. The weight of these three rockers comes upon the lug 409 which provides a suitable base.

Rockers 498 and 614 are reduced in width at 753 and 754, respectively, to avoid conflict with adjacent grippers. The actuating rings 473 and 569 of the top and bottom girdling pin mechanisms, respectively, are each built up at 755 adjacent their tooth spaces to increase the mesh with the rocker teeth which occupy these tooth spaces (Figs. 27 and 30).

Reference has been made of the upper and lower shelling assemblages moving toward and away from the middle shelling assemblage. When the shelling assemblages are closest together a small space remains between the upper and middle shelling assemblages and a similar space remains between the middle and lower assemblages. These spaces are referred to as shell clearance spaces and are for the purpose of leaving clearance for shell fragments which escape from the shelling chamber into the spaces between the shelling assemblages. The built up portions 755 which lengthen the tooth spaces 495 and 612, occupy the shell clearance spaces when the shelling assemblages are closest together.

The shell fragments which come between the upper and middle shelling assemblages slide and blow into the shelling chamber because of the concave face of the middle shelling assemblage, the vibration of the machine and the air currents created by the reciprocation of the upper assemblage. Shell fragments coming between the middle and lower shelling assemblages move outward over the convex upper face of the lower shelling assemblage, being speeded by the reciprocation of the lower assemblage.

The shelling chamber may be open between the middle and lower shelling assemblages, but an upstanding sleeve or guard means 756 is preferably employed to avoid such an opening (Figs. 2, 29, 30, 38, 39 and 50). This sleeve is integral with the holding ring 564 of the lower shelling assemblage. It continues the central opening 277 of that assemblage and extends upward within the central opening 277 of the middle shelling assemblage in a telescoping manner, the opening of the middle shelling assemblage being enlarged for this purpose. This sleeve is in the form of a telescoping tube having slots 757 where the cracking pin sets 654 come and having the radial slots 279 in common with other parts of the shelling assemblages, where the feeding fingers 263 come.

When the shelling assemblages move relatively closer together and farther apart, the upper end of the sleeve 756 remains within the central opening of the middle shelling assemblage, the lower end of the tubular shield 258 remains within the dust collecting shield 261 of the upper shelling assemblage, and the rockers of the upper and lower shelling assemblages remain in mesh in the respective tooth spaces.

It will be noted that at any time during the operation of the machine the rocker seat adjusting screw 726 of the cracking pin mechanism may be turned inward or outward to make the locked stroke of the cracking pin grippers longer or shorter.

On the other hand, the locked stroke of the girdling pin grippers is limited to the unoccupied space in the slots 529 and 602. Manipulation of the rocker seat adjusting screws 557 and 624 during the operation of the machine is done cautiously and for the purpose of increasing or decreasing the resilient strain of the respective girdling pin mechanisms, and thereby giving the girdling pins a proper pressure for penetrating the shells of nuts.

Operation

Pecan nuts to be shelled by our machine are preferably prepared for shelling by soaking them moderately to render the kernels less brittle, by removing dirt from them to keep the machine cleaner, and by passing them through a round hole sieve to remove any nuts of oversize diameter. The nuts are preferably allowed to dry off after they have been soaked and scrubbed, and then shelled when they are no longer wet.

The cam shaft 11 is rotated counter-clockwise continuously by any known means. This produces the operations indicated by Figure 75. In the instant machine a turning speed of 130 revolutions per minute has been satisfactory.

Nuts to be shelled are placed in the hopper 78 manually or by any suitable mechanical means. Gravity and vertical reciprocation of the shaker 167 cause the nuts to move from the hopper to the spring pocket 172 from which one nut is extracted at a time by the extracting pins 129.

The first cage 191 is periodically closed at the proper time to receive each of the nuts dropping from the segregating mechanism and opens during intermediate periods to drop each nut into the second cage which, in turn, alternately opens and closes so as to receive each nut from the first cage, and then drop it into the feeding finger pocket. The segregating mechanism and first and second cages give each elongated nut a straight up end attitude and it is dropped that way into the feeding finger pocket. The operation of the segregating mechanism and first and second cages has been previously described and is indicated by circles I to V of Figure 75.

Between 103° and 143° in the shelling cycle the feeding fingers move from their bottom position to a little above their mid-position (circle VI, Fig. 75). In Figure 65 solid lines show the feeding fingers 263 in their bottom position which is substantially the same position as shown in Figure 2, and dotted lines show the feeding fingers in their mid-position 263'.

When the feeding fingers are in their mid-position 263' their heads 326 are above the nut in the shelling chamber and are a normal distance apart so that the diagonals 332 form a suitable pocket for receiving the nut which is dropped from the second cage. Each nut dropped from the second cage 225 lands in the feeding finger pocket 335 when the feeding fingers are at or near their mid-position.

Dotted lines in Figure 69 show the feeding fingers in the mid-position 263' with a nut g in the pocket 335. The second cage 225 closes shortly after it has dropped each nut (circle V, Fig. 75). Figure 69 shows the cage 225 in the closed position.

In the interval between 260° and 303° past the beginning of the shelling cycle (circle VI, Fig. 75) the feeding fingers move from their mid-position 263' to their top position 263" (Fig. 69).

During this operation the nut is carried upward until it is stopped in the position g' by the anvil portion 226 of the second cage bars. The feeding fingers continuing their upward movement spring outward over the sides of the nut and slide over the nut until they reach their top position 263". The nut is then in the grip of the feeding fingers which have engulfed it, so to speak.

When the upper end of the nut is forced against the concave anvil 226 it slides into the center of the anvil. The lower end of the nut similarly seeks the center of the concave feeding finger pocket. This straightens the nut.

Between 303° and 3° in the shelling cycle (circle VI, Fig. 75) the feeding fingers move from their uppermost position 263" down to their bottom position 263 (Fig. 65) carrying the nut into the shelling chamber with them, the shelling chamber being open at the time when the nut arrives there.

Between 0° and 40° in the shelling cycle the top clamping pins 374 and the bottom clamping pins 416 move inward (circle VII, Fig. 75) as indicated by the dotted extensions 374' and 416', respectively, in Figure 65.

At 8° past the beginning of the shelling cycle the upper and lower shelling assemblages begin to move toward the central shelling assemblage (circle VIII, Fig. 75). When there is no nut between the top clamping pins and bottom clamping pins this movement continues to 120° past the beginning of the shelling cycle. However with a nut h in the shelling chamber the clamping pins will clamp the nut between them at h' and bring the upper and lower assemblages to rest before the cam has attained its 120° position.

The nut h is not necessarily perfectly straight and perfectly centered in the shelling chamber by the feeding fingers. The clamping pins seat against the nut as indicated by the dotted positions 374" and 416" in Figure 65. As clamping occurs the ends of the nut tend to slide into the center of each set of clamping pins as indicated by the arrows i, i thereby straightening the nut. The clamping operation also centers the nut with respect to the middle shelling assemblage, because in the clamping operation the upper and lower assemblages approach the middle shelling assemblage equally.

The nut is now held at h' by the clamping pins while the feeding fingers move up to a little above the mid-position between 103° and 143° of the present shelling cycle. This again places the feeding fingers in readiness for receiving a nut from the second cage 225 above, and it removes the heads 326 of the feeding fingers from the shelling chamber so that the girdling pins and cracking pins can be moved into the shelling chamber without conflict with these heads.

Between 140° and 180° in the shelling cycle the top and bottom girdling pins and the cracking pins move into the shelling chamber and form-fit the nut (circles IX and X, Fig. 75). Solid lines in Figure 66 show the top girdling pins 479, the bottom girdling pins 573 and the cracking pins 655, 656 and 657 fitted to the form of a nut j.

Between approximately 180° and 184° in the shelling cycle the top girdling pins, the bottom girdling pins and the cracking pins are locked (circles IX and X, Fig. 75).

Between 184° and 199° in the shelling cycle the cracking pins move forward sinking their penetrating points into the shell of the nut and moving their blunt ends from the solid positions 658, 659 and 658 to the dotted positions 658', 659' and 658' against the shell of the nut. Clean penetration of the cracking pin points is more readily accomplished while the shell ends are not yet severed. The locations of the penetrations made by the points of the cracking pins is indicated at 758 of Figure 70, with reference to a nut k.

Between 195° and 235° in the shelling cycle the top clamping pins 374 and bottom clamping pins 416 open (circle VII, Fig. 75.) The arrows 1 of Figure 66 show how the clamping pins open.

Between 199° and 233° in the shelling cycle the points of the girdling pins penetrate the nut (circle IX, Fig. 75). The dotted outlines 479' and 573' of Figures 66 and 69 indicate the position of the top and bottom girdling pins after the points of these pins have penetrated. The dotted outline *m* indicates the outline of the nut of Figure 69 at the time when the girdling pins penetrate. Note that the shoulders 485 of the girdling pins have engaged the shell at 485'. The location of the penetrations made by the top and bottom girdling pins is illustrated at 759, 759 in Figure 70.

Between 223° and 235° in the shelling cycle the pressure of the rocker teeth 479 and 613 upon the actuating rings of the top and bottom girdling pin mechanisms is reduced, and the pressure of the upper and lower shelling assemblages against the bolts 273, 273 is likewise reduced.

Between 235° and 275° in the shelling cycle the upper and lower shelling assemblages slide on the bolts 273, 273 in opposite axial directions away from the middle shelling assemblage, moving the top and bottom girdling pins as shown by arrows *n* in Figure 69 and removing the shell ends 760 and 761 which are held by the girdling pins, from the nut *m* which is held by the cracking pins. The solid positions 497" and 573" of Figure 69 show the positions of the top and bottom girdling pins after this axial movement has been completed. Note how the longitudinal shell pockets, webs and tongues have been withdrawn from the longitudinal tips, division and grooves of the kernel 762. The numeral 763 designates a portion of the kernel partition of the nut which has been withdrawn along with the basal shell end in this instance. The splits 764, 764 (Fig. 70) connecting the penetrations 759 are ordinarily produced by the wedging pressure of the respective penetrating points during their penetration of the shell. But the shell will be pulled apart in these regions whether or not it has been split in advance.

Between 260° and 293° in the shelling cycle the cracking pins move inward to disrupt the remaining portion of the shell body (circle X, Fig. 75). At the completion of this inward motion the position of the cracking pins is as shown by the pins 655, 656 and 657 of Figure 69. The shell of the nut is shown to have been pushed inward from the original outline *m* to the position *m'*, at the circumferential intervals where the cracking pins are located.

The principle by which the shell is cracked into longitudinal strips by the cracking pins is shown in Figure 71. The cracking pins shown in this figure are the middle cracking pins 656. Their operation is representative of the entire pin sets 654. Solid lines show how the cracking pins fit the shell outline 765 of a nut while the cracking pins are stationary between 199° and 260° in the shelling cycle. At this time the penetrating points 661 are already embedded in the shell and the blunt portions or shoulders 659 of the pins are resting against the shell but the principal distortion of the shell has not yet occurred.

The dotted positions 659' show how the cracking pins move inward between 260° and 293° in the shelling cycle. While this shell forcing motion presses the shell inward where the shoulders 659' of the cracking pins come the shell bulges outward in the arcuate intervals between the pins to escape compression and is thereby distorted toward an angular condition as indicated by the dotted outline 765'.

During the distortion of the shell the penetrating points embedded in the shell prevent lateral slippage of the shell and effectively isolate each arcuate shell portion, or section, so that each arcuate section is in reality subjected to a separate cracking operation between these gripping points. The line *o* represents the width of one arcuate shell section before the cracking pins push the shell radially inward. The line *p* represents the width of the same shell section after the cracking pins have pushed the shell inward. The line *p* is shorter than the line *o*. Since the shell of the nut is practically incompressible and too hard to yield where it rests against the sides of the pin points, it bulges relatively outward, between the cracking pins and is thereby ruptured at some point therebetween, as for instance, at 766.

The shell generally splits along lines 767 (Fig. 70) connecting the penetrations 758 before it ruptures along lines 766 between the penetrations. This is because the penetrations have weakened the shell there and also because the shell naturally has less resistance to inward bending than to outward bending.

The form fitting plurality of cracking pins in each pin set distributes the application of cracking pressure longitudinally over a large expanse. This avoids crushing the shell locally and distorts the shell barrel from end to end so as to produce the longitudinal splits with minimum compression of the kernel.

It will be understood that this principle of gripping and laterally compressing an arcuate section of the shell of a nut to disrupt it can be carried out on a single arcuate portion of the shell if desired. It can also be seen that the principle can be practiced with cracking pins at arcuate intervals of any reasonable size.

Furthermore, it will be understood that nuts can be cracked by this principle with or without separate means for severing the shell ends.

Between 293° and 333° in the shelling cycle the girdling pins and cracking pins are opened or withdrawn from the shelling chamber (circles IX and X, Fig. 75), and the shelled nut and its separated shell fragments are thereby released so they may pass out of the shelling chamber.

A comparison between circle VI and circles IX and X (Fig. 75) shows that the feeding finger heads 326 are already half way down with the next nut when the withdrawal of the girdling and cracking pins is completed. This means that when the machine is operated at a rapid rate the old nut is knocked out of the shelling chamber by the heels 330 of the feeding fingers or by the new nut, or by both, before the old nut has had time to drop out by force of gravity alone.

After leaving the shelling chamber the shelled nut descends between the stems 325 of the feeding fingers (Fig. 2) and through the tubular feeding finger carriage 289 and the guide tube 282. These passages are large, smooth and free from obstructions so that there is no opportunity for the nut or any of its shell fragments to lodge. Any suitable receiver may be placed under the guide tube 282 to catch the shelled nuts.

The shell portion between the removed shell ends rarely breaks into eight exactly equal longitudinal strips, but this apparently has little effect on the efficiency of the cracking operation. One set of splitting lines 767 quite generally occurs where the points of the cracking pins penetrate the shell, but the location of the intermediate lines varies on account of natural variations in the strength and curvature of the shell, and other factors.

There is much variation in the ease with which the longitudinal shell strips leave the nut. In some instances they have all fallen away when the nut emerges from the machine. In other instances mechanical agitation and a slight manual operation is all that is required to separate the kernel halves. In still other instances the longitudinal shell strips adhere tenaciously.

The strips which are along the kernel partition are generally the only ones having any inward attachment, this attachment being to the kernel partition which may be tough at the shell wall, but which is generally weak and brittle near the center of the kernel.

Figure 72 is a diagram showing a cross section of a nut with longitudinal shell strips 768 and 769 remaining attached to the kernel partition 770 after the shell ends have been removed and the other longitudinal strips have fallen away. The partition is shown to have a central, longitudinal, perpendicular cross-web 771 which is sometimes called the kernel partition septum and which occupies fissures in the kernel halves 772, 772. There is usually an additional but less prominent cross-growth 773 at each side of the kernel partition septum. This growth varies greatly in its character but generaly extends into kernel fissures or depressions to lock the partition with the kernel halves so that a straight pull applied to the shell strip 768 or 769 might tear out a part of the kernel.

According to our invention the kernel halves are set free in nuts like the nut $q$ by severing the union 774 (Fig. 73). This is accomplished, for instance, by inserting the end of a knife blade 775 into the apical end of the nut, the knife blade being held in the same plane as the kernel partition or in the plane crosswise to the union. The nut is held in one hand and the knife with the other, and it is possible to know from the "feel" of the nut when the nut has been "split". The knife may be inserted as deeply as may be required to effect the separation. By suitable relative manipulation of the knife and the nut, as may be adjudged necessary, the cutting and wedging action of the knife can be supplemented by a prying action to pry the halves apart.

By severing the union 774 the kerneys separate freely and trouble from the transverse growths 773 is avoided. Indeed, many nuts fall apart as illustrated in Figure 74. Falling apart is facilitated by a crack 776 in the kerney partition between a transverse growth 773 and septum 771. This may be a shrinkage crack developed in the nut before it is shelled, or it may be a rupture caused by the cracking operation, or it may be merely a line of weakness along which the partition breaks when the union is severed.

The top clamping pins and top girdling pins are in the upper shelling assemblage. The bottom clamping pins and bottom girdling pins are in the lower shell assemblage. This arrangement holds the girdling pins near the end of each nut. The girdling pins are inclined so that they can approach the cracking pins closely when a short nut is shelled, and the clamping pins have a steeper inclination than the girdling pins so that they can approach the girdling pins closely. This arrangement adapts these pins to work on short nuts as well as long nuts. Figure 66 shows the various pins of the shelling assemblages fitted to a short nut $j$. Figure 67 shows them adapted to a long nut $r$. The seating of the clamping pins 374 and 416 on the ends of the long nut $r$ holds the shelling assemblages farther apart and with a greater space between the zone of the cracking pins and the zones of the girdling pins than when a short nut is shelled.

When it is desired to bite off larger shell ends, the closing movement of the clamping pins is reduced by adding to the split washers 385 and 427 (Figs. 24 and 31). When it is desired to bite off smaller shell ends, the closing movement of the clamping pins is increased by reducing or removing the washers 385 and 427.

Further adaptation to the length of nuts may be had by interchangeably using a cracking assemblage having more or fewer than three cracking pins in each pin set and being proportionally wider or narrower.

It is to be understood that the machine and method which we have illustrated and described are to be taken as a preferrede example of our invention, and that they in no way limit the variety of expressions which may be given to the principles of the invention without departing from its spirit or from the scope of the subjoined claims.

We claim:

1. The method of shelling a nut, comprising severing the opposite ends of the shell and thereafter pushing the intermediate shell portion radially inward simultaneously at a series of at least three circumferentially spaced areas along longitudinal lines defining arcuate shell sections between them, for a distance producing sufficient shell distortion to crank the intermediate shell portion inwardly at these areas and to bulge and crack it outwardly between these areas.

2. The method of shelling a nut comprising severing the opposite ends of the shell, penetrating and engaging the external portion of the shell intermediate of the severed ends at a series of at least three circumferentially spaced areas along longitudinal lines defining arcuate shell sections between them to establish a grip on said arcuate shell sections, and with said grip applying pressure to said intermediate shell portion to crack it inwardly at said areas and to bulge and crack it outwardly within said arcuate shell sections.

3. The method of shelling a nut comprising severing the opposite shell ends of the nut, penetrating and engaging the external intermediate shell portion at at least three circumferentially spaced longitudinal areas defining arcuate shell sections between them to establish a grip on said arcuate shell sections, and with said grip applying pressure to said intermediate shell portion to crack it inwardly at said areas and bulge and crack it outwardly within said arcuate shell sections.

4. In a nut shelling machine, an annular series of radially extending members for piercing the shell of a nut at a series of areas defining a circumferential splitting line in the shell, means for moving said members at right angles to the axis of the nut to drive the ends thereof convergingly into the shell to split the same, each of said ends having its extremity of such limits and so arranged that it engages said shell along said splitting line only, said end being wedge shaped in the direction crosswise of said splitting line.

5. In a nut shelling machine, means to hold a nut, a series of shelling members having points of small cross section to pierce into the shell of the nut, said members being arranged to engage the shell at a series of spaced areas arranged in a line between adjacent shell portions, means to drive said members to cause the points to pierce endwise into the shell for approximately its thickness at said areas to make penetrations in which to grip the shell, and means to drive said members to cause the points to advance sidewise against the walls of the penetrations.

6. In a nut shelling machine, an annular series of sharp pointed jaws mounted and arranged to move divergently to open nut receiving position and convergently to closed position for penetrating in the shell of a nut at circumferential locations, driving means for opening and closing said jaws, gripping means to hold the nut on one side of the jaws, and means for moving said gripping means and said jaws relatively away from each other when said jaws are in said shell penetrating position, whereby to open the shell where said jaws have penetrated.

7. In a nut shelling machine, gripping jaws to hold the intermediate portion of the shell positioned along an axis, an annular series of sharp pointed jaws arranged about said axis at each side of said gripping jaws to engage opposite ends of the nut at circumferential series of locations, means mounting each of said second named jaws for divergent movement to open nut receiving position and convergent movement to closed nut penetrating position, means to cause said second named jaws to move from open to closed penetrating position and force them to pierce into said shell, and means for moving said gripping jaws and said second named jaws relatively away from each other in a direction parallel to said axis when said second named jaws are in shell penetrating position, whereby to withdraw the shell ends from the kernel ends.

8. In a nut shelling machine, a middle assemblage and an end removing assemblage on each side thereof, means mounting said assemblages along a common axis for relative axial movements toward and away from each other, each of said assemblages comprising cooperative jaws mounted to close convergently about a nut and grip a portion of its shell, piercing points on the jaws of said end removing assemblages for engaging into the shell of the nut, means to drive the jaws of the end removing assemblages into positions of penetration in the shell of a nut for approximately its thickness, and means for moving said end removing assemblages and said middle assemblage relatively away from each other in the axial direction while all the jaws grip the shell of the nut whereby to withdraw the shell ends from the nut.

9. In a nut shelling machine, an annular series of independently movable shell piercing jaws for piercing the shell of a nut at an annular series of areas defining a circumferential splitting line in the shell, each of said jaws having its shell piercing portion of such extent and so disposed as to engage the shell for a relatively short distance only, means for moving said jaws to nut penetrating position, said means comprising resistible means for moving each of said jaws until arrested by a nut and means for moving all of said jaws simultaneously an additional distance after being arrested by the nut to drive the shell piercing portions into the shell with substantially equal force.

10. In a nut shelling machine, an annular series of independently movable jaws having piercing points at the extreme nut engaging portion thereof, means to open said jaws to receive a nut and to close said jaws to drive said points into the shell of the nut, said means comprising resistible means to move each of said jaws until it is arrested by the shell and means then to move all of said jaws an additional distance approximately equal to the thickness of the shell.

11. In a nut shelling machine, means to hold a nut, an annular series of shelling prods with terminals of small cross section for piercing the shell of the nut at a series of areas to establish a circumferential splitting line in the shell, reciprocating resistible driving means to move each of said prods toward said line until it engages the shell, and means to lock each of said prods to its respective driving means when said prod engages the nut, and means whereby the driving means force the prods into the shell a predetermined distance after the prods are locked to the driving means.

12. In a nut shelling machine, an annularly arranged series of shell piercing members for splitting the shell along a circumferential line, a series of driving means for closing said members around said nut, means for mounting said driving members, means for reciprocating said driving means and the piercing members carried thereby, and opposed contact means on said mounting means and said driving means, one of said contact making means being in the path of movement of the other contact making means toward the nut whereby to prevent resiliency of stressed machine parts from affecting the precise termination of the movement toward the nut.

13. In a nut shelling machine, an annular series of convergeable jaws to close about a nut, each of said jaws having a shell piercing point and a shoulder at the base of said point to engage the shell after penetration by said point, and means to move said jaws divergently relatively away from each other to open nut receiving positions and convergently to nut penetrating positions, said moving means comprising resistible means to move each of said jaws until arrested by the shell of the nut and means then to move said jaws an additional amount substantially equal to the length of the points, whereby said points are forced into said shell and said shoulders abut against said shell.

14. In a nut shelling machine, a nut cracking pin having at one end a shaft column, said column having one side longer than the other to form a bevelled face, and having a terminal shell piercing point extending from said bevelled face along said longer side in the lineal direction of the column for a distance substantially equal to the thickness of the shell of a nut, said point forming the extreme lineal end of said shaft column.

15. In a nut shelling machine, a nut cracking pin having at one end a nut engaging face and a terminal shell penetrating point extending beyond said face, said nut engaging face being wide in one plane and said penetrating point being wide in a plane substantially perpendicular to the first plane.

16. In a nut shelling machine, piercing means to bite loose and axially withdraw a cup-like shell end from one end of the kernel of a nut, piercing means to bite loose and axially withdraw a cup-like shell end from the other end of the kernel of a nut, and means between said two piercing means to close in transversely upon the sides of the intermediate shell portion of the nut and applying pressure until it is cracked by distortion.

17. In a nut shelling machine, means for severing opposite ends of the shell of a nut, an annularly arranged series of cracking jaws to close around the middle portion of the shell to crack the same, and means for moving said jaws to open nut receiving position and closed nut cracking position, said last named means comprising resistible means to close each of said cracking jaws until arrested by said nut and means then to close all of said jaws substantially equally for an additional extent to crack the middle portion of the nut shell.

18. In a nut shelling machine, cracking jaws arranged to close about the intermediate portion of a nut to crack the intermediate portion of the shell, means to close said jaws to grip and hold the intermediate portion of the shell and finally to close said jaws an additional amount to crack it, an annular series of shell piercing jaws to pierce transversely into and sever the shell ends of the nut while said cracking jaws hold said intermediate portion and before said cracking jaws crack the same.

19. In a nut shelling machine, an annular series of cracking jaws to close transversely about the middle portion of the shell of a nut to crack the same, driving means for opening said jaws to receive said middle portion and for closing the jaws to crack the same, said driving means comprising resistible means for moving each of said jaws into engagement with said nut to compensate for an uneven shell contour and also means for closing all of said jaws an additional distance to grip the shell and finally closing said jaws a predetermined further distance to crack the shell, and means to sever the opposite ends of the shell after said cracking jaws have reached gripping position and before said jaws have reached cracking position.

20. In a nut cracker, an annular series of cooperative cracking jaws for cracking at least a part of a nut shell, means to open said jaws to nut receiving position and to close said jaws to shell cracking position in generally radial directions about a common axis, said jaws being spaced to engage the shell of a nut at arcuate intervals and each having a shell engaging shoulder, and at least one shell piercing point projecting beyond said shoulder.

21. In a nut cracking machine, cooperative cracking jaws to crack at least a part of the nut shell, driving means for opening said jaws to receive the nut and closing said jaws to crack the shell thereof, said driving means comprising compensating means dividing the closing movement into an initial fitting movement to make contact with the nut and a subsequent additional closing movement to compress the shell to crack it, one of said jaws comprising a series of shell engaging members constructed and arranged to operate in a common direction and move relatively to each other in said direction during said fitting movement, said compensating means comprising resistible means to urge each member of the set against the shell during the initial fitting movement and also means to hold said members in fixed relationship to each other during the subsequent movement.

22. In a nut shelling machine, cooperative cracking jaws to crack at least a part of the nut shell, driving means for opening said jaws to nut receiving position and for closing said jaws to cracking position, said driving means comprising compensating means to divide the closing movement of the jaws into an initial fitting movement of variable extent to provide for the size of the nut and a subsequent additional closing movement of predetermined extent to apply compression to the shell to crack it, at least one of said jaws comprising a row of cracking pins having nut engaging ends extending in a common direction, said pins being constructed and arranged to move relatively to each other during the initial fitting movement, said compensating means comprising resistible means to urge each of said pins against the nut during the fitting movement and also means to hold said pins in fixed relationship during the subsequent movement, the outer pins in said row being longest on their outermost sides at the nut engaging ends whereby they contact the shell of the nut at said sides regardless of shell contour.

23. In a nut shelling machine, cooperative cracking jaws to crack at least a part of the shell, one of said jaws being comprised of a plurality of independently movable pins arranged in a line and having shell engaging ends extending in a common direction, each of said pins having a shell piercing point at its nut engaging end and a shell contact shoulder at the base of said point, said piercing points being substantially in the same plane to define a common splitting line in the shell, means to move said pins independently against the shell, and means thereafter to drive said pins simultaneously as a unitary cracking jaw.

24. In a nut cracking machine, a plurality of series of cracking members with nut engaging ends, means for mounting said series of members near their nut engaging ends at spaced intervals about a common axis, and driving means to move said members away from said axis to receive a nut between them and to move said members toward said axis to crack at least a part of the shell of the nut, said driving means comprising resistible means to advance each of said members to engage lightly against the shell and means to advance thereafter all of said members an additional distance toward said axis for cracking the shell.

25. In a nut shelling machine, an annular series of cooperative cracking jaws mounted around a common axis and spaced to engage the shell of a nut at arcuate intervals, each of said jaws comprising a series of independently movable members having shell engaging ends extending in a common direction, means mounting said jaws for movement toward and away from said axis, the members of each of the jaws being arranged in a line parallel to said axis, each of said members having a shell penetrating point and a shoulder along the side of said point in a direction transverse to said axis, operating means for said jaws, said operating means comprising resistible means for independently moving said members to engage lightly against the shell and means for moving all of said members thereafter an additional distance substantially greater than the length of their points, whereby to force the points into the shell and to push the shell inward with said shoulders.

26. In a nut cracker, cooperative cracking jaws to crack at least a portion of the nut shell, one of said jaws comprising a plurality of independently movable nut engaging members having nut engaging ends extending in a common direction, clamping means for said members, said members being movable relatively to said clamping means, means to reciprocate said clamping means toward and away from the nut to be cracked, resistible means for advancing each of said members into engagement with the nut, and means whereby said clamping means clamps said members for simultaneous movement after said members have engaged the nut.

27. In a nut cracker, cooperative cracking jaws to crack at least one portion of the shell of the nut to be cracked, one of said jaws comprising a plurality of independently movable nut engaging pins, clamping means for said pins, said pins being movable relatively to said clamping means, means to reciprocate said clamping means towards and away from a nut, means to advance each of the pins towards the nut with the clamping means until the pins engage the nut shell, and means to actuate said clamping means to clamp said pins when all of said pins have engaged said shell and a predetermined distance before the end of the clamping means movement.

28. In a nut cracking machine, cooperative cracking jaws to crack at least a portion of the shell of a nut, one of said jaws comprising a set of independently movable cracking members, clamping means surrounding said cracking members and loosely supporting the same, means to reciprocate said clamping means towards and away from the nut, resilient means to advance each of said movable cracking members with said clamping means into engagement with the nut, and means to cause said clamping means to clamp said members when all of said members are in engagement with the shell and before the end of the movement of the clamping means toward the nut.

29. In a nut shelling machine, shell forcing means, driving means including convergeable members for having frictional engagement with said shell forcing means, said driving means including locking means to converge said members and thereby establish said frictional engagement, resistable means to advance said shell forcing means into engagement with the nut to be shelled, actuating means to advance the driving means in a direction corresponding to the advance of said shell forcing means, and means in the path of advance of said driving means to engage the same and actuate the locking means to converge said members and thereby establish said frictional engagement after said shell forcing means has engaged the shell and prior to the end of the advance of the driving means.

30. In a nut shelling machine, shell forcing means, driving means including convergeable jaws having frictional engagement with said shell forcing means, said driving means including locking means to converge said jaws and thereby establish said frictional engagement, resistible means to advance said shell forcing means into engagement with a nut with less than shell forcing pressure, actuating means to advance said driving means in a direction corresponding to the advance of shell forcing means, and means to cause said locking means to converge said jaws and thereby establish said frictional engagement after said shell forcing means has engaged said shell and at a predetermined distance from the end of the advance of the driving means, thereby said driving means drives said shell forcing means into the shell.

31. In a nut-shelling machine, shell forcing means having a nut engaging end, a gripper having convergeable cooperative jaws and receiving said shell forcing means between said jaws, means for advancing said gripper in the direction of said nut engaging end and for retracting said gripper, resistable means to advance said shell forcing means with said gripper until the nut engaging end has closed against a nut, means to cause said jaws to converge and lock with said shell forcing means a predetermined distance from the end of said advancing movement of said gripper, and means on said shell forcing means and engageable by said gripper, to positively retract said shell forcing means when said gripper is retracted.

32. In a nut shelling machine, shell forcing means, a gripper comprising opposed pivotally connected jaw means and receiving said shell forcing means between said jaw means, means to move said shell forcing means against a nut with less than shell forcing pressure, means to move said gripper toward said nut, and means to temporarily interrupt said movement of said gripper and cause said jaw means to bite said shell forcing means for subsequent unitary advancement of said shell forming means with said gripper.

33. In a nut shelling machine, shell forcing means, a driving gripper for said shell forcing means and comprising opposed pivotally connected jaw means receiving said shell forcing means between them, means to move said shell forcing means against a nut with less than shell forcing pressure, operating means to move said gripper toward said nut and to simultaneously tend to close said jaw means against said shell forcing means, resilient anti-locking means to temporarily prevent said closing, and means to overcome the action of said anti-locking means and cause locking of said shell forcing means by said gripper when said gripper is a selected distance from the end of its stroke.

34. In a nut shelling machine, means for supporting a nut, shell forcing means, means to advance and retract said shell forcing means to and away from engagement with the nut, said last named means comprising a gripper comprising pivotally connected members with opposed gripping jaws, opposed actuating arms to open and close said jaws, said shell forcing means being received between said jaws, said gripper being mounted for movement relatively to said shell forcing means when said jaws are open, a frame supporting one of said arms for advancing and retracting movements of said gripper, in directions corresponding to the movements of the shell forcing means, means to actuate said other arm alternately in opposite directions to advance and retract said gripper, the parts being so constructed and arranged that the actuating arms tend to close the jaws during the advance of the gripper and open them during retraction thereof, anti-locking means to suspend temporarily the closing of the jaws during advance thereof, and lock initiating means to overcome the anti-locking means to cause the jaws to grip the shell forcing means after the shell forming means has advanced against the nut and a predetermined distance prior to the the end of the advance of said gripper.

35. In a nut shelling machine, a carrying member having a nut receiving opening and an annular series of slots communicating with said opening, an annular series of shell forcing means mounted to slide in said slots to open nut receiving position and closed shell forcing position, an annular series of grippers each comprising pivotally connected members with opposed gripping jaws to engage said shell forcing means, opposed actuating arms to open and close said jaws, said shell forcing means being supported between said gripping jaws and movable relatively thereto when said jaws are open, resistible means to advance each of said shell forcing means against a nut, means to advance all of said grippers simultaneously, and means to close said jaws after said shell forcing means have engaged the nut and prior to the end of the advance of the grippers to grip said shell forcing means for advancement simultaneously therewith.

36. In a nut shelling machine, a pair of shelling assemblages each having an opening, a set of members included in each of said assemblages and mounted to open and close in said opening, means to open and close said sets of members, means for moving a nut through one of said openings while the corresponding set of said members is sufficiently open and placing it between said sets, and resistable means for moving said assemblages relatively toward each other while said sets are closed, to clamp the nut.

37. In a nut shelling machine, opposed clamping means to engage the opposite ends of each of a succession of nuts to clamp each of the nuts between them, one of said clamping means comprising an annular series of pins mounted for movement to open and close and when closed defining an opening to receive one end of the nut, an annular series of shell severing members to bite into the shell of each nut between the clamping means and at a fixed distance from said one of said clamping means, and adjustable means for varying the amount of closing of said series of clamping pins and thereby the extent of the opening for receiving the end of the nut, whereby to determine the approximate distance from the end of the nut at which said severing means bite into the shell.

38. In a nut shelling machine, two shelling assemblages having registering openings and having opposed sets of nut clamping members mounted to open and close in said openings, respectively, means to open and close said clamping members, means to carry a nut through one of said openings while the respective set of clamping members is sufficiently open and hold it between said sets of clamping members, means to move said assemblages relatively toward each other until the nut is clamped between said sets of clamping members, and an annular series of shell severing members included in each of said opposed shelling assemblages, said series of shell severing members being mounted to open and close between said sets of clamping members to sever portions of the shell of the nut.

39. In a nut shelling machine, a combined shell severing and nut clamping assemblage comprising a piece having the form of a hollow cone with an opening at the apex, said opening being sufficiently large for the passage of nuts to be shelled, clamping members assembled on the concave side of said piece, shell severing members assembled on the convex side of said piece, means to open and close said clamping members in said opening and means to open and close said shell severing members adjacent to said clamping members.

40. In a nut shelling machine, clamping means to move relatively against opposite ends of a nut to clamp the nut between them, penetrating means to engirdle and sever the shell of the nut intermediate of the clamping means after the clamping means have clamped the nut, and means for releasing the clamping action of said clamping means after said penetrating means has engirdled the nut and before said penetrating means severs the shell.

41. In a nut shelling machine, opposed sets of clamping members, each set of members being mounted to move from open to closed positions and in the closed position defining the central opening to receive one end of a nut, means to open and close said sets of clamping members, means to move a nut through one of said sets of clamping members while it is sufficiently open and to hold the nut between the opposed sets of clamping members so that the axis of the nut aligns approximately with said openings, and resistable means for thereafter moving said sets of clamping members relatively toward each other so as to clamp the nut therebetween and cause the ends of said nuts to seek the center of said openings.

42. In a nut shelling machine, a nut centering means comprising opposed sets of clamping members, each set of members being mounted to move from open to closed positions and in the closed position defining a central opening between them to receive the end of a nut, means to open and resistably close said sets, means to carry a nut through one of said sets while it is sufficiently open and to hold the nut between the opposed sets so the axis of the nut aligns approximately with said openings, resistable means for moving said sets relatively towards each other to clamp the nut between them and cause the ends of said nut to seek the centers of said openings, and adjustable means to limit the closing movement of said members and thereby effect the size of the openings between said members when they are closed, and thus effect the extent to which the ends of nuts are received by said openings.

43. In a nut shelling machine, a plurality of nut shelling assemblages aligned along a common axis, means for reciprocating said shelling assemblages relatively away from each other and resistibly toward each other, along said axis, each of said assemblages comprising a set of pins, means for moving said sets of pins towards and away from said axis to close and open the same, said pins engaging a nut when said assemblages are near each other and said pins are in their closed position, means to support one of said sets of pins resiliently against axial displacement relatively to its assemblage to absorb the shock of clamping impact, means to feed a nut along the axis between the sets of clamping pins, cracking jaws between said sets of clamping pins, and means to operate said cracking jaws after it has been clamped by said sets of clamping pins.

44. In a nut shelling machine, a spaced pair of assemblages each having a set of clamping members, a set of cracking jaws independent of said assemblages and located substantially midway between said sets of clamping members, means to open and close said sets of clamping members, means to place a nut between said assemblages through one of said sets of clamping members when it is open, and resistable means to move said assemblages simultaneously and substantially equally toward said cracking jaws when said clamping members are closed, to clamp said nut substantially centered with respect to said cracking jaws.

45. In a nut shelling machine, shelling means defining a shelling chamber, said shelling means comprising cooperative cracking jaws to crack the intermediate portion of a nut's shell in said shelling chamber, and an annular series of shell penetrating pins on each side of said cooperative cracking jaws to sever the end portions of said nut's shell in said shelling chamber, said penetrating pins being inclined to approach said cracking jaws in said shelling chamber.

46. In a nut shelling machine, two shelling assemblages having registering openings defining at least a part of a shelling chamber and having shelling members to close against a nut in said shelling chamber, means for mounting said assemblages and moving them relatively toward and away from each other, and guard means secured to one of shelling assemblages and movable within the opening of the other and between the shelling members of the other to form a telescoping enclosure for the shelling chamber between said shelling assemblages.

47. In a nut shelling machine, shelling means defining a vertical shelling chamber, a cover above said shelling means and containing a nut passage, a dirt confining shield carried by and topping said means about the entrance to said shelling chamber, and a dirt confining shield extending downwardly from said cover, and about said nut passage and terminating within said first named shield, said shields thus directing dust from said nut passage into the entrance of said shelling chamber.

48. In a nut shelling machine, a feeding finger set comprising a support, a plurality of prong-like cooperative feeding fingers arranged about a common axis and mounted on said support, said feeding fingers each comprising a wide inwardly offset head and a resilient stem between said head and said support, said heads being wide in a radial direction relatively to said axis, and said stems being of a length and resilience to permit said heads to spring away from each other to receive nuts of different diameters.

49. In a nut shelling machine, a feeding finger set comprising a base, prong-like cooperative feeding fingers arranged about a common axis and secured to said base, said fingers having heads and resilient stems connecting said heads to said base, said stems being inclined in the direction of said axis toward said heads to define a tapering nut passage, said heads being offset inwardly to receive and hold a nut between them, and said stems being of such length and resiliency as to permit said heads to spring away from each other to receive nuts of different diameters.

50. In a nut shelling machine, a feeding finger set comprising an elongated base and a plurality of resilient cooperative feeding fingers rigidly attached to said base near one end thereof, said feeding fingers having free extremities with inwardly offset portions extending beyond the other end of said base, said inwardly offset portions being spaced to grip a nut between them, said feeding fingers being supported by said base against outward displacement at fixed positions between the locations of attachment and the extremities of the fingers near the other end of the base from where said feeding fingers are.

51. In a nut shelling machine, a vertical shelling chamber, shelling members to close upon a nut in said shelling chamber, a nut discharge tube extending downwardly below said shelling chamber, feeding fingers to carry nuts from a position above said shelling chamber into said shelling chamber at regular intervals, a tubular base supporting said feeding fingers and mounted in said discharge tube, and means for reciprocating said base with said fingers, the opening in the tubular base being of such size as to permit discharge of the cracked nuts.

52. In a nut shelling machine, shelling members, means for mounting and moving said shelling members to open and close upon a nut between them, spaced cooperative nut carrying members mounted to move into the closing path of said shelling members, means for moving said carrying members into the closing path of said shelling members with a nut and again moving said carrying members out of the path of said shelling members while said shelling members are open, and means to move between said spaced carrying members while said carrying members are in the closing path of said shelling members and clamp said nut in position for said shelling members.

53. In a nut shelling mechanism, means having an axial opening for receiving a nut and a series of channels extending from said opening, said means having guide slots extending radially from said opening between said channels, nut cracking member slidable in said channels to open nut receiving positions and closed shell cracking positions along said opening, means periodically to move said members to said shell cracking position and nut receiving positions, cooperative feeding fingers riding in said guide slots, and means for reciprocating said feeding fingers in directions parallel to said axis to carry a nut into said opening while said nut cracking members are in nut receiving positons.

54. In a nut shelling machine, shelling means having a shelling chamber with an entrance opening and an exit opening for nuts, said shelling means also having slots extending radially from said shelling chamber, feeding fingers riding in said slots, said feeding fingers having inwardly offset portions to hold a nut between them, means for reciprocating said feeding fingers to move said offset portions beyond said shelling chamber after a nut and then into said shelling chamber with the nut, operating means to actuate said shelling means to shell said nut in said shelling chamber, and heels at the base of the inwardly offset portions of said feeding fingers to function in expelling a previously shelled nut from said shelling chamber as said offset portions are moved into said shelling chamber.

55. In a nut feeding mechanism, a plurality of nut feeding elements defining a constricted throat and a spreading pocket beyond said throat, resilient means to urge said feeding elements closer together at said throat than the diameter of a nut, an anvil beyond the wide end of said spreading pocket, means for placing a nut between said feeding elements and said anvil, and means for thereafter moving said feeding elements and said anvil relatively towards each other to force said feeding elements to ride relatively over the sides of the nut to engulf it.

56. In a nut feeding mechanism, a plurality of anvil elements converging upwardly, a plurality of cooperative feeding elements defining a restricted throat between themselves and defining a funnel-like nut pocket above said throat, resilient means to normally hold said feeding elements so spaced that said throat is narrower than the diameter of the smallest nut to be fed, means to open and close said anvil elements, said anvil elements when closed forming an upwardly concave nut anvil, means to drop an upended nut between said anvil elements while they are open, means for holding said feeding elements below said anvil elements to catch said upended nut in said funnel-like nut pocket and for moving said feeding elements upwardly after said anvil elements are closed, to press the upper end of said nut into said concave anvil and to move said feeding elements over the sides of the nut until said nut is in said throat.

57. In a nut feeding mechanism, a series of cage bars forming a funnel-like cage longer than the average nut to be shelled, means to mount said cage bars for movement to open and closed positions, said cage bars when in closed position being spaced sufficiently apart at the top to admit a nut and being too close together at the bottom to permit a nut to pass, said cage bars when in open position being spaced apart to permit a nut to pass, means to drop a single nut into said cage when it is closed, means for moving said cage bars from closed to open position while the nut is free to slide down along the cage bars by gravity whereby said nut is upended, and means to receive and retain the nut substantially in its upended position after said means for moving said cage bars from closed to open position has operated to move said cage bars at least a substantial distance toward said open position.

58. In a nut feeding mechanism, a series of cage bars forming a funnel like nut cage, said cage bars being longer than the average nut to be fed, means to mount said cage bars for movement to open and closed positions, said cage bars when in the closed position being spaced sufficiently apart at the top to admit a nut between them and being too close together at the bottom to permit a nut to pass, said cage bars when in open position being spaced apart to permit a nut to pass, means to drop a single nut into said cage when it is closed, means for moving said cage bars from the closed to open position while the nut is free to slide along said cage bars by gravity wherely said nut is upended, and a funnel-like pocket below said cage bars to receive and retain the upended nut in substantially its upended position after said means for moving said cage bars from closed to open position has operated to move said cage bars a substantial distance toward said open position.

59. In a nut feeding mechanism, an annular series of members arranged around a vertical axis and providing a constricted portion between them, means mounting said members whereby they may open and close, said members when closed forming a funnel-like pocket above said constricted portion and an upwardly constricted concave anvil below said constricted portion, said members when open providing a passage of sufficient extent to permit a nut to pass from the pocket to the anvil, means for dropping a single nut into the pocket when the members are closed, and means for opening all of said members simultaneously and equally.

60. In a nut feeding mechanism, a series of vertically elongated members arranged about a common axis, said members forming a constriction between them intermediate of their ends, means for opening and closing said members, said members, when closed, forming a funnel-like nut pocket above said constriction and an anvil below said constriction, and, when open, allowing a nut to pass from the pocket side to the anvil side of said constriction, a plurality of resilient cooperative feeding fingers defining a throat which is normally narrower than a nut to be fed and defining a spreading nut pocket above said throat, means for holding said feeding fingers below said anvil to receive a nut dropped through said constriction, and for moving said feeding fingers upwardly after said elongated members are closed to press the nut against said anvil and slide over the nut to grip it, and guide means defining a central nut passage below said anvil and defining spaces for the feeding fingers to work in.

61. In a nut feeding mechanism, a vertical nut guide defining a central nut passage and two series of vertical slots, anvil elements mounted to move in one of said series of slots, means to open and close said anvil elements, each of the slots of said second series coming between two consecutive slots of said first series, resilient cooperative feeding fingers mounted to move in said second series of slots, said feeding fingers defining a throat which is normally narrower than a nut to be fed and defining a spreading opening above said throat, and means for holding said feeding fingers at a suitable position below said anvil elements to receive a nut dropped between said anvil elements when said elements are open and for moving said feeding fingers upwardly after said anvil elements have closed and until the feeding fingers move said nut against said anvil and ride over and firmly grip said nut.

62. In a nut segregating mechanism, a shaker having a nut passage tapering downwardly at an angle greater than the binding angle for nuts to provide an elongated restricted portion, said nut passage being of such size at said restricted portion that it will not accommodate side by side two ordinary nuts, means for supplying nuts to said nut passage, mechanical means for removing nuts singly from said restricted portion of said passage, and means moving said shaker upwardly and downwardly to agitate the nuts and cause them to gravitate along said passage and into said restricted portion.

63. The method of shaking nuts through a nut upending funnel, which comprises moving the funnel upwardly with sufficient deceleration to toss nuts upwardly, then holding the funnel substantially stationary to permit the nuts to drop back in the funnel, then moving the funnel downwardly more rapidly than nuts can follow by gravity, and then holding the funnel substantially stationary to permit the nuts to settle therein, before again moving the funnel upwardly, thereby providing two distinct nut loosening and settling operations in one cycle of agitation.

64. In a nut segregating mechanism, a shaker having a nut passage tapering to an elongated restricted portion at an angle greater than the binding angle for nuts, said passage being of such size at its restricted portion that it will not accommodate side by side two ordinary nuts, means for supplying nuts to said passage, means for removing nuts singly from said passage restricted portion, and means for moving said shaker upwardly and downwardly at a speed and for a distance to pitch nuts upwardly relatively to said shaker for a distance at least as great as the diameter of the average nut to agitate said nuts and cause them to gravitate along said nut passage and into said restricted portion.

65. In a nut segregating mechanism, a shaker comprising a nut upending funnel, a guide cylinder connected to the funnel at the larger end thereof, and extending around the funnel, and resilient closing members located between said funnel and cylinder and forming a nut oulet gate beyond said funnel, the funnel having a taper greater than the binding angle for nuts, said funnel having a nut outlet opening whose diameter is smaller than the average nut to be upended.

66. In a nut segregating mechanism, resilient means defining a downwardly tapering nut detaining pocket, a funnel having an outlet of such extent that it will not accommodate two ordinary nuts side by side, the outlet end of the funnel being located within said pocket, a hopper to supply nuts to said funnel, means for moving said funnel and said pocket upwardly and downwardly simultaneously to agitate the nuts and facilitate their movement from the hopper to the pocket, and means for extracting nuts singly from said pocket.

67. In a nut segregating mechanism, a hopper, means defining an outlet bore communicating with the interior of said hopper, a shaker slidably mounted in said bore and having an outlet gate, said shaker having a downwardly constricted nut passage communicating with said hopper and with said outlet gate, said nut passage tapering with an angle greater than the binding angle for a nut to a terminus approximately of a size to accommodate a single nut, means for reciprocating said shaker to agitate nuts in said passage, and means for removing one nut at a time through said gate.

68. In a nut segregating mechanism, a hopper defining temporary storage space for nuts, means defining an outlet bore communicating with said storage space and extending downwardly therefrom, a slidably mounted shaker in said bore and having a downward nut passage, means to move said shaker upwardly and downwardly a substantial distance to agitate nuts, the upper end of said shaker remaining within said bore during substantially all of said movement, the upper end of the bore extending above the upper end of the shaker when the latter is in its lowermost position, said upper end of the bore flaring upwardly toward said hopper to prevent nuts from jamming in said bore during the upward movement of the shaker.

69. In a nut segregating mechanism, a shaker having a substantially vertical axis with a nut passage along said axis, a yieldable outlet gate defining a nut detaining pocket at the lower end of said nut passage, said gate comprising resiliently yieldable vertically spaced members communicating with said pocket, extracting pins arranged about said axis to enter the spaces between the members and grasp nuts in said pocket, means for mounting said pins, an oscillating actuating ring carried by said mounting means and connected with said pins for operating said pins, means to operate said actuating ring, and means to hold said shaker and mounting means adjacent each other when said pins are entering said spaces and to move said shaker and mounting means axially relatively away from each other when said pins are at the end of their inward movement, said last named means also operating to move said shaker and mounting means when said pins have reached end of their outward movement.

70. In a nut segregating mechanism, a shaker having a downwardly tapering nut passage, a resiliently closing outlet pocket at the end of said passage, said pocket having openings in the side thereof, said pocket being of such extent that it will not accommodate two ordinary nuts, resistible nut extracting members operating through the openings to grasp the lowermost nut in said passage, means for operating said nut extracting members periodically, and means for moving said shaker upwardly and relatively away from said extracting members when said members are in nut grasping position, said last named means moving said shaker upwardly for a distance and with a velocity to pitch up and agitate the nuts.

71. In a nut segregating mechanism, a shaker having a downwardly extending nut passage, resilient pendent members on said shaker forming a closure for one end of the shaker passage, said pendent members being vertically spaced, means for mounting said shaker for vertical reciprocation, nut extracting members operating in the spaces between the pendent members to grasp a nut in the nut passage, means for moving said extracting members inwardly through said spaces and to hold them in said inward position for a period of time and then withdraw them, means for reciprocating said extracting members vertically, means connecting said last named means and said shaker for reciprocating the shaker in directions opposite to and simultaneously with the movements of the extracting members, and means cooperating with said last two named means to hold said extracting members in their uppermost position and said shaker in its lowermost position while said extracting members are moving inwardly and to move said extracting members downwardly and said shaker upwardly when said members have reached nut grasping position and to return said members and said shaker to uppermost n lowermost position respectively.

72. In a nut shelling machine, a shaker having a resiliently closing outlet gate an a nut upending funnel leading to said gate, means to supply said funnel with nuts, means to reciprocate said shaker to deliver nuts upended to said gate, means to extract a nut from said gate at periodic intervals, a vertically disposed set of resilient feeding fingers forming a funnel-like nut pocket between them at the upper end thereof and a constricted throat between them next below said nut pocket, nut straightening means to receive each nut extracted from said gate and drop it upended into said nut pocket when said feeding fingers are in one operative position, anvil elements to close above said pocket after the nut has arrived in said pocket, spaced sets of clamping pins below said throat while said feeding fingers are in said operative position, means to open and close said clamping pins, means to move said feeding fingers upward after they have received said nut and until said nut is stopped by said anvil elements and said feeding fingers have ridden over the nut to grip it in said throat, and to then move said feeding fingers downwardly while said clamping pins are open and until the nut in said throat is carried between said sets of clamping pins, means to move said sets of clamping pins resiliently toward each other when they are closed, until they grip the ends of the nut, cracking means to first grip and merely hold the middle portion of said nut and to then close against it to crack it, and penetrating and removing means to bite loose and remove the shell ends of the nut, in the interval between the holding and cracking actions of said cracking means.

FELIX B. ROMBERG.
LOUIS D. ROMBERG.